Jan. 25, 1955
C. W. BERTHIEZ
2,700,313
APPARATUS FOR CONTROLLING THE MOVEMENT OF MOVABLE
MEMBERS OF MACHINE TOOLS OR THE LIKE
Filed April 7, 1948
22 Sheets-Sheet 1
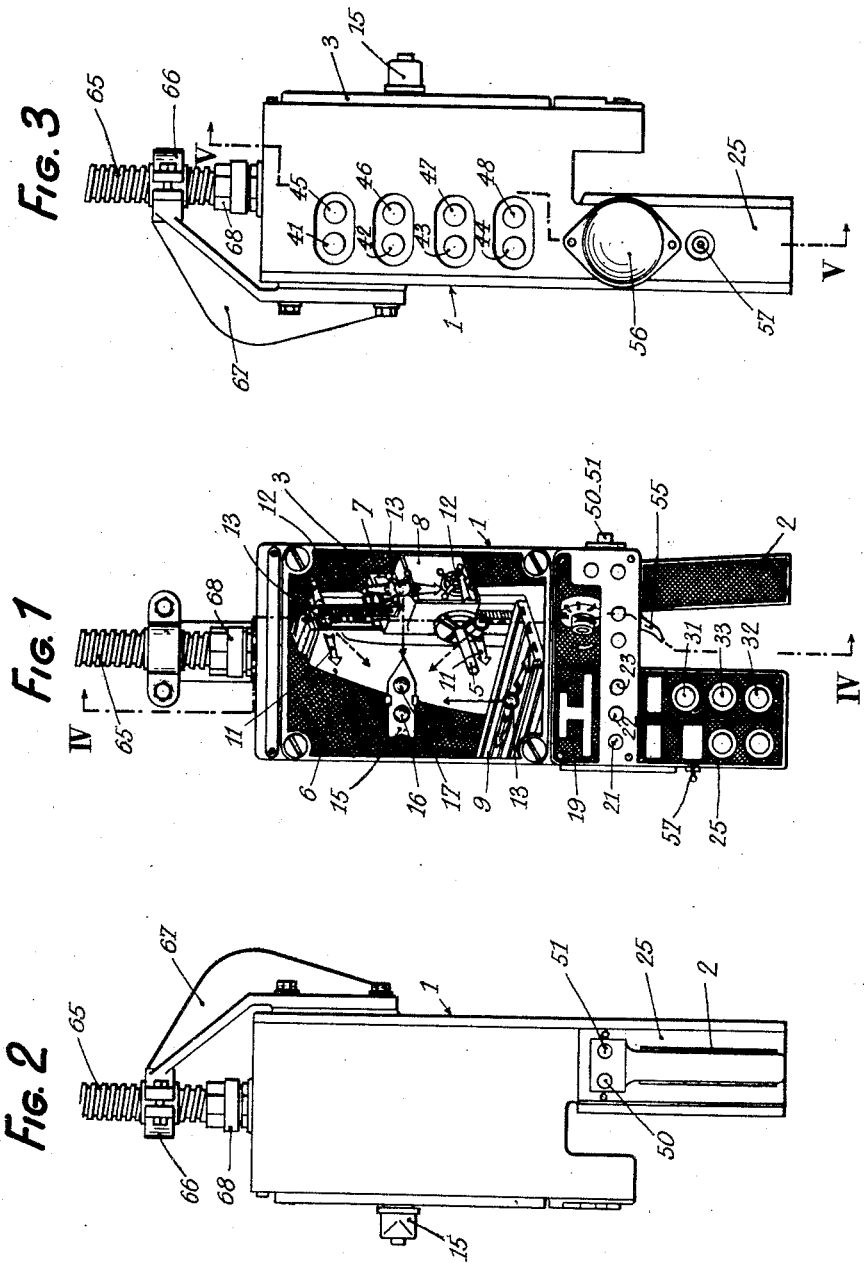
INVENTOR
Charles William Berthiez
BY
Cosrey + Jacobs
ATTORNEYS Jan. 25, 1955  
C. W. BERTHIEZ  
2,700,313  
APPARATUS FOR CONTROLLING THE MOVEMENT OF MOVABLE MEMBERS OF MACHINE TOOLS OR THE LIKE  
Filed April 7, 1948  
22 Sheets-Sheet 2
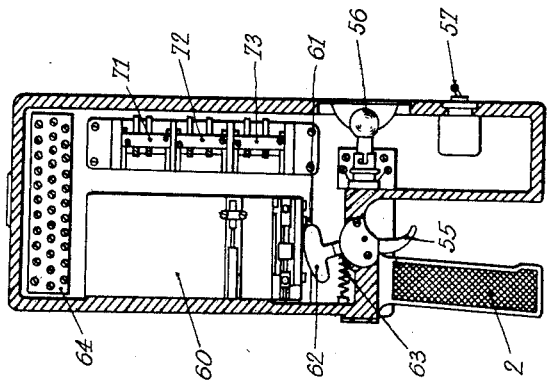
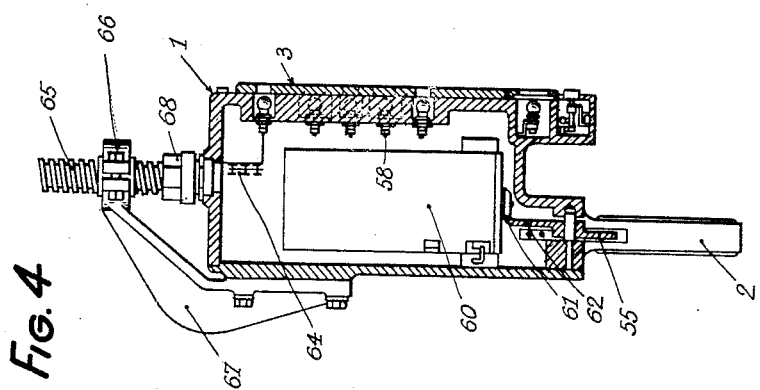
INVENTOR  
Charles William Berthiez  
BY  
ATTORNEYS

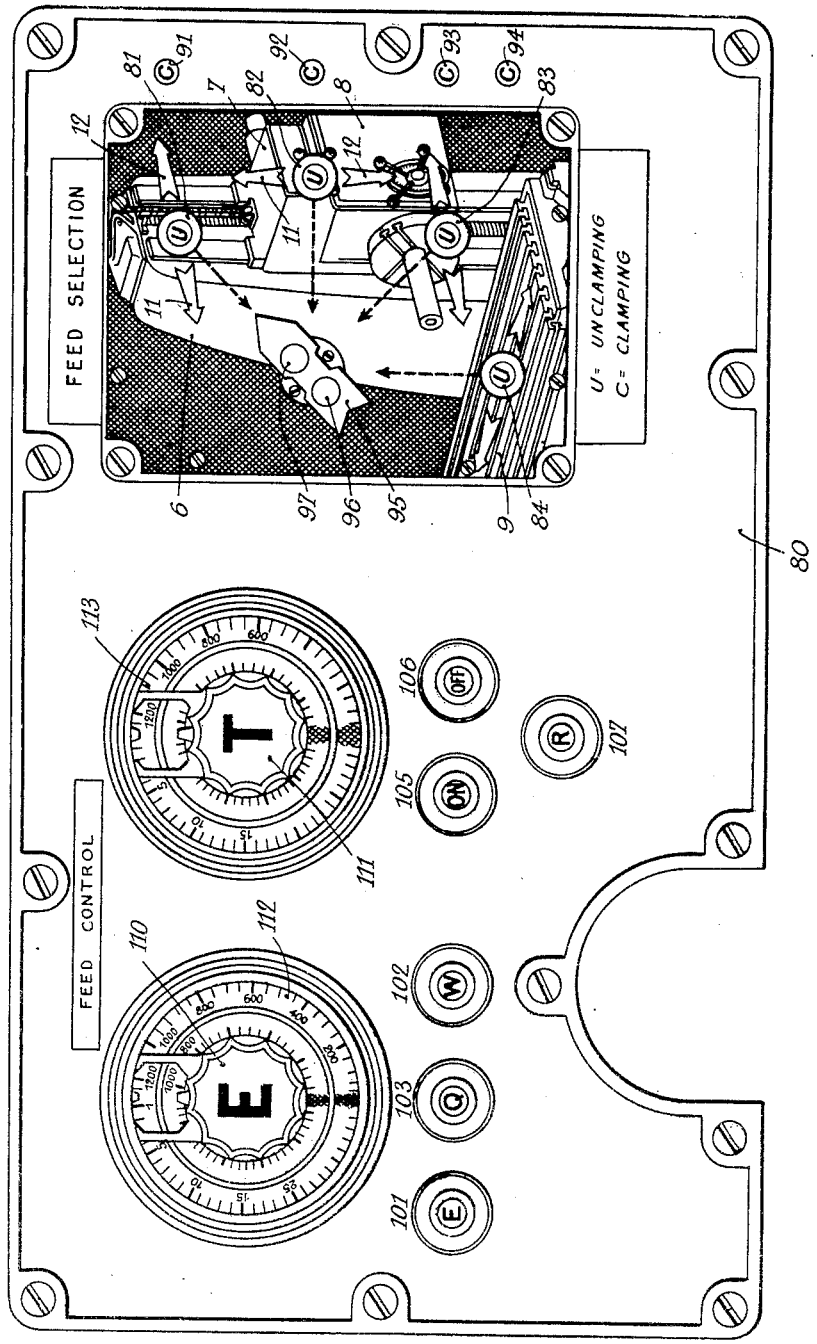

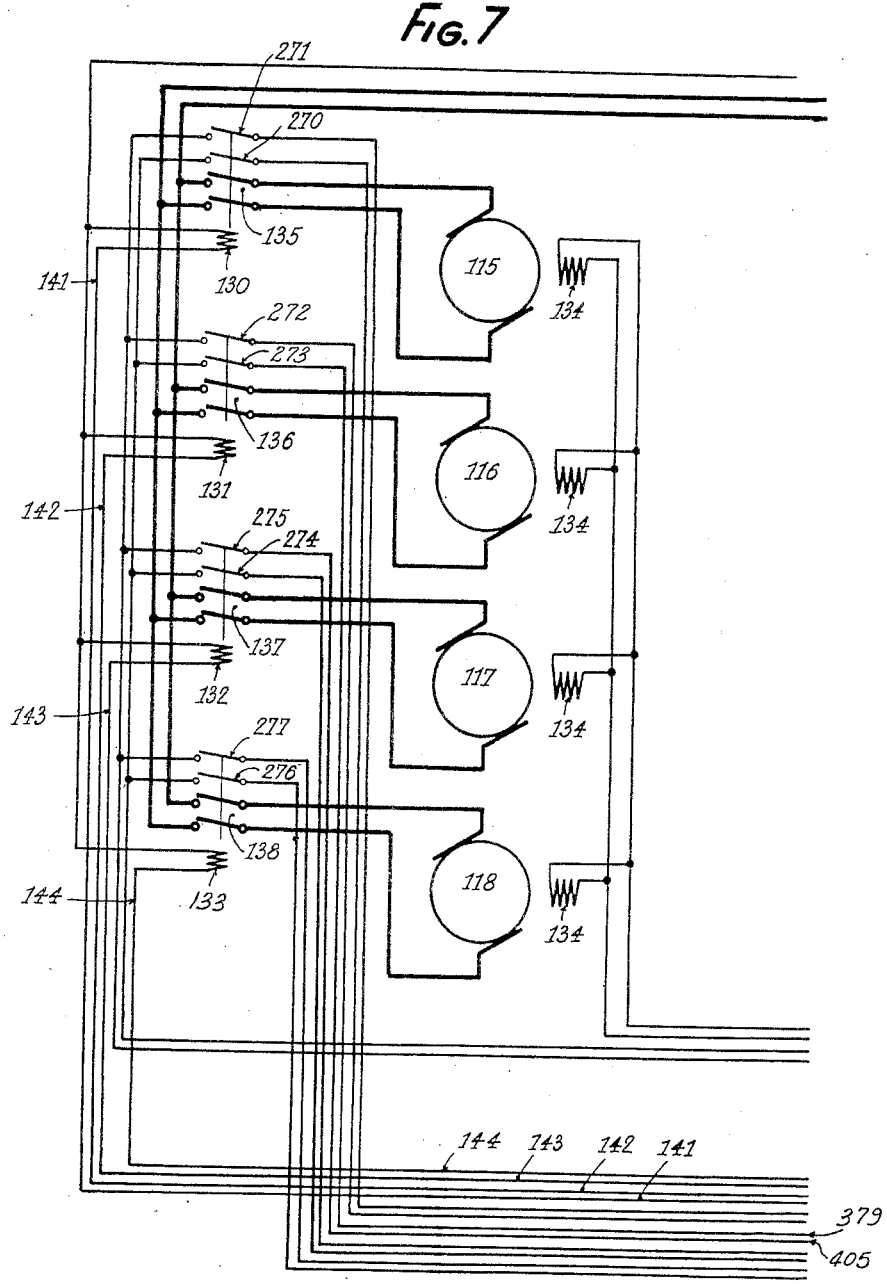

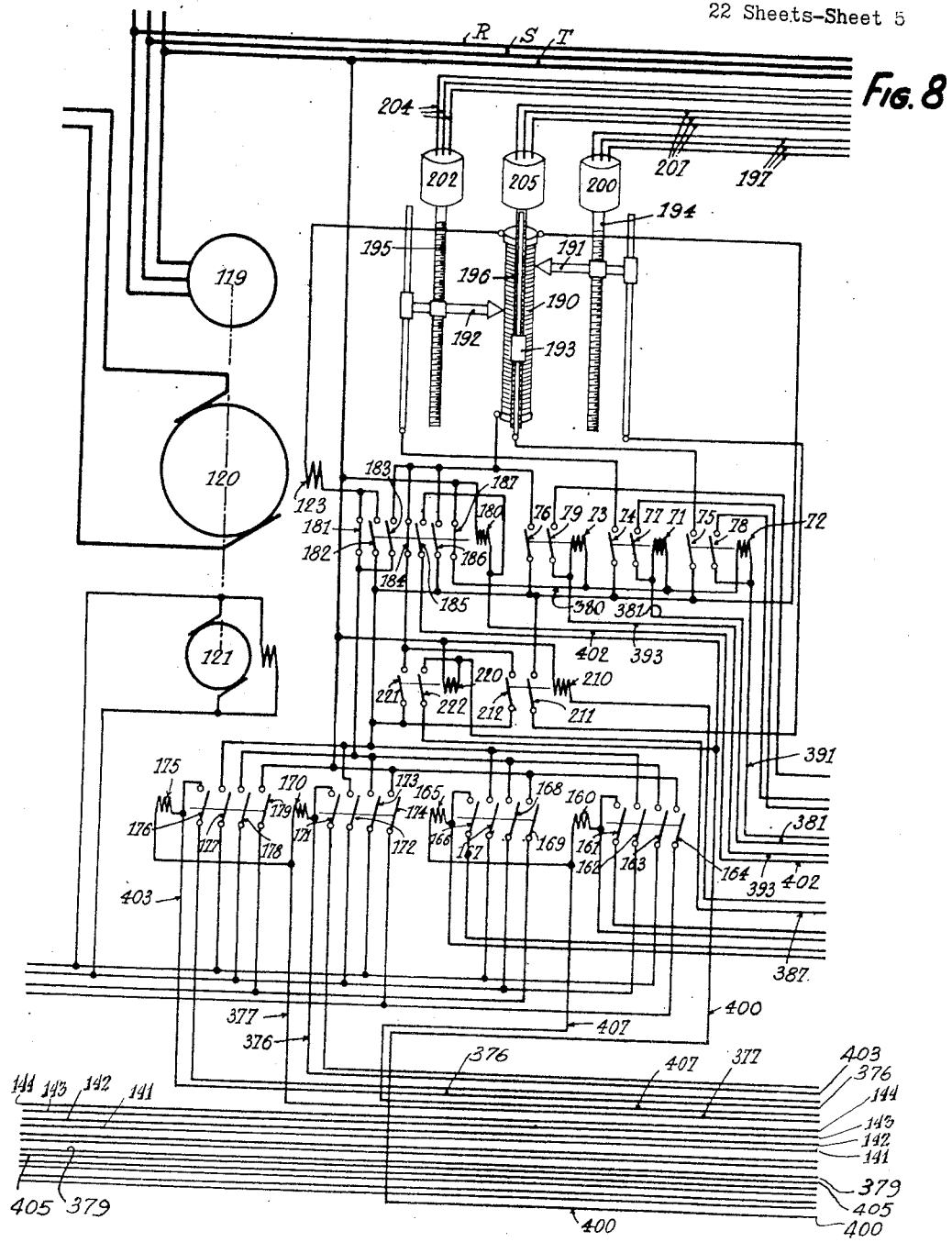

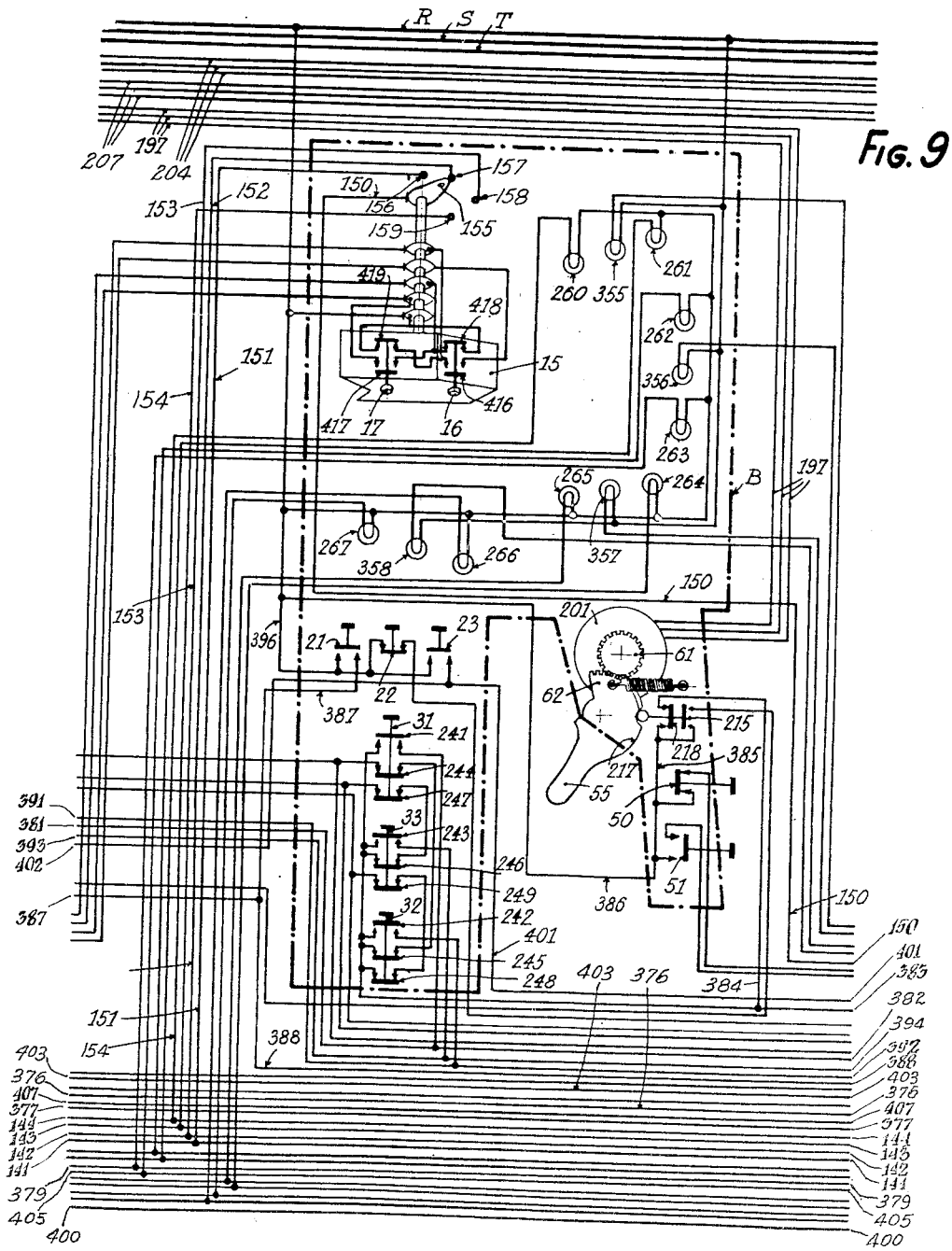

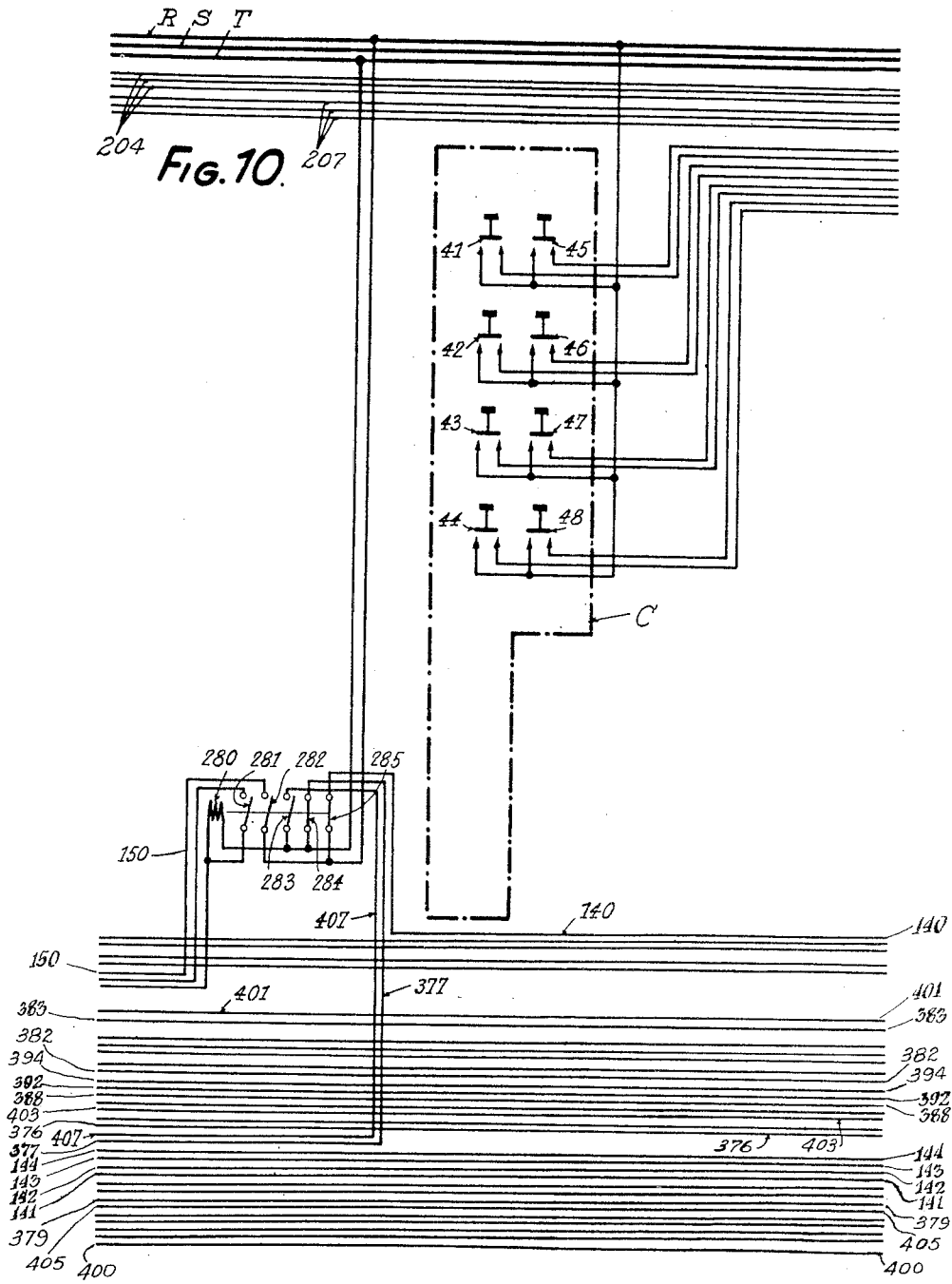

Jan. 25, 1955

C. W. BERTHIEZ 2,700,313

APPARATUS FOR CONTROLLING THE MOVEMENT OF MOVABLE MEMBERS OF MACHINE TOOLS OR THE LIKE

Filed April 7, 1948

INVENTOR
Charles William Berthiez
BY
Corey & Jacobs
ATTORNEYS

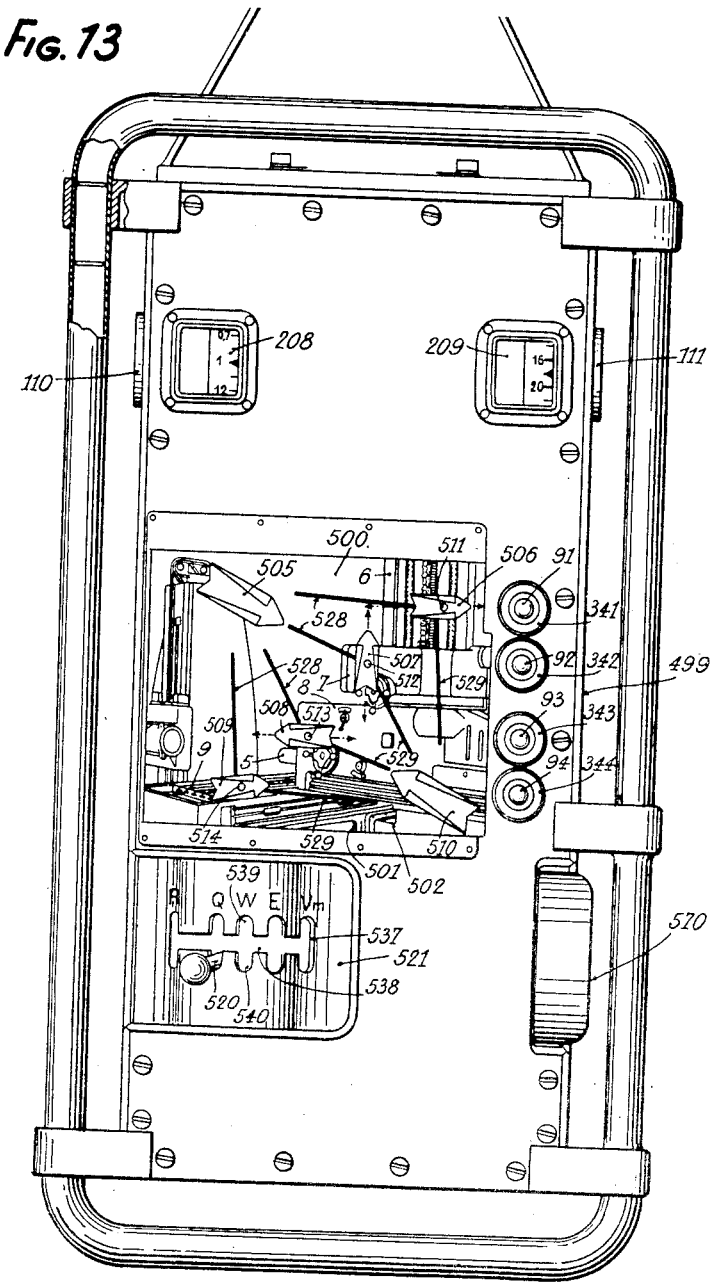

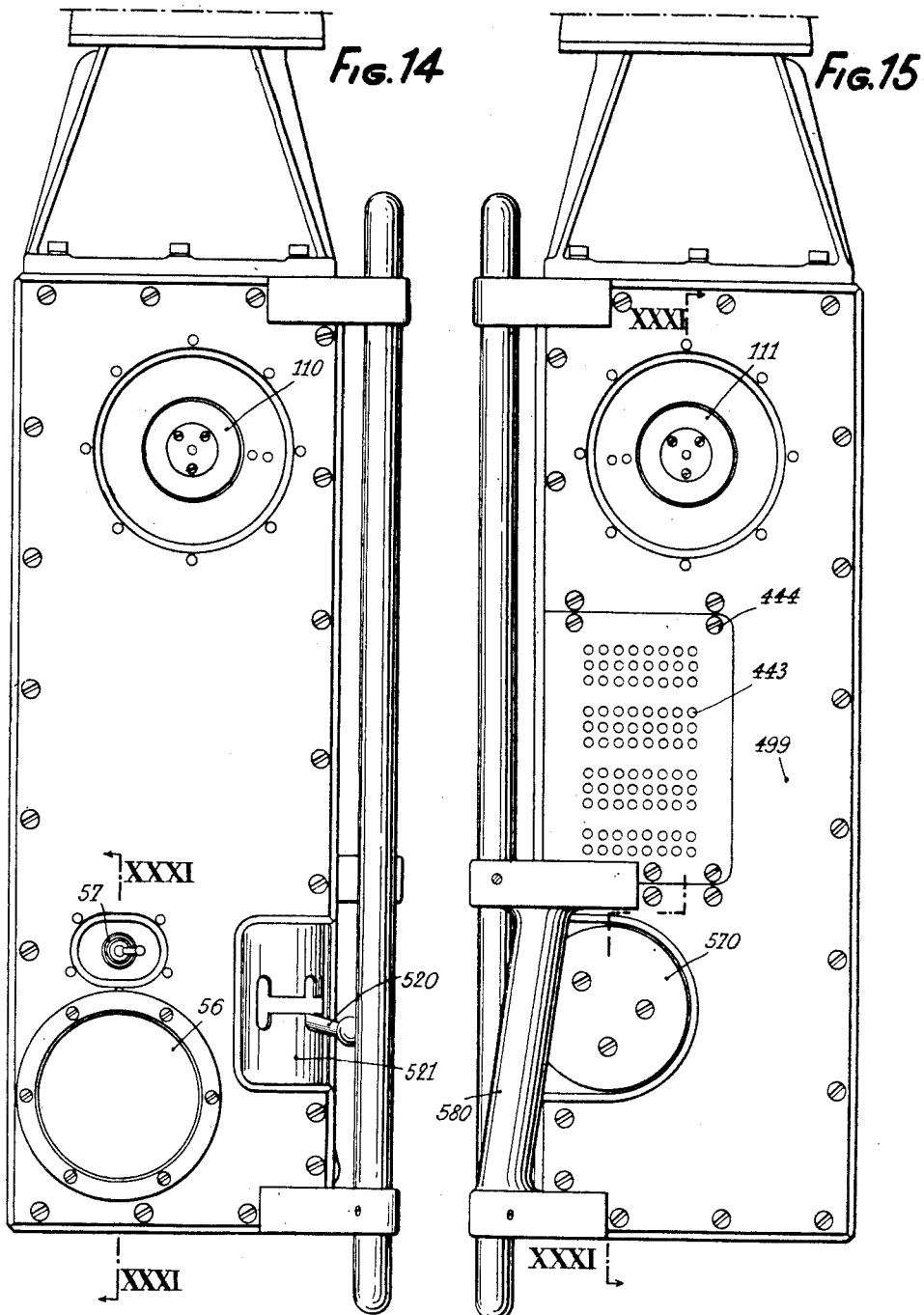

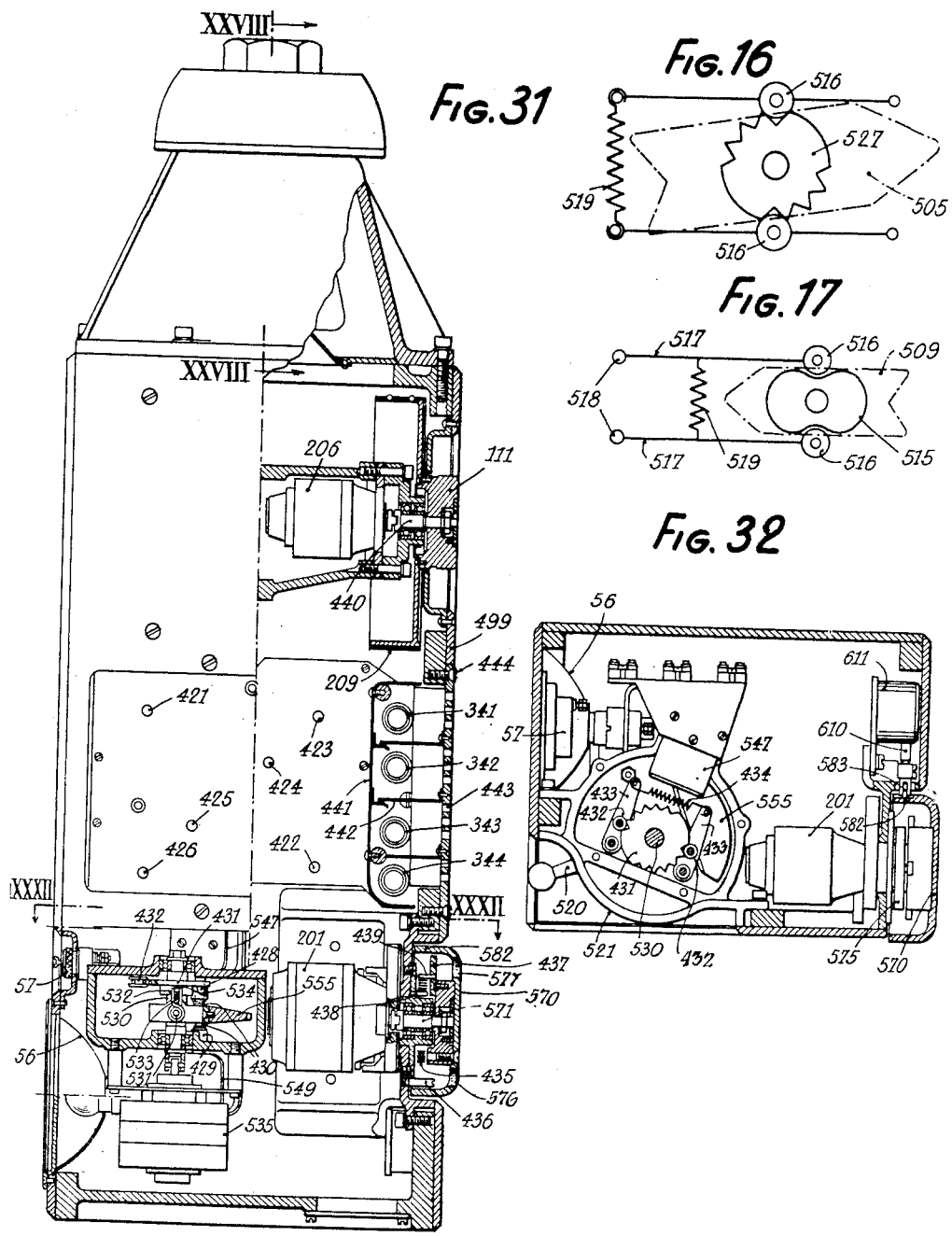

Jan. 25, 1955

C. W. BERTHIEZ 2,700,313

APPARATUS FOR CONTROLLING THE MOVEMENT OF MOVABLE
MEMBERS OF MACHINE TOOLS OR THE LIKE

Filed April 7, 1948

INVENTOR
Charles William Berthiez
BY
Corey & Jacobs
ATTORNEYS

Fig. 25

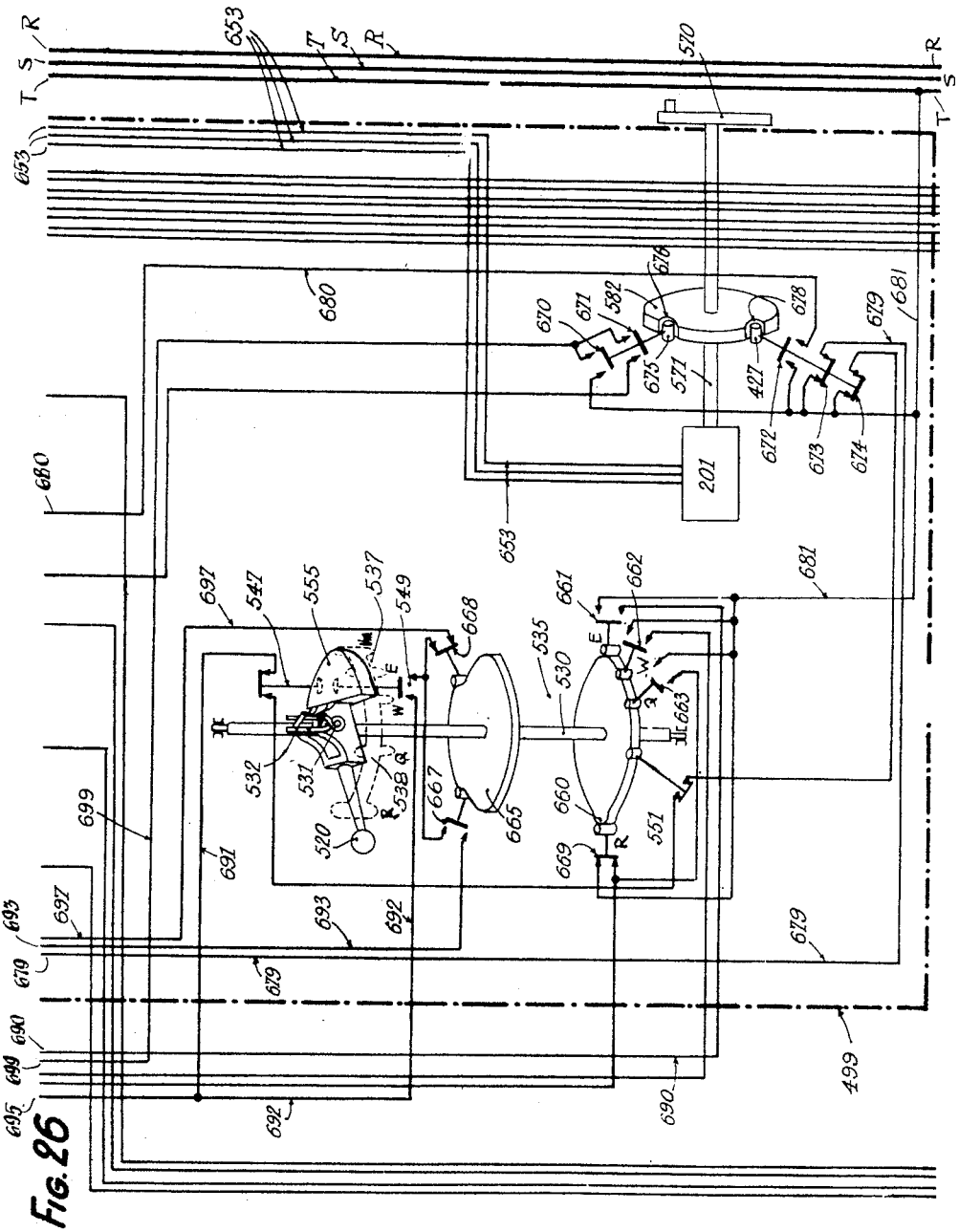

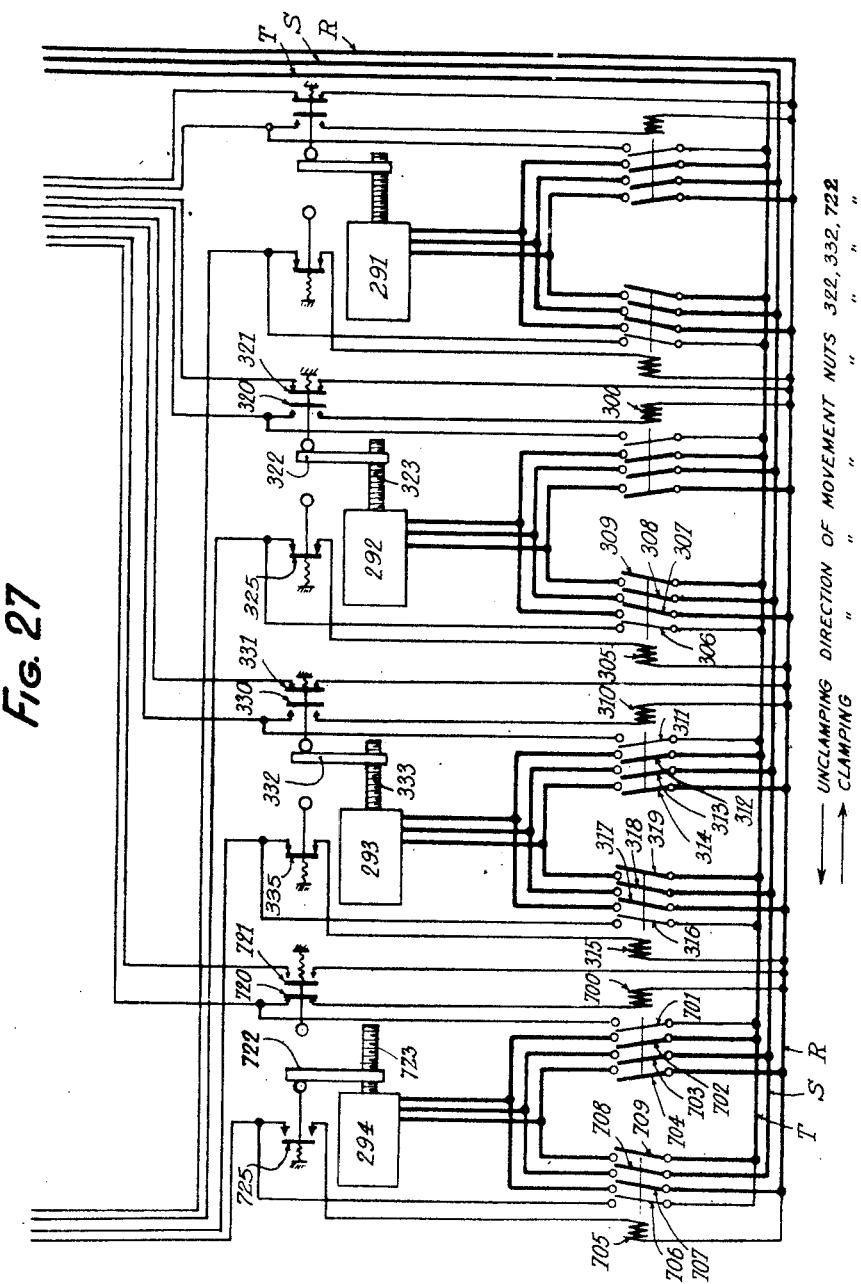

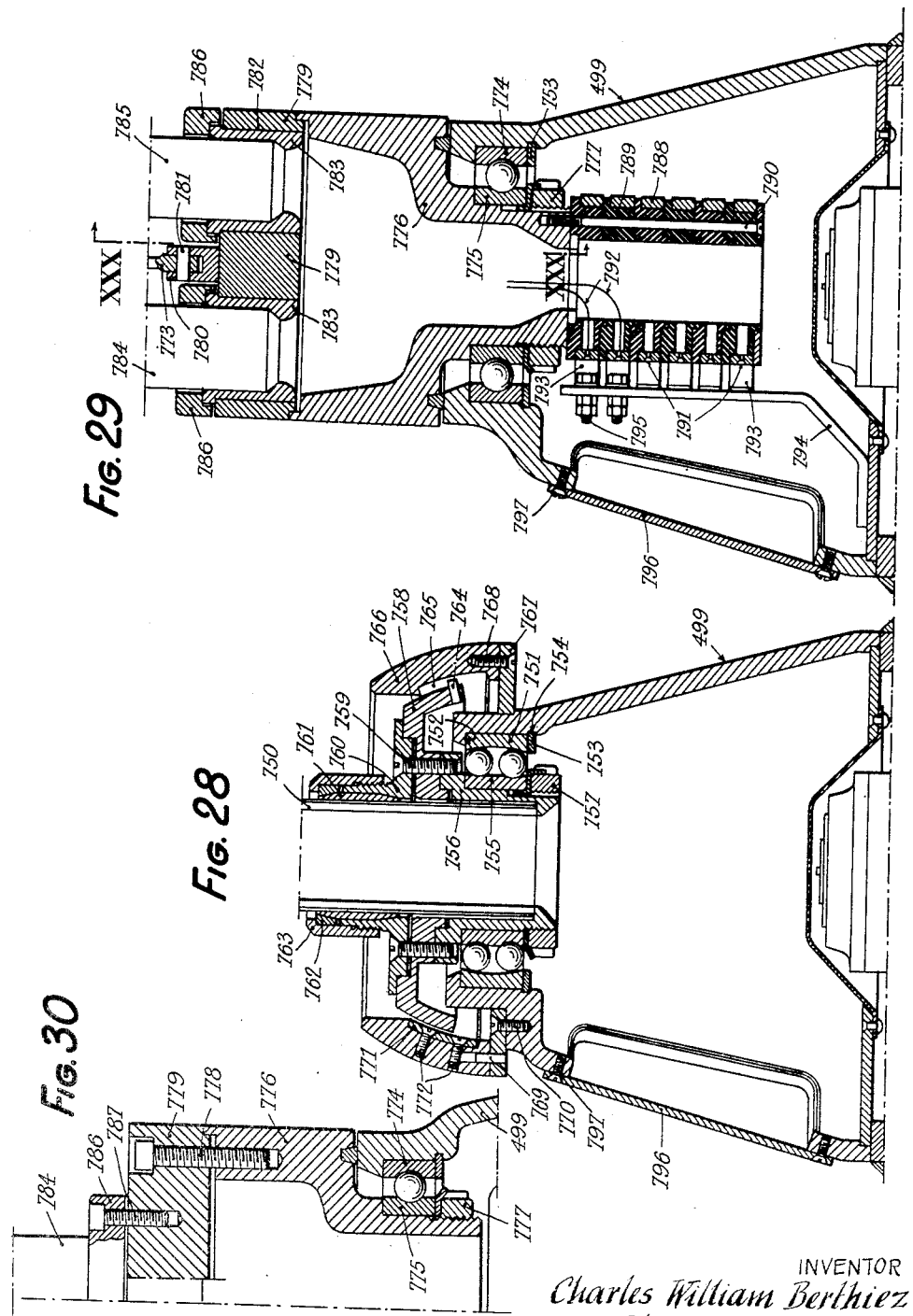

United States Patent Office 2,700,313
Patented Jan. 25, 1955

2,700,313

APPARATUS FOR CONTROLLING THE MOVEMENT OF MOVABLE MEMBERS OF MACHINE TOOLS OR THE LIKE

Charles William Berthiez, Paris, France

Application April 7, 1948, Serial No. 19,454

Claims priority, application France
October 22, 1945

30 Claims. (Cl. 77—1)

This invention relates to apparatus for controlling the operation of machine tools, hoisting apparatus and the like. The invention more particularly relates to control panels or control boxes or the like associated with apparatus and devices for effecting control of the movable members of such machines, especially when such movable members are driven by electric motors.

It has been proposed heretofore to control movement of a movable member of a machine by so-called remote control from a given station. For this purpose electric control circuits have been utilized provided with relays controlled by contacts actuated by push buttons or other devices located at the station for energizing or de-energizing the relays, these relays being effective to initiate and to control the energization and speed of a suitable motor connected to the member to be moved for effecting the desired movement thereof. More recently it has been proposed in connection with the operation of machine tools to mount the control push buttons on a control box or control panel suitably supported for movement about the machine to be operated so that the operator of the machine may carry out the controls from a position more conveniently located with respect to the member of the machine to be moved and the function which it performs than is possible when a control box or panel is located in fixed relation to the machine at a given station. Such portable control boxes or panels of the prior art may have the advantage of convenience in carrying out the control operation and of making possible closer inspection of the operation to insure greater accuracy of the machine operation and less physical fatigue of the operator in not being required to move frequently about the machine, especially in the operation of large machine tools or the like, and other advantages. Nevertheless, with the control devices heretofore proposed, by virtue of the fact that the large number of push buttons and other elements required to be actuated by the operator have been assembled in close relation in order to limit the size of the control panel or box, careful attention to the control panel is required, whether it be on a portable box or one stationary at a given station, in order that the operator may know what buttons or other elements are to be or have been actuated and, therefore, what members of the machine are to be controlled or are conditioned for control and for movement thereof. Such careful attention to the panel or box and the control elements carried thereby to distinguish with certainty one element from the other detracts from the attention required to be given to the machine itself, the member thereof to be moved, the tool carried by such a movable member and the work piece upon which it is desired that such tool shall operate. Moreover, in the devices of the prior art where a substantial number of members of the machine are required to be moved each in a plurality of directions, as in a machine tool, the number of the control elements required to be operated has been so large that the number of selections to be made complicates seriously the operations necessary to carry out the control and increases greatly the attention required of the operator for this purpose.

It is an object of the invention to provide in either a stationary control panel or box or in a portable control panel or box a simple combination of control elements so arranged therein that by mere inspection and usually at a glance the operator can immediately have an accurate visual indication of the members of the machine to be operated or in actual operation and the functions thereof which are to be or are being carried out.

It is another object of the invention to provide in such a control panel or box for visual indication of the movable member of the machine required to be moved, the direction of the movement thereof and the released or unreleased condition of this member for such movement or restraint of the member against movement, as well as the speed at which such movement is about to take place or is actually taking place.

It is a further object of the invention that such visual indication shall be so closely associated with the actual member of the machine the movement of which is to be accomplished that mistake in selection or control will be obviated.

Another object of the invention is to provide for the visual indication above referred to while utilizing only a limited number of control elements required to be operated so that the operator has only to consider a few such elements for performing all the necessary control operations of even a complicated machine having a plurality of members respectively movable therein in different ways.

A still further object of the invention is to provide a compact control device, especially in a portable control box, which is easy to move about the machine and is convenient to the hand for controlling the operations of the machine.

A still further object of the invention is to provide for easy selection of the member of the machine to be moved and for visual indication to the operator of the member selected and of the direction of movement of this selected member.

It is an important feature of the invention that the control panel or box, whether in the form thereof which is supported to be movable about the machine or in the form adapted to be stationary at a given station fixed in relation to the machine, shall be provided with a pictorial representation of the machine and of the several members thereof which are movable therein in the relation to each other and to the fixed members of the machine as they actually exist in the machine. This pictorial representation is so drawn on the panel or front face of the control box that the relations of the several members which it is desired to control are clearly presented to the eye and the paths which such movements, both forward and return, of the reciprocatable members are intended to take place are unmistakably shown to the operator. Thus, for example, the box or panel may have depicted on the face thereof a machine tool, such as a boring and milling machine, in which a vertically disposed column or upright is movable to and fro horizontally upon a bed, this column supporting a carriage for vertical movement upwardly and downwardly on the column, this carriage carrying a headstock or the like supported on the carriage for movement of this headstock horizontally to and fro transversely of the vertical movement of the carriage. Such a depicted representation of the boring and milling machine also includes a representation of the table for carrying the work piece and reciprocatable on its bed with which work piece a tool supported on the headstock, for example, is brought into engagement upon movement of the table along its bed horizontally forwardly or reversely transversely of the parallel horizontal movements of the column and of the headstock.

In order to present to the eye of the operator clearly the machine tool and the several movable members thereof and their paths of movement, preferably the pictorial representation of the machine is in the form of a perspective drawing made in such a way that at least the outline form of the several members and the respective paths of movement of these depicted members are clear in a single representation. Moreover, the pictorial representation is made so that indicators may be drawn thereon or mechanically formed in the panel which clearly are associated respectively with the depicted members of the machine tool which are to be moved and with their paths of movement for indicating the lines of movement of the respective members and the directions of forward and reverse movement of each of the members in the respective paths of movement. These indicators preferably are of linear form disposed in pairs in opposed relation in each pair with respect to a given point hereafter referred to as the "origin" which is clearly associated with the member of the machine tool to which the respective indicators relate. These points of origin represent locations on the panel corresponding respectively to the actual movable members of the machine tool but associated with the depicted movable members so that the visual information given to the operator is real and concrete rather than in abstract symbols. The indicators extending oppositely from the respective origins represent the relative directions of the reciprocating movements of the respective machine tool members in their paths.

It is another important feature of the invention that a selector is provided on the face of the panel or box which is movable thereover in relation to the depicted representation of the machine and of its movable members selectively to positions which are in predetermined relation to the locations of these depicted movable members in the representation of the machine. This selector also is formed to indicate the selected member, one of the four movable members of the boring and milling machine in the above example, and is supported in such relation to the pictorial representation of the machine tool and the origins of direction of movement above referred to that the selector when moved to a given position will indicate only the selected movable member. In the particular embodiment hereafter described this selector is supported on the box or panel exterior to and for rotation thereof on an axis perpendicular to the face of the panel or box and may be in the form of a pointer or arrow which may be rotated to positions in which the arrow points to the origins associated respectively with the machine tool members depicted on the panel. Control devices are operatively connected to this selector element for establishing the operative connection to the motors driving the movable members, preferably by a system of electrical controls for controlling reversible direct current electrical motors for effecting forward and return movements of these members of the machine tool.

In another feature of the invention in one aspect thereof furnishes means associated with the member selector for establishing the directions of movement of the selected member. In another aspect means are associated with each depicted member for establishing the direction of movement of the selected member. It is an associated feature, upon selecting the machine tool member to be moved by setting of the selector element and establishing the direction of the movement thereof by the means above referred to, that a linear indicator extending in the corresponding direction from the origin associated with the selected member depicted on the panel or box becomes activated, in the first aspect by the lighting of a lamp to illuminate a window in the form of the linear indicator. When, therefore, the selector is rotated so that the arrow points to the depicted member to be moved and the means associated with this selector for selecting the desired direction for such movement is actuated and the direction indicated, there will be a clear visual representation to the operator on the face of the panel both of the member which is to be operated or is operating and the direction of movement thereof. In the second aspect the means associated with each depicted member for establishing direction of the movement itself may be in the form of a pointer or arrow, preferably rotatable on an axis perpendicular to the face of the panel to the two positions indicating the opposite directions of movement of the selected member. In said second aspect, the movable members of the machine may be represented by other means than the pictorial representation above referred to.

Moreover, as will be understood from the description to follow in connection with the drawings means are provided for insuring that only the selected movable member is moved and that the movement takes place only when the member is free to move, i. e. is not locked or clamped in position and that it takes place in the selected direction. Indicators may be provided on the control box which are associated with the depicted movable members and their respective direction indicators to indicate the condition of the movable member as to whether it is free to move or is held against movement by clamping means provided for this purpose.

It will be understood from the above general description that for selecting the member to be moved and the direction of its movement and for representing the condition of such member with respect to such movement only very few elements are required to be actuated by the operator of the machine. For this reason in the device of the invention the depicted movable members may be clearly distinguishable without close inspection and attention by the operator but may be positioned sufficiently close together and in relation to the selector element and the means operable to determine the directions of movement which are exterior to the face of the panel and closely related to the direction of movement indicators so as to provide a compact control box. The member selector element itself may carry the push button or other means for effecting the selection of the direction of movement. Such cooperation of these two means makes possible the selection of any of the movable members for movement thereof and the selection of the direction of movement thereof requiring the attention of the operator only to the place on the panel where the pivoted selector element is located, this element itself directing attention to the origin associated with the selected movable member depicted on the panel by pointing to this origin and the indicators associated therewith. As will be more clearly understood from the description to follow in connection with the drawings, preferably the indicators showing that the respective members are unclamped are located at the origins which are associated with the respective depicted members. In the second aspect above referred to the direction selectors being located at the origins for each movable element are indicated to the operator by the movable member selector when moved to selecting position.

The control panels of the invention also provide for operation of the machine tool members, hereinafter called "automatic operation," in accordance with predetermined settings of the control apparatus including the settings of speed control devices, preferably rheostats for controlling the speed of the direct current motors driving the respective movable members. In such "automatic" operation provision is made for moving the respective members at a plurality of different speeds each of which may be adjusted to suit the required conditions of the operation of the tool on the work piece. In the particular embodiments of the invention hereafter described in connection with a boring machine control devices are provided operable from a stationary panel as well as from a portable box for effecting movement of the member selected by the setting of the selector element in the direction determined by the operation of the direction selecting means as above described at three speeds, namely the speed of "engagement" which may be the speed suitable for engagement of the tool with the work piece, the "working" or "cutting" speed which may be greater than the speed of engagement and a "fast" speed which may be the maximum speed at which it is desirable to operate the movable member for producing movement thereof when, for example, the tool is out of engagement with the work piece. Control means, such as push buttons activating contacts in electric control circuits, may be utilized for starting the movement after completion of the setting of the various control devices and for stopping movement at any moment either from the stationary control box or from the portable control box. Control means also are provided for effecting "quick return" movement of the movable member of the machine from an advanced position to which it has been moved forwardly in a given direction to return this member to its initial position. Such "quick return" movement may be effected at a predetermined speed and without the necessity of changing the setting of the member selector and the direction selecting means. The forward movement of the selected member, therefore, may be repeated upon restarting of the motor under the control of a starting element or button.

In the embodiment hereafter described the portable box also is provided with "manual" means for controlling the speed of the movement of the selected member and for varying this speed at will throughout the range of speeds available for driving the selected member. Interlocking means also are provided for preventing the operation of the "automatic" control above referred to when controlling the movement of the movable member of the machine from the portable control box by means of this control device for securing variations of the speed at will.

The invention also provides a portable control box of compact construction having the features above described and others which will be described in connection with drawings which may be flexibly supported for movement about the machine and upwardly and downwardly and which provides in addition for rotation of the box on a vertical axis so that the operator may move the box into the most convenient position for inspecting the work while having the box and the pictorial representation carried thereby conveniently in visual range.

Other objects and features of the invention will appear from the following description taken in connection with the drawings which show two general embodiments of the control system which may be associated with both a stationary control panel or box and a portable control box. Moreover, certain structural features of the control boxes, particularly the portable control box, which constitute improvements upon the prior art devices will be understood from the description to be given in connection with these drawings in which:

Fig. 1 is a front elevation of a movable control box according to one embodiment of the invention;

Figs. 2 and 3 are views in side elevation of the control box of Fig. 1;

Fig. 4 is a section on line IV—IV of Fig. 1;

Fig. 5 is a section through line V—V of Fig. 3;

Fig. 6 is a front view of a stationary control box according to one embodiment of the invention;

Figure 18:
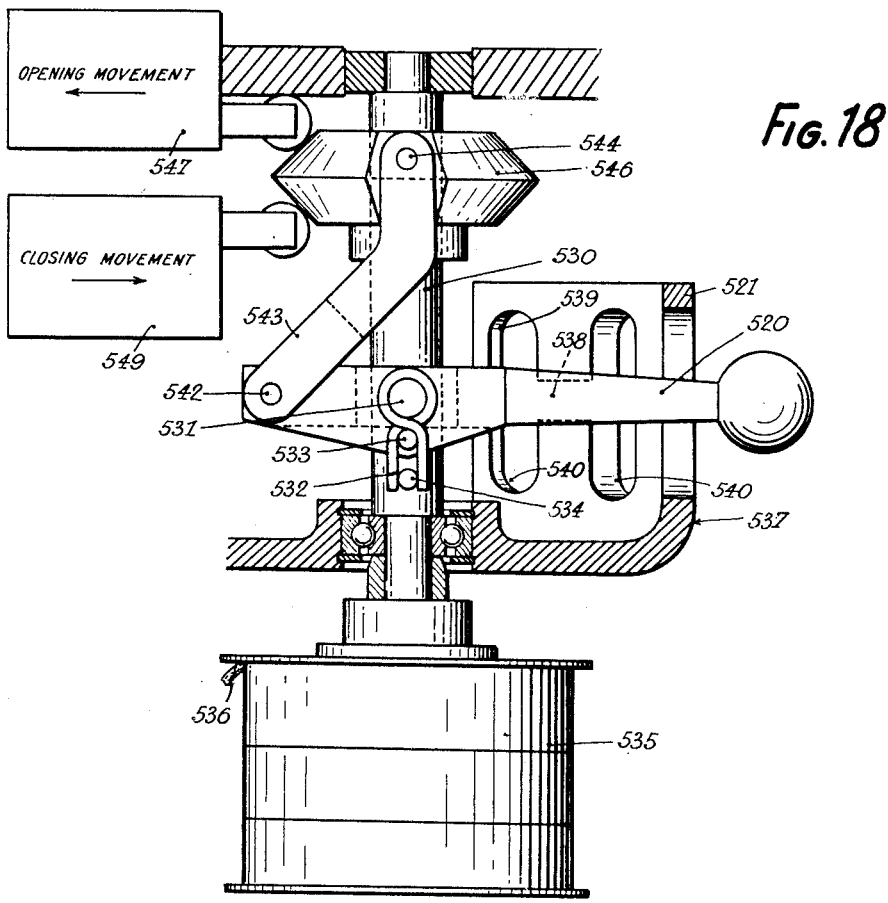
Figure 19:
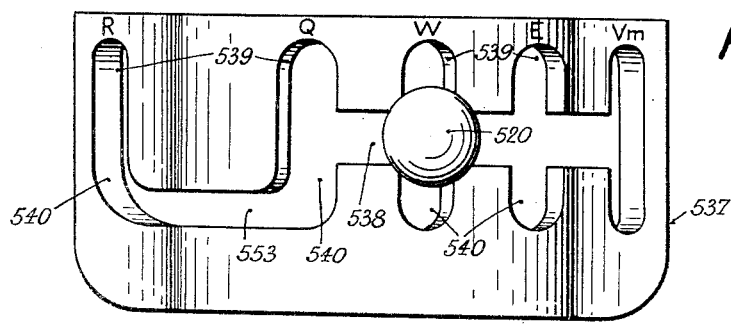
Figure 20:
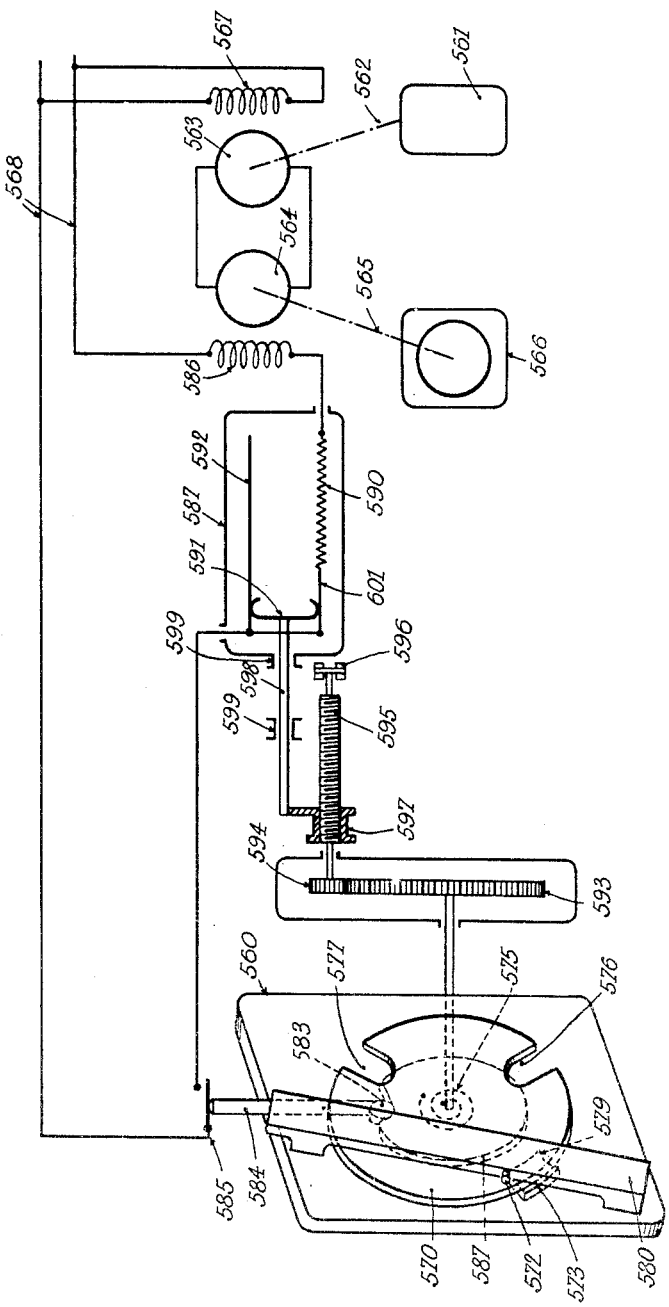
Figure 21:
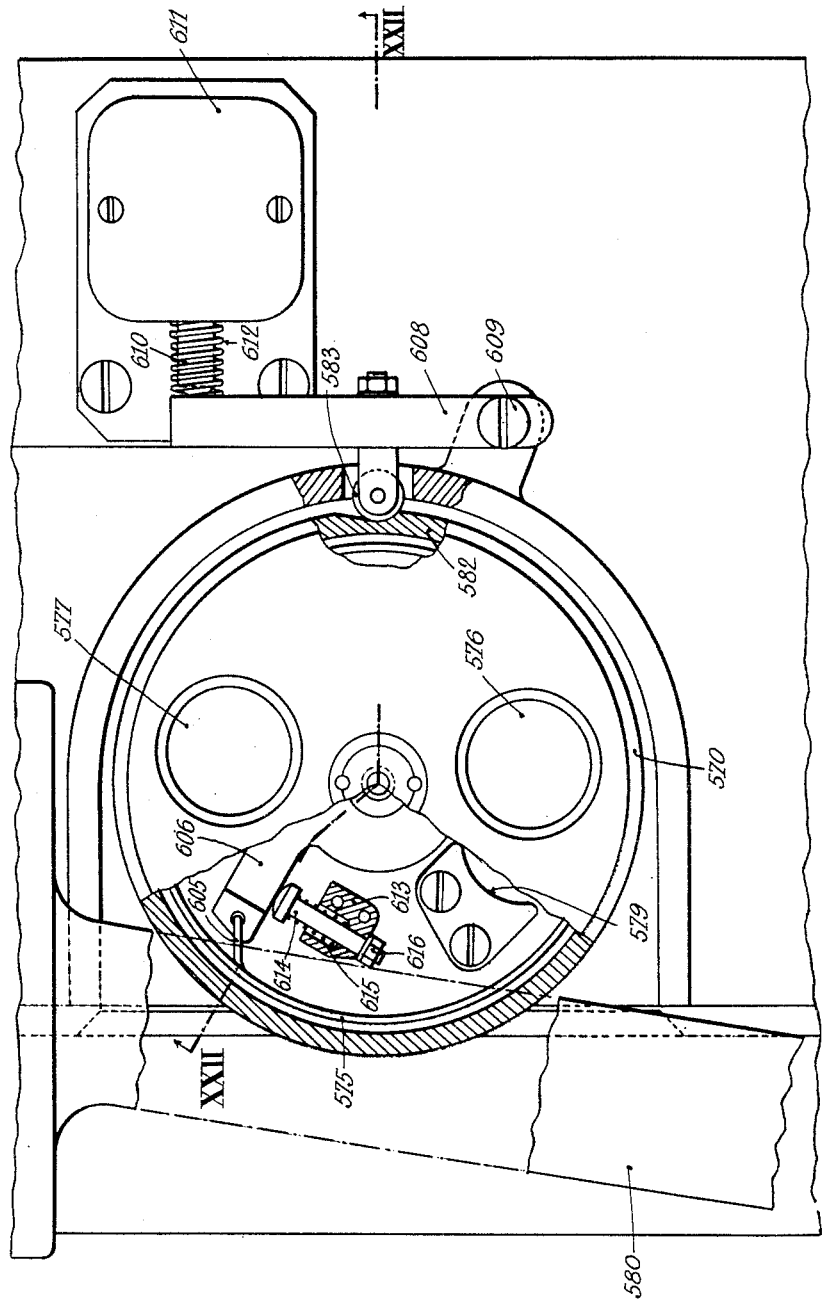
Figure 22:
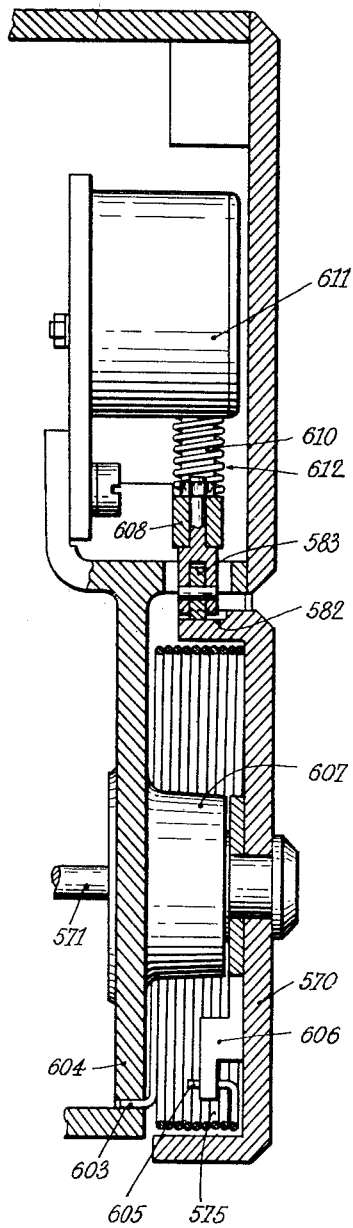

Figs. 7 to 12 inclusive taken together show a wiring diagram corresponding to the embodiments of the invention shown in the Figs. 1 and 6;

Fig. 13 is a front view of a movable control box according to another embodiment of the invention;

Figs. 14 and 15 are side elevation views of the movable control box shown in Fig. 13;

Fig. 16 shows the positioning device of the selector for selecting the member of the machine to be moved used in the embodiment of the invention shown in Fig. 13;

Fig. 17 shows the positioning device of a direction selector used in the embodiment of the invention shown in Fig. 13;

Fig. 18 is a sectional view of a combined speed and direction selecting means operated by a control lever;

Fig. 19 shows a modification of the grid used in the selecting means shown in Fig. 18;

Fig. 20 is a diagrammatic representation of one embodiment of a manual control device for controlling the movement of a movable member of a machine;

Fig. 21 is an external view in elevation of the manual control device shown in Fig. 20, with certain parts broken away and other parts shown in section;

Fig. 22 is a section on line XXII—XXII of Fig. 21;

Figs. 23, 24, 25, 26 and 27 inclusive taken together show a wiring diagram corresponding to the embodiment of the invention shown in Figs. 13 to 32 inclusive;

Fig. 28 is a vertical section of the universal joint suspension means of the movable control box shown in Figs. 13 to 15; this section being taken along line XXVIII—XXVIII of Fig. 31;

Fig. 29 is a modification of the suspension means shown in Fig. 28;

Fig. 30 is a semi section on line XXX—XXX of Fig. 29;

Fig. 31 in the left-hand part is a section on line XXXI—XXXI of Fig. 14 and in the right-hand part is a section on line XXXI—XXX—I of Fig. 15;

Fig. 32 is a horizontal section on line XXXII—XXXII in Fig. 31.

I will first describe a first embodiment of my invention which is illustrated in Figs. 1 to 12 inclusive. The device shown in these figures comprises a pendant control box, Figs. 1 to 5, and a stationary control box represented only by a front panel, Fig. 6.

This control device will be described in its application to a boring machine as shown in pictorial representation on the engraved plate in Figs. 1 and 6; but it will be understood that the invention is in no way limited to such an application and that the control boxes of this invention may be applied to quite different machines such as machine-tools of another kind, equipment for hoisting and handling, etc.

The pendant control box shown as an example in Figs. 1 to 5 comprises a body 1, preferably a light metal alloy casting provided with a handle or grip 2 similar to a revolver grip.

On the front panel 3 of the body is a pictorial representation showing a simplified perspective view of the boring machine.

The several feeding movements of the movable members of the machine, horizontal movement of spindle 5 and headstock 8 longitudinal feed, upward and downward movement of the carriage 7 carrying headstock 8, cross travel of the column 6 and translational movement of the table 9 are respectively represented by two colored luminous indicators 11 and 12, one say blue and the other yellow, in the shape of lines drawn oppositely from a so-called "origin" point 13 associated with each depicted movable member. These two lines represent with respect to the origin point 13 the two opposite directions of movement of the movable member of the machine with which they are associated. It is a feature of the invention that these two lines are drawn along a direction which is parallel to the direction of travel of the associated movable member as depicted on the panel 3.

The origin points 13 mentioned above are preferably also illuminated and serve for showing whether the selected movable member is clamped in position or is unclamped for movement thereof. They could serve for the indication of any other operation relating to the movable member selected.

A rotary switch having a manually operable element or handle 15 and which may be of the construction described in my copending application Serial No. 651,022 filed on February 28, 1946, now U. S. Patent No. 2,545,837, for "improvements in manually operated commutator for machine tools or the like" may be suitably supported within the box 1. The selector handle 15 of this switch is pivotally supported adjacent the outer face of the panel 3 in such position that it may be rotated to any one of four positions corresponding respectively to the four members the feeding movements of which are shown on the pictorial representation of the machine.

The switch handle 15 is preferably in the shape of an arrow which may be oriented towards the origin point 13 corresponding to the selected movable member to be moved.

One of the two push buttons 16 and 17 which are carried by the switch handle 15, as disclosed in said application Serial No. 651,022, now U. S. Patent No. 2,545,837, may be colored yellow and the other blue. The selection of the direction of the feed is obtained by pressing the button whose color corresponds to that of the line which extends from the origin 13 in the direction of travel selected for the movable member selected by rotating the selector 15 to the position with its arrow pointing to the depicted selected member.

The front of the casing 1 also is provided with an engraved plate 19 located below the panel 3 that carries the pictorial representation carrying words or indicia identifying the three push buttons 21, 22 and 23 associated with this plate for the control of the start (feed), stop and quick return movements respectively.

Below the plate 19 at the left in Fig. 1, the casing 1 of the portable box is provided with an extension 25 which carries illuminated push buttons 31, 32 and 33 controlling respectively "engagement" feed, that is, the operation of a selected member at a speed suitable for engagement of a tool with the work piece; the "working" feed which may be that corresponding to the operation of a tool upon the work piece at cutting speed and the quick traverse or "fast" speed corresponding to movement of the tool while out of engagement with the work piece.

On the side face of the control box as shown in Fig. 3 are provided four push buttons 41, 42, 43 and 44 for controlling the unclamping of the member which is to be moved and four push buttons 45, 46, 47 and 48 for controlling the clamping of the member which is to remain at standstill. All these buttons, although in the particular embodiment being described they are supported at the side face of the box, respectively are located substantially level with the "origin" point belonging to the representation of the corresponding movable member depicted in the pictorial representation on panel 3 of the movable members of the machine. These push buttons, therefore, are respectively associated with the movable members as if they were located immediately adjacent the respective origin points 13.

On the right hand side face of the pendant box and above the handle or grip 2 are arranged two push buttons 50 and 51 shown in Fig. 1 projecting slightly at the right for setting into operation either the pendant control box or a stationary control box located elsewhere, for instance on the machine itself as hereinafter disclosed.

Above the grip 2 and at the left thereof in Fig. 1 a trigger 55 is supported for varying at will and in continuous manner the rate of the feed or the speed of the movement of the member selected. The trigger 55 may be actuated by the forefinger of the hand so that the speed increases and decreases in proportion to the pressure exerted upon the trigger. To this end this trigger may be arranged to actuate a control device similar to that described in my copending application Serial No. 587,778 filed on April 11, 1945, now U. S. Patent No. 2,516,043, for "Improvements in Portable Control Set for Machine Tools and Hoisting and Lifting Apparatus."

As shown in Fig. 3, on the side face of the casing 1 at the left in Fig. 1, that is, at the opposite face from that at which the operator stands to actuate the trigger 55, is a lighting device 56 with a parabolic reflector that allows the operator to light up the area where the tool is working, for instance the inside part of a bore, particularly for delicate adjustments of the tool, while the operator is able at the same time to control the speed of movement of the selected machine tool member by means of the trigger. A light switch 57 is located below the reflector.

Referring now to Fig. 4 it will be seen that the panel 3 is formed with openings which may be of elongated form to provide the direction indicating lines 11 and 12 above described in the pictorial representation of Fig. 1. Behind each opening is a signal or pilot lamp fitted in a socket 58. All the sockets themselves are fitted in housings supported within the casing 1 of the control box.

The various buttons and knobs as well as the selector 15, the parabolic reflector of the lighting device 56 and its switch 57 are fitted into or carried by the walls of the casing or box 1. All these parts project inside the casing where are also to be found:

(a) The transmitter or generator 60 of a transmitter-receiver synchronizing system which may be of the type described in my French Patent No. P.V. 497,616 (number of application) of March 23, 1945, for "Control Device for the Changes of Speed in Motors." The shaft of the transmitter 60 carries a bevel pinion 61 (Figs. 4 and 5) which engages a toothed sector 62 rigid with the trigger 55. Pressure exerted upon the trigger effects rotation of the shaft of the transmitter 60, thereby effecting operation of the receiver which controls the adjustment of the speed control device which determines the rate of feed or movement of the movable member. The trigger 55 is biased to its original position by a spring 63.

(b) Three relays 71, 72, 73 (Figs. 5 and 8) which are respectively adapted for selecting the "engagement" feed, "working" feed and "fast" speed as determined by the actuation of the selected push button 31, 32 or 33.

(c) A terminal plate 64 which serves for connecting the various wires which are brought into the box 1 through the metallic sheath or conduit 65 to the different electric devices enclosed in the control box.

The suspension of the box 1 is accomplished by this metallic sheath 65 which is gripped between a collar 66 and a bracket 67 secured to the movable box in such a manner that the junction flange 68 of the sheath does not carry the weight of the pendant control box.

The control box 1 that has just been described permits great ease in machine tool operation, especially on large machine tools, for it allows the operator to control, while standing close to the area where the tool is working, most of the preparatory work and the machining operations, thus affording every opportunity for closely supervising the work.

Owing to its small size and special design this portable control box makes it possible for the operator thus to control all the preparatory and machining operations which ordinarily are controlled from a stationary control box which is mounted in a fixed position on the machine and, therefore, frequently removed at such a distance from the work that proper inspection is impossible while manipulating the controls.

In addition, however, this pendant control box provides means for controlling the operation of an "automatic" cycle which may be initiated by the operation of the push buttons and may be stopped at any moment and the machine again set under hand control. It also makes it possible to vary continuously the speed of the movement selected.

The parabolic reflector allows the area where the tool is working, for instance a bore, to be lighted up for inspection purposes. The equipment is easy to grasp by the hand, and because of its reduced size and comparatively light weight may be readily handled and shifted.

In Fig. 6, I have shown a panel 80 mounted on the stationary control box. The general character of this control box is very much the same as that of the portable box 1 hereinabove described with the following exceptions. As the box is stationary it need not carry any lighting arrangement. The "origin" point of the lines showing the directions of movement of the different machine members, instead of being mere luminous points, as in Fig. 1, are constituted respectively by control push buttons 81, 82, 83, 84 preferably illuminated respectively by lamps 351, 352, 353, 354, Fig. 11. These push buttons in this embodiment are adapted to control means for unclamping the selected member to be set in motion. They are arranged in locations on the panel 80 so as to be associated with the respective movable members of the machine depicted on the panel. The push button to be pressed for effecting unclamping of the selected movable member to permit movement thereof, therefore, is easily visually identified by the operator.

Along the right hand vertical edge of the pictorial representation on the panel 80 are arranged four push buttons 91, 92, 93, 94 respectively on the same level with the four push buttons 81, 82, 83, 84 and adapted to control the clamping of the members which are to remain at standstill. Thus, although for reasons of construction in this embodiment the push buttons 91, 92, 93 and 94 are not located precisely at the respective origins as are the push buttons 81, 82, 83 and 84, they are respectively associated with the movable members as are push buttons 81, 82, 83, 84 so that clamping may be easily effected on completion of the movement.

The panel 80 supports adjacent the face thereof a selector 95 corresponding to the selector 15 of the portable box 1. The selector 95 as is the selector 15 is of arrow shape and is pivotally movable over the face of the panel 80 to four different positions in which the arrow respectively points to the origins, that is, the luminous push buttons 81, 82, 83, 84, respectively identified with the four movable members 6, 7, 8, 9 of the machine. The control system hereafter described in connection with Figs. 7 to 12 inclusive includes a rotary switch operated by the selector 95 for selecting the member of the machine to be moved to the pictorial representation of which the selector 95 points.

The selector 95 carries two push buttons 96 and 97 similar to the push buttons 16 and 17 and cooperating in the system therewith for selecting the direction of movement of the member selected to be moved. As will be understood from the description in connection with Figs. 7 to 12 inclusive the push buttons 16 and 96 serve to determine "forward" movement of the selected member for all four of the members 6, 7, 8, 9 and the push buttons 17 and 97 serve to determine "return" movement of these members.

Three push buttons 101, 102, 103 on this stationary panel provide for the different feeds, viz: "engagement" feed, "working" feed and "fast" feed corresponding to the push buttons 31, 32, 33 on the portable box. As will be more particularly described in connection with Figs. 7 to 12 inclusive the pressing of these buttons 101, 102, 103 selects the field resistance to be cut into the circuit for effecting operation of the motor driving the selected member at the speed which will produce the selected feed.

The feed is initiated or "clutched in," that is, the motor is energized, however, only by pressing a push button 105 marked "on" for starting and stopped or "clutched out" by pressing another push button 106 marked "off." The "quick return" is controlled by a push button 107 marked "R."

Furthermore, on this panel two revolving knobs 110 and 111 have been provided for the adjustment of and for indicating on corresponding dials 112 and 113 the "engagement" and "working" feed speeds respectively. The devices which these knobs control may be of the type described in the French Patent No. 497,616 mentioned hereinabove. These knobs in contrast to the function of the trigger 55 of the pendant control box operate their control devices to determine and maintain speeds of feed respectively indicated by the dials associated therewith.

However, it should be remarked that within the scope of the invention more than two knobs and their respective control devices may be used to secure more than two predetermined speeds or only one such knob and control device may be used according to the type of machine or equipment to be controlled.

In the wiring diagram shown in Figs. 7 to 12 inclusive all the members of the stationary control box hereinabove generally described with reference to Fig. 6 are contained in the frame bearing the reference A while all the members carried by the portable control box hereinabove described with reference to Figs. 1 to 5 inclusive are contained in the frame B for the front view and C for the side view.

The four movements each in two directions which can be carried out on the machine pictorially represented on each of these control boxes are controlled respectively by the selectors 15 and 95 which are movable to four different positions corresponding to the locations on the panel of the depicted movable members of the machine tool.

(a) The horizontal right of left movement of the upright or column 6 carrying the carriage 7 and the headstock 8;

(b) The vertical upward and downward movement of the headstock supporting carriage 7 along the upright;

(c) The horizontal right or left movement of the headstock 8 or of the spindle 5 relative to the carriage;

(d) Forward or rearward horizontal movement of the work piece holding table 9.

These four movements in the particular apparatus disclosed in this application are effected by means of reversible D. C. feed motors 115, 116, 117, 118 driving respectively the column 6, carriage 7, headstock 8 and table 9, the speed of these motors being varied through variations in the voltage supplied to their armatures from a D. C. generator 120 according to the known principle of the Leonard group.

This Leonard group in the particular embodiment disclosed comprises a three phase induction motor 119 fed from the three phase supply R S T, this motor being mechanically coupled with the D. C. generator 120 and an associated D. C. exciter 121.

Each of the elements provided in this electrical installation is briefly outlined hereafter, this description being followed by a summary of the operating buttons, relays and switches as well as a complete disclosure of the operational sequence carried out by operation of the control apparatus.

The field winding 123 of the generator 120 is fed by means of the exciter 121 through a circuit which includes reversing switches and a special rheostat which presently will be referred to.

Examination of Figs. 7 to 12 inclusive relative to Figs. 1 to 6 inclusive will show the corresponding location in the wiring diagram of Figs. 7 to 12 of the contacts of the selectors 15 and 95 and the lamps illuminating the origin points and the direction indicators.

The feed motors 115, 116, 117 and 118 have their armature windings connected in parallel with each other to the armature of the generator 120. The selective connection of these motors is controlled initially by the setting of the selector 15 or of the selector 95 through the relays 130, 131, 132, 133 respectively associated with motors 115, 116, 117, 118 for operating contacts 135, 136, 137, 138 for closing the circuits to the armatures of the respective motors and for operating contacts controlling the circuit to the lamps of the direction indicators 11 and 12 respectively associated with the depicted movable members as more fully described hereafter. The field windings 134 of these motors are directly connected in parallel with each other to the exciter.

The forward and reverse movements of the four movable members 6, 7, 8, 9 above referred to are controlled according to three main steps of control operation, viz. the selection of the member to be moved, the choice of the direction of movement thereof and the determination of its speed. The operation of the system as shown in Figs. 7 to 12 inclusive will now be described in these steps.

Figure 11:
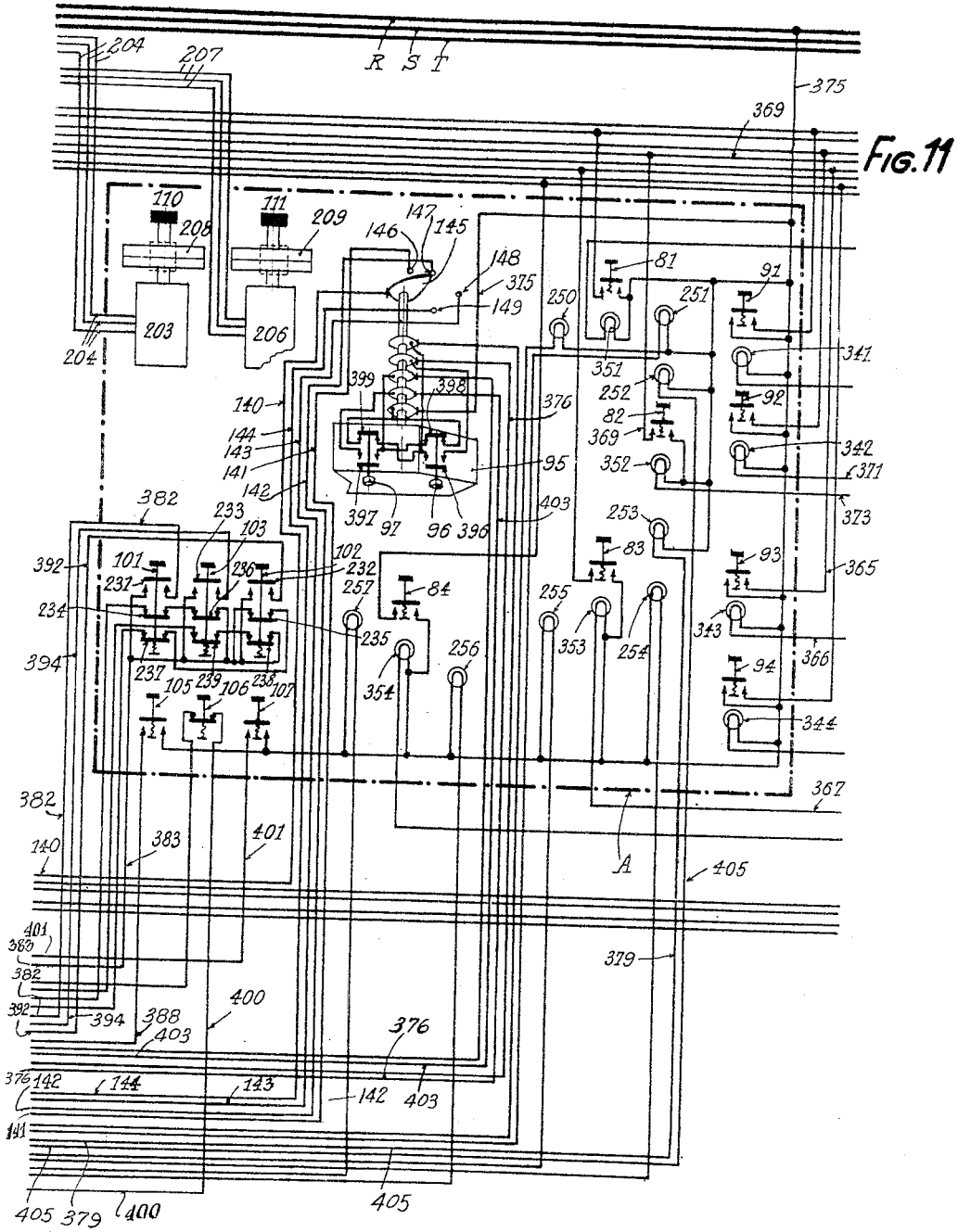

*Selection of the member to be moved.*—On the stationary control box 80 carrying the operatable elements shown within the rectangle A in Fig. 11 the member to be moved is selected by means of the arrow-shaped selector 95 merely by directing the point thereof toward the representation of the selected member depicted on the panel carrying the pictorial representation of the machine.

As shown in Figs. 7, 8, 9, 10, 11 and 12 the current thereby is directed from the supply line R through the wire 140 and the brush 145 of the selector to that one of the four contact studs 146, 147, 148, 149 into contact with which the brush 145 is brought by movement of selector 95 to the selected position. These studs respectively are connected through the wires 141, 142, 143, 144 Fig. 11 with the winding of the corresponding relays 130, 131, 132 and 133 above referred to for controlling the motors driving the respective movable members.

From the portable control box the machine member to be moved is selected in the same manner by means of the selector 15, the current being led from the supply line R to the wire 150 connected to the brush 155. This brush 155 makes contact with that one of the four contact studs 156, 157, 158 and 159 which corresponds to the position of selector 15 to which it is moved on the panel 3 to indicate the movable member selected to be moved. These contact studs are connected in parallel through wires 151, 152, 153, 154 with the respective contact studs of selector 95 of the stationary control box as shown in Figs. 9, 10, 11.

*Selection of direction.*—For both control boxes selection of the direction of movement of the member selected to be moved is effected by means of the push buttons 96 or 97 (stationary control box) and 16 or 17 (portable control box) arranged on the selectors 95 and 15 respectively. The buttons 96 or 16 correspond to one direction, called "forward" direction, of each of the four movements contemplated and the buttons 97 or 17 to the "reverse" direction.

The direction of rotation of any of the four feed motors 115, 116, 117, 118 corresponding to the direction of movement of the member involved results from the energization of one of the four direction relays, viz: relay 160 for the forward rotary direction controlled from the portable control box and having four front contacts 161, 162, 163, 164, relay 165 for the reverse rotary direction also controlled from the portable control box and having four front contacts 166, 167, 168, 169, relay 170 corresponding to the forward direction controlled from the stationary control box and having four front contacts 171, 172, 173, 174 and relay 175 corresponding to the reverse direction controlled from the stationary control box and having four front contacts 176, 177, 178, 179. The contacts 161, 166, 171 and 176 are holding contacts, contacts 162 and 163, 167 and 168, 172 and 173, 177 and 178 are reversing contacts and contacts 164, 169, 174 and 179 control the directional pilot lamps as will be further described. The contacts 162 and 163 of forward direction relay 160 are connected in inverse relation to the circuits leading to the field 123 of the generator 120 with respect to the connection of contacts 167 and 168 of relay 165 in order to reverse the direction of the energizing current through the generator field winding 123 so as to change the polarity thereof and cause the motors to rotate in the opposite direction. The same is true with respect to contacts 172 and 173 of relay 170 in relation to contacts 177 and 178 of relay 175.

The generator field energizing circuit further is controlled by reversing relay 180 having contacts 181, 182, 183 and 184 for reversing the rotational direction of any of the motors which is in operation by reversing the direction of excitation of the generator field 123 and, therefore, the generator polarity applied to the motor when the "quick return" stroke must be performed. When the relay 180 is energized by operation of push button contact 23 or 107 respectively on the portable box and the stationary panel front contacts 182 and 183 of relay 180 are closed and back contacts 181 and 184 are open, thus changing the connection to the exciter 121 which has been established through the particular contacts of relays 160, 165, 170, 175 as determined by the operation of push buttons 16, 17, 96, 97 on the selectors 15 and 97 as the case may be. The relay 180 is provided with holding contact 185, rheostat short circuiting front contact 186 and main control back contact 187 for the circuits of the relays for "engagement," "working" and "fast" speeds for the forward movement.

*Speed selection.*—The speed of the feed motors 115, 116, 117, 118 which respectively move the members as selected by the position of the selector 95, Figs. 6 and 11, is determined by the voltage generated by the generator 120 which, in turn, is controlled through its excitation current by means of the rheostat 190 interposed in series in the circuit from the exciter 121 to the generator field 123. This rheostat 190 comprises three sliders 191, 192, 193 which respectively are moved along the rheostat 190 upon rotation of screws 194, 195, 196.

The slider 191 is moved by the receiver or motor 200 of the transmitter-receiver synchronizing system of which the transmitter or generator 201 is operated by means of the trigger 55, Fig. 9, of the portable control box to produce at will any speed of the motor driving the selected member within the range of speeds for which the apparatus is designed from starting to the maximum speed by moving the slider 191 along the rheostat 190 from one end to the other.

In Fig. 9 the trigger 55 on the portable control box is shown with a segment gear 62 meshing with a pinion 61 which may be fastened on the shaft of the transmitter 201, this transmitter being connected through wires 197 to the receiver 200. The screw 194 for adjusting the rheostat slider 191 will be rotated in proportion to the angular movement of the trigger 55, thereby determining the position of the slider and the speed of the motor driving the movable member in proportion to the movement of the trigger 55.

The slider 192 corresponding to "engagement" speed is moved by screw 195 driven by motor 202 which is energized by the transmitter 203 through wires 204 when the knurled knob 110 on the panel of Fig. 6 is rotated.

The slider 193 corresponding to "working" speed is moved by screw 196 driven by motor 205 which is energized by transmitter 206 when operated by the knurled knob 111 of panel 80, Fig. 6. The transmitter 206 is connected through wires 207 with the receiver 205. The sliders 192 and 193 of the rheostat thus may be moved to respective positions on the rheostat resistance which determine values of the excitation current of the generator field 123 to secure respectively a relatively low speed of the motors 115, 116, 117, 118, as the case may be, for "engagement" of the tool with the work piece and a relatively higher speed for "working" or cutting when the tool has been engaged. Both transmitter-receiver systems 203, 202 and 206, 205 may be of any well-known type, e. g. the Selsyn remote control type.

These two last mentioned speeds may be controlled from either control box, by means of push buttons 31 and 101 for "engagement" speed respectively on the portable and stationary panels and by push buttons 32 and 102 for "working" speed respectively on these panels. The degree of speed to be obtained in each case in the particular embodiment being described is determined, however, only at the stationary control box by operation of the transmitters 203 and 206 controlling respectively the receivers 202 and 205. As these speeds accordingly may be predetermined and the rheostat sliders accordingly set before starting operation of the machine by operating the respective transmitters, it is not necessary that the portable box shall carry such rheostat adjusting means. As the receiver rotates synchronously with the transmitter the setting may be made by rotating the transmitter 203 by means of a knurled knob 110 to a particular indicia on dial 112 or on a graduated drum 208 carried on the shaft of this transmitter, the screw 195 producing movement of the slider 192 proportional to the rotation of the drum 208 so that this scale indicates the setting of the rheostat and, therefore, the speed of the motor driving the movable member for "engagement" of the tool. Similarly the scale on dial 113 or on graduated drum 209 carried by the shaft of the transmitter 206 operated by knob 111 indicates the speed of the motor driving the movable member at "working" or cutting speed.

As will be understood from further description in connection with the wiring diagram of Figs. 7 to 12 inclusive, control means also are provided for short-circuiting the rheostat 190 to produce the maximum excitation of the generator 120, thereby to supply the armatures of the motors 115, 116, 117, 118 with the maximum voltage to produce the highest speed of these motors for the "fast" speed and for the "quick return" movement of the movable member.

The "engagement," "working" and "fast" speed as well as the "quick return" stroke may be controlled from either control box respectively by means of push buttons 101, 102, 103, 107 in the stationary control box and 31, 32, 33, 23 for the portable control box. These buttons operate the relays 71, 72, 73 and 180 respectively. The relays 71 and 72 set into operation the sliders 192 and 193 through the contacts 74 and 75 respectively. These contacts short circuit that portion of the rheostat which is shown above the corresponding sliders in Fig. 8 and, therefore, they leave in the generator energizing circuit the remaining portion of the rheostat. The contact 76 will short-circuit the whole rheostat and so will the contact 186 operated by the "quick return" stroke relay 180 to produce the maximum excitation of the generator 45 of the Leonard group and therefore the maximum speed. Each of the relays 71, 72 and 73 is provided with a holding contact 77, 78 and 79. On the other hand, all three relays 71, 72 and 73 are fed through the contact 187 of the "quick return" stroke relay 180 closed when relay 180 is deenergized but opened upon energization of relay 180 so that relays 71, 72 and 73 cannot be energized when said "quick return" stroke is taking place.

The slider 191 provided for determining the speed controlled by the trigger 55 is connected with a contact 211 of the relay 210 energized upon closing of a contact 215 controlled by a cam 217 carried by the trigger 55 when the trigger is pressed with the finger. When the contact 211 is closed the portion of the rheostat 190 above the slider 191 is short circuited and the extent of this portion is determined in accordance with the movement of the trigger 55 as above stated.

Moreover, the field energizing circuit of the generator 120 includes a contact 221 operated to closed position when relay 220 is energized for "automatic" operation, this relay having a holding contact 222. Relay 220 may be energized upon actuation of the button 105 of the stationary control box or upon actuation of the button 21 of the portable control box. Contact 212 of relay 210 which is energized upon closing of contact 215 when trigger 55 is operated is connected in parallel with contact 221 for establishing the circuit to the generator field 123 from the exciter when operation is controlled from the portable box.

A stop button contact 106 in the stationary control box and a stop button contact 22 in the portable control box are provided in series with each other and with holding contacts 185 and 222 for interrupting the holding circuit for the "automatic" operation relay 220 and the "quick return" stroke relay 180, thereby to open the contact 221 to break the generator field circuit and also to open contact 186 and closing contact 187.

Each of the "engagement," "working" and "fast" speed control buttons 101, 102 and 103 in the stationary control box is provided with a front contact 231, 232 and 233 respectively whereby the corresponding relays 71 and 72 for effecting connection respectively of the sliders 192 and 193 may be controlled and the relay 73 may effect the short circuiting of the rheostat in the manner set forth herein above. These push buttons each are provided also with two back contacts, that is, contacts 234 and 237, 235 and 238, 236 and 239 for the respective buttons 101, 102, 103. The back contacts associated with a given button, for example button 101 for energizing relay 71 are connected in series respectively with the back contacts of the other buttons 102 and 103 in the holding circuits respectively of the two other relays 28 and 29 to prevent connection of the corresponding sliders or portions of the rheostat by inadvertent operations of either of the other buttons, i. e. 102 and 103.

It will be understood from an examination of the wiring diagram, particularly Fig. 9, that corresponding to the push buttons 101, 102 and 103 the push buttons 31, 32 and 33 also have front contacts 241, 242, 243 thereof connected in parallel with the contacts 231, 232, 233 described in connection with the push buttons 101, 102 and 103 to control respectively the "engagement" speed relay 71, the "working" speed relay 72 and the "fast" speed relay 73. The push buttons 31, 32, 33 also respectively have back contacts 244 and 247, 245 and 248, 246 and 249 which are connected in parallel with and serve the same purpose as the contacts 234 and 237, 235 and 238, 236 and 239 respectively as described in connection with the stationary panel to prevent energization of the other two relays when one of the relays 71, 72, 73 is energized upon pressing one of the buttons 31, 32, 33 on the portable box.

Each selected movement and the direction thereof are shown by a pilot lamp provided on the stationary control box and a pilot lamp on the portable box. These lamps are provided for the two directions, that is, the "forward" direction and the "reverse" direction, respectively. Lamps 250 and 251 in the stationary control box and 260 and 261 in the portable control box indicate the respective directions for the movement of the upright or column 6; lamps 252, 253 and 262, 263 for the respective movements of the carriage 7; 254, 255 and 264, 265 for the respective movements of the headstock; and 256, 257 and 266, 267 for the respective movements of the table. These lamps are energized through the contact 174 or 179 when the stationary control box is in operation and through 164 and 169 when the movements are controlled from the portable control box and, further, through the contacts 270 or 271 according to the direction of the movement of the upright 6; 272 or 273 according to the direction of the movement of the carriage 7; 274 or 275 according to the direction of movement of the headstock 8; and 276 or 277 according to the direction of movement of the table 9. The corresponding lamps are lighted on both control boxes simultaneously so that if the operator needs to change position or finds it necessary to adjust or control other parts of the machine the indication will be the same at the central stationary panel as at the portable box.

When it is desired to operate the portable control box the push button 51 marked "portable control box" is actuated to close its contact, thus energizing the relay 280 provided with front contacts 281, 282 and 283 and with back contacts 284, 285. The contacts 282 and 283 when closed upon energization of relay 280 will direct the current respectively to the brush 155 of the selector 15 and to the forward and reverse direction relays 160 and 165 of the portable control box. The back contacts 2844 and 285 respectively connected to the relays 170, 175 and to the brush 145 of the selector 95 of the stationary control box are opened upon actuation of push buttons 51 to prevent operation from the stationary box. The contact 281 is a holding contact having interposed in its circuit the contact of a push button 50 marked "stationary control box" which when it is pressed opens the circuit to relay 280 and thereby opens the front contact of this relay to disconnect the portable box and to connect the stationary control box for operation.

*Clamping.*—Each member of the machine, when no feed movement is being applied thereto, requires to be firmly clamped on its own supporting part in order that the feeding or other movement being controlled shall take place properly with respect thereto.

For each of the four movable members in the embodiment being described clamping is controlled respectively by the motors 291, 292, 293 and 294. These motors are fed from the three phase supply RST under control of relays operating reversing switches to provide for rotation in either direction. Certain of these relays are controlled by the contacts of clamping push buttons 91, 92, 93 and 94 of the stationary control box or contacts of the similar clamping push buttons 45, 46, 47 and 48 of the portable control box. Others of these relays are controlled by the contacts of the unclamping buttons 81, 82, 83, 84 of the stationary control box or contacts of the similar unclamping buttons 41, 42, 43 and 44 of the portable control box. The circuits of these four clamping motors being thoroughly similar, it will be sufficient to describe only one of them.

Figure 12:
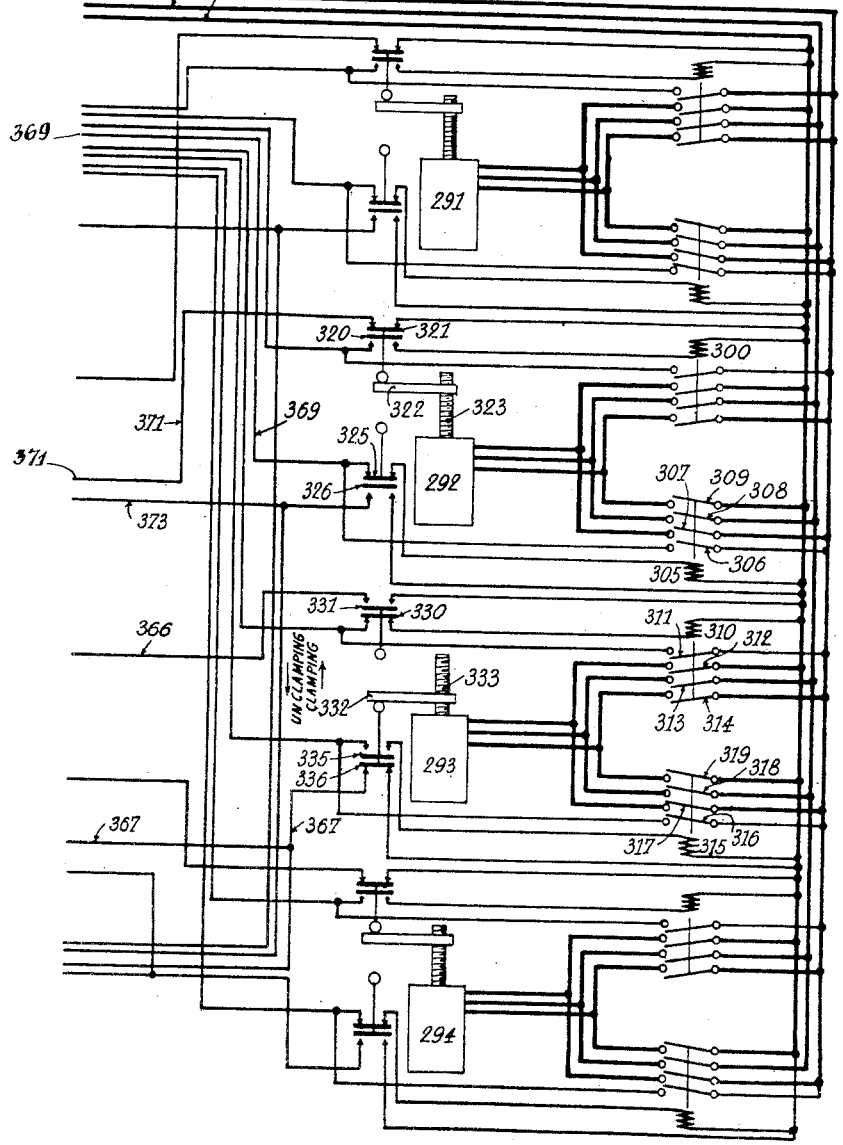

For example, as shown in Fig. 12 the motor 293 which effects clamping and unclamping of the headstock 8 is energized in one direction when the relay 310 is energized and in the other direction when the relay 315 is energized. The coil of the relay 310 has one side directly connected with the phase T of the three phase supply. The other side is connected with phase R through the following circuit: limit switch 330, switch 93 on the stationary box to supply line R. The contact 311 is a holding contact effective to hold the relay 310 in its closed position after the clamping operating contact 93 is opened by release of its push button. The relay 310 also may be controlled from the push button contact 47 of the portable control box. The limit switch 330 which initially is closed will be opened when the clamping action takes place upon movement of a nut 332 threaded on a screw 333 rotating with the motor 293, the parts being adjusted so as to open the switch 330 when the motor 293 has made a sufficient number of revolutions to ensure the clamping required and to move the nut 332 an effective distance along the screw 333 to close the limit switch 335 in circuit with relay 315 for the reverse or unclamping operation of motor 293.

When the clamping is effected, that is, when the switch 330 is opened, the contact 331 will close in turn, thus closing the circuit of the pilot lamp 343 associated with push button contact 93, this circuit being connected across the two lines R and T of the supply.

The reverse rotational direction of the motor 293 for effecting unclamping of the headstock 8 is controlled by the relay 315 which is also fed from the supply lines R and T through the limit switch 335 which becomes closed when the motor 293 is operated as above described for effecting clamping action on the headstock, that is, when the nut 332 is moved toward the left in Fig. 12. The circuit is established from line T through relay 315, switch 335, unclamping push button contact 83 to line R. The contact 316 of relay 315 is a holding contact connected in series with limit switch 335 and relay 315 to maintain the operation of motor 293 until unclamping is completed and the switch 335 is opened. Contact 336 also is operated by motor 293 to close when the limit switch 335 opens for energizing the unclamping pilot lamps 353 on the stationary box and 357 on the portable control box.

The circuits of the three other clamping motors 291, 292 and 294 are identical to that just described with reference to the motor 293, the contacts operated thereby being shown in the position to which they are moved by clamping operation of these motors. When the motor 293 has completed unclamping operation to move the nut 332 to the position shown, the motor 117 may be operated as described to move the headstock 8 which is now free to move on the carriage 7.

Assuming now that following a movement of the headstock 8 it is desired to move the headstock supporting carriage 7 downwardly along the upright 6 and to effect this movement from the stationary control box.

First, the button 50 carried by the portable control box is depressed to open the circuit to the holding contact 231 of relay 280, thus to prevent operation at the portable control box and to condition the circuit for operation from the stationary control box.

Then the selector 95 of the stationary control box is positioned to select the movable member to be moved by directing the arrow shaped handle thereof toward the headstock supporting carriage 7 depicted on the panel of the stationary control box, that is, toward the "origin" at which the unclamping illuminated push button 82 and its contact are located.

The brush 145 of the selecting member 95 will be thus positioned on the contact stud 147, thereby connecting the circuit from supply line R through contact 285, wire 140, brush 145, contact stud 147, wire 142, relay 131 to supply T.

The relay 131, therefore, will be energized and its contacts 136 will close, thus connecting the armature winding of the feed motor 116 with the armature of the generator 120. This motor 116, however, will not start because the generator field winding 123 is not yet energized, the contacts 162, 163; 167, 168; 172, 173; 177, 178 being open due to the fact that relays 160, 170 for forward movement and relays 165, 175 for reverse movement provided for coupling the generator field winding 123 with the exciter 124 are not yet energized. The relays 220 and 210 also are not yet energized.

Before controlling the movement of the selected member of the machine, in the example under discussion the headstock supporting carriage 7, it is necessary to be sure that this member is actually unclamped and that each of the other members of the machine is duly clamped. Since, in the present case, the previous operation was the movement of the headstock 8, this headstock is in unclamped condition as above indicated. It is necessary, therefore, to depress the button 93 for clamping the headstock 8 to close the circuit from the supply line R through button 93, wire 365, limit switch 330, relay 310 to supply line T. The energization of relay 310 will close its holding contact 311, thus maintaining the energization after the button 93 has been released, and will also close contacts 312, 313 and 314, thus energizing the motor 293 to rotate in the direction to effect clamping. During this rotary movement the nut 332 will move to the left

15 along its cooperating screw 333 from the position showing Fig. 12 driven with a rotary movement by the motor. When the headstock is clamped on its supporting carriage the nut 332 will have moved to the position to open the limit switch 330, thereby opening also the holding circuit of relay 310 to deenergize relay 310. All the contacts of this relay will open, thus stopping the motor 293. At the end of its movement the nut 332 also will operate the switch 331 to its closed position, thus closing the circuit to the pilot lamp 343 to indicate the clamping of the headstock. The circuit of this lamp is as follows: supply line T, closed switch 331, wire 366, pilot lamp 343 to the supply line R. The pilot lamp 353 indicating unclamping of headstock 8 is switched off as soon as the nut 332 at the beginning of the rotary movement of the motor 293 releases the switch 336 to open in the circuit through wire 367 for this lamp 353.

It will be necessary now to unclamp the headstock supporting carriage 7 which has been selected for movement by the setting of the selecting member 95. To accomplish this the unclamping button 82 is depressed, thus energizing the relay 305 through the circuit connected from supply line T through relay 305, limit switch 325, wire 369, switch 82 to line R. The holding contact 306 will close upon engagement of relay 305, thus maintaining the energization of the relay 305 after releasing the push button 82.

The three main contacts 307, 308, 309 of the relay 305 also will close and cause the motor 292 to be energized to rotate in the direction to effect unclamping of the carriage 7. As soon as this motor is started the nut 322 driven by the rotating screw 323 to move toward the right in Fig. 12 will open the switch 321 connected in circuit through wire 371 with the clamping pilot lamp 342 across supply lines R and T so that this lamp will be switched off. Then, as the clamping of the carriage 7 takes place and the nut 322 reaches the end of its stroke, the limit switch 325 will open, thus opening the circuit of the relay 305 through its holding contact to deenergize this relay. The motor 292 thus will stop while simultaneously the pilot lamp 352 indicating that the carriage 7 is unclamped will be switched on as the switch 326 interposed in the circuit through wire 373 to lamp 352 is closed.

With the carriage 7 unclamped a direction of movement may be chosen. To this end the forward movement button 96 of the selector 95 is depressed. This button 96 corresponds in this case to the downward vertical movement of the headstock supporting carriage 7 and its color is the same as that of the luminous line 12 provided on the depicted representation of the machine on the panel of the stationary control box which extends downwardly from the origin at which is located the push button 82. The action of depressing the button 96 will complete the electric circuit from the supply line R through wire 375, closed contact 399 of the selector 95, contact 396 now closed, wire 376, forward direction relay 170, wire 377, closed contact 284 to supply line T. By closing this circuit the relay 170 will be energized and the directional pilot lamp 253 will be switched on through the circuit connected from supply line T through contact 174 closed upon energization of relay 170, closed contact 272, wire 379, lamp 253 to the supply line R. The closing of the holding contact 171 upon energization of relay 170 ensures maintaining energization of this relay 170 after releasing the push button 96. Energization of relay 170 also closes the contacts 172 and 173 to effect coupling of the generator field windings 123 to the exciter 124. The motor 116 for moving the carriage 7, however, will not start because the generator field circuit is still interrupted since the contacts 221 and 212 are still open.

The desired "engagement" and "working" speeds now are selected. The "engagement" speed is adjusted by rotating th knurled button 110 fastened upon the shaft of the transmitter or generator 203 carried by the stationary box and the speed value is read on the graduated drum 208 also carried by this shaft. When this transmitter 203 connected with the receiver or motor 202 rotates it causes the screw extension 195 of the shaft of the receiver to rotate so as to bring the slider 192 of the rheostat 190 into the position corresponding to the energizing current required for ensuring the desired "engagement" speed.

Similarly, the "working" or cutting speed will be selected by rotating the knurled button 111 of the transmitter 206 until the desired speed is read on the graduated drum 209 carried on the shaft of the transmitter 206.

16

The rotational movement of the transmitter 206 will drive the receiver 205 to rotate the screw 196 thereof so that the slider 193 will be suitably positioned on the rheostat so as to secure the desired "working" speed when this slider is connected in circuit with the exciter 121.

To carry out the feed movement as contemplated at the "engagement" speed the button 101 first will be depressed, thus energizing the "engagement" speed relay 71 through a circuit connected from supply line T through closed contact 187 of the reversing relay 180, wire 380, winding of the relay 71 for engagement speed, wires 381 and 382, contact 231 closed upon pressing button 101, wires 383 and 384, contact 218 closed when the trigger 55 is not actuated, wire 385, wire 386 to the supply line R. The energization of relay 71 will close the holding contact 77 as well as the contact 74 connected to the "engagement" speed slider 192 which determines the connection in circuit with the generator field 123 of the portion of the rheostat below the slider 192. As the operation of the push buttons and selectors for selecting the member to be moved, the direction and the speed of its movement are now completed, the last step for bringing about the desired movement of the selected member, that is, the carriage 7, is to depress the starting button 105, thereby energizing the "automatic" operation relay 220 through a circuit connected from supply line T through the relay 220, wires 387 and 388, push button contact 105, wire 375 to supply line R. Upon energizing the relay 220 the holding contact 222 and the contact 221 thereof will be closed, thus completing the closing of the circuit to the generator field winding 123 from the exciter 121 through contact 172 of the forward direction relay 170, contact 221, back contact 184 of the reversing relay 180, rheostat 190, field winding 123, back contact 181 of reversing relay 180 and contact 173 of forward direction relay 170 to the exciter 121. The energizing of the generator field will start the motor 116 rotating in the direction corresponding to the downward movement of the headstock supporting carriage 7 along the upright 6 and at the selected "engagement" speed.

Assuming now that it is desired to perform the same movement at a greater speed, viz. at the "working" or cutting speed then it will be necessary to depress the "working" speed control button 102. This will energize the "working" speed relay 72 through the circuit from the supply line T through closed contact 187 of the reversing relay 180, wire 380, relay 72, wires 391 and 392, contact 232 closed upon operation of button 102, wire 383, wire 384, contact 218 closed when the trigger 55 is not operated, wires 385 and 386 to the supply line R. It will be noted that by depressing the button 102 the contact 235 is opened, thus interrupting the circuit through the holding contact 77 of the previously energized "engagement" speed relay 71 which now becomes deenergized. The energization of the relay 72 effects the closing of the holding contact 78 and the front contact 75 which short circuits all of the rheostat 190 except the portion below the working speed slider 193. Therefore, without other change in the setting of the controls the motor 116 will now increase its speed to the speed corresponding to the speed for "working" or cutting feed and movement of the carriage 7.

When it is desired to move the headstock supporting carriage 7 at the "fast" speed, for example, in passing between cuts, the button 103 may be depressed to close the contact 233. The "fast speed" relay 73 thereby will be energized through a circuit connected from the supply line T through closed contact 187 of relay 180, wire 380, relay 73, wires 393 and 394, contact 233, wires 383 and 384, closed trigger contact 218, wires 385, 386 to the supply line R. The energizing of the fast speed relay 73 closes its holding contact 79 as well as the front contact 76 which completely short circuits the rheostat to produce maximum energization of the generator field 123. The energizing current supplied to the motor armature from the generator thereupon reaches its highest value and the motor 116 rotates at its highest speed corresponding to the "fast speed" for feeding movement of the carriage 7.

It should be noted that depressing the button 103 also opens the contact 236, thereby opening the circuit of the holding contact 78 of the working speed relay 72 which becomes deenergized. When it is desired to stop the downward feed movement of the carriage 7 the button of the stop contact 106 may be depressed, thereby opening the holding circuit of the automatic operation relay 220 which was established from the supply line R through wire 396, closed contact 22 of the stop button carried by the portable box, stop contact 106 of the stationary box, wire 400, holding contact 222 of the automatic operation relay 220, relay 220 to the supply line T. The deenergization of the relay 220 will open also the contact 221 thereof and the interruption of the generator field circuit will be effected. The generator output thereby is cut off, thus stopping the motor 116. Deenergization of relay 220 opens its holding contact 222 so that this relay cannot be reenergized when the stop button 106 is released to its unoperated position with its contact closed.

Assuming now that it is desired to move the headstock supporting carriage 7 upwards, i. e. in a direction opposite to that in which it was previously moved, with a "quick return" movement, the button of contact 107 may be pressed which will cause the "quick return" relay 180 to be energized through a circuit connected from the supply line R through wire 375, contact 107, wires 401 and 402, relay 180 to supply line T. The energization of the relay 180 closes the front contacts 182, 183, 185 and 186 and opens the back contacts 181, 184 and 187. Closing of the holding contact 185 continues energization of the relay 180 after the push button 107 has been released through a circuit which includes wire 400, closed stop button contacts 106 and 22 and wire 396. The closing of the contacts 182 and 183 and the opening of the contacts 181 and 184 will cause the generator field winding 123 to be inversely connected to the exciter 121 in relation to the connection above described for downward movement of the carriage. The opening of the contact 187 will deenergize the feed relays 71, 72 and 73 by disconnecting the wire 380 to which these relays are connected in parallel from the supply line T. The closing of the contact 186 short circuits the rheostat 190 so that the generator field winding 123 is connected across the full voltage of the exciter to produce maximum excitation of the generator 120 and maximum voltage supplied to the armature of the motor 116 but in reverse direction to that supplied during the downward movement of the carriage 7. The motor 116 will, therefore, start rotating in the reverse direction and build up to the highest speed and the headstock supporting carriage 7 will be moved in a "quick return" stroke upward. To stop the upward movement it will be sufficient to depress the button 106, thereby opening the holding circuit of the "quick return" relay 180. This circuit is connected from the supply line T through relay 180, holding contact 185, wire 400, stop button contact 106, closed stop button contact 22, wire 396 to supply line R. The relay 180 thus will be deenergized and its holding contact 185 will open so that it cannot be reenergized by the release of the stop button 106 to close its control.

To obtain upward, that is, reverse movement of the headstock supporting carriage 7 at normal "engagement," "working" or "fast" speeds in the same manner as above described for the downward movement the reverse movement button 97 of the selector 95 is depressed instead of depressing the button 96 as previously described. The action of depressing this button 97 will close the electric circuit from the supply line R through wire 375, closed contact 398 carried on selector 95, contact 397 closed upon pressing button 97, wire 403, reverse direction relay 175 for the stationary box, wire 377, back contact 284 of the main control relay 280 of the portable box to the supply line T. The energization of the relay 175 thereby effected will close its holding contact 176 and its contacts 177 and 178 for connecting the field winding of the generator 120 to the exciter 121 with a polarity reverse to that previously obtained when energizing the relay 170 by depressing the button 96 to secure downward movement of the carriage 7. The pilot lamp 252 for the upward movement of the carriage now will be lighted to indicate the direction in which the movement takes place, this lamp being connected in circuit through wire 405 upon closing of contact 273 upon energization of relay 131 to connect motor 116 to the generator 120 and upon closing of contact 179 of the relay 175 for reverse operation. The pilot lamp 253 for the downward movement is switched off since the relay 170 is deenergized and the contact 174 is open.

To operate the carriage in upward feed movement the same sequence will be followed after having selected the desired "engagement" and "working" speeds which has been described above for the downward movement.

The push button 101 will be depressed to obtain the "engagement" speed, the push button 102 for the "working" speed and the push button 103 for the "fast" speed. Thereafter the starting button 105 will be pressed to start the motor 116 to drive the carriage 7 upward at the selected speed. The "quick return" contact 107 when closed by pressing its button will now result in a high speed downward movement of the headstock supporting carriage 7.

When feed movement of another movable member of the machine is desired to be operated from the stationary box the selector 95 will be turned so that its arrow points in the direction of the representation of this member on the panel of the stationary control box.

The "automatic" control of the machine from the portable control box is effected in the same manner as from the stationary box by setting the selector 15 with the arrow pointing to the pictorial representation of the member selected to be moved and by operating its push buttons 16 and 17 respectively for forward and reverse direction of movement of the selected member. It will be found upon consideration of the wiring diagram of Figs. 7 to 12 that the contacts 241, 244, 247 associated with the "engagement" feed button 31 on the portable box, contacts 242, 245, 248 associated with the "working" feed button 32 on the portable box and contacts 243, 246, 249 associated with the "fast" speed button 33 on this portable box are connected in parallel with the corresponding contacts 231, 234, 237 of the "engagement" feed button 101 on the stationary box, contacts 232, 235, 238 associated with the "working" feed button 102 on this stationary box and contacts 233, 236, 239 associated with the "fast" speed button 103 on the stationary box. Similarly, the push button contacts 21, 23 for forward and reverse movement on the portable box are connected in parallel with the corresponding buttons 105, 107 on the stationary box. As above described, the stop button 22 on the portable box is connected in series with stop button 106 on the stationary box so that operation of the machine may be stopped either from the portable or stationary box for whatever member of the machine is being moved.

To put in action the movable control box the button 51 first is depressed so as to energize the main relay 280 of the portable box through the circuit from the supply line R through wire 386, contact 51, relay 280, to supply line T. The energization of this relay will open the back contact 284 connected through wire 377 to the direction selecting relays 170, 175 and will also open the back contact 285 connected to the brush 145 of the selector 95 of the stationary box through wire 140 while closing the contact 282 connected to the brush 155 of the selector 15 of the portable box; also closing the contact 283 connected through wire 407 to the direction selecting relays 160 and 165 for operation from the portable box.

The operational sequence controlled from the portable control box takes place in the same manner as from the stationary control box by operating the corresponding push buttons and selectors associated with the depicted movable members of the machine. However, for "automatic" operation controlled from the portable control box the engagement and working speeds will have been previously adjusted at the stationary control box by operation of the knurled knobs 110 and 111 as above described.

It will be clear from consideration of the wiring diagram of Figs. 7 to 12 inclusive that the portable box has the forward movement relay 160 and the reverse movement relay 165 associated therewith, the respective contacts 161, 162, 163, 164 for the relay 160 and the respective contacts 166, 167, 168, 169 for the relay 165 being effective to control the direction of excitation of the selected motors 115, 116, 117, 118 as are the relay 170 for the forward movement and its contacts 171, 172, 173, 174 and the relay 175 for the reverse movement and its contacts 176, 177, 178, 179 for the stationary box.

It will also be found that the unclamping push buttons 41, 42, 43, 44 for the portable box are connected in parallel with the corresponding push buttons 81, 82, 83, 84 for unclamping on the stationary box for operation of the respective motors 291, 292, 293, 294. Similarly, the clamping buttons 45, 46, 47, 48 are connected in parallel with the corresponding clamping buttons 91, 92, 93, 94 on the stationary box for clamping operation of the motors 291, 292, 293, 294. In each case, of course, each clamping and unclamping button is effective respectively to clamp and unclamp its member only when, by previous unclamping and clamping operation respectively of the motor which it controls, the member has been unclamped or clamped.

Moreover, the portable control box provides in the contacts and circuits controlled by the trigger 55 means for effecting movement of the selected member in the desired direction at a speed which is adjustable at will by means of the trigger 55 acting to determine initially the starting speed and thereafter effecting increase and decrease and stopping of the movement in direct relation to the amount of pressure applied to the trigger by the fingers of the hand.

When the trigger 55 is pressed the cam 217 integral therewith closes the switch 215, thus energizing the trigger controlled relay 210 through a circuit connected from the line R through wires 386 and 385, switch 215 now closed, relay 210 to supply line T. The energization of relay 210 will close the contact 211 which short circuits so much of the rheostat 190 as is above the manual control slider 191 Fig. 8. It also closes the contact 212 which is in parallel with contact 221 of the automataic operation relay 220, thereby completing the generator field winding circuit. By more or less increasing the pressure exerted on the trigger 55 the transmitter 201 carried on the portable box will be caused to rotate so as to transmit the energy through the group of wires 197 to effect movement of the receiver 200 which will drive the screw 194 for moving the manual speed control slider 191 downwardly in Fig. 8 to increase the portion of the rheostat 190 short circuited by the circuit through slider 191 and contact 211 of the trigger controlled relay 210.

The feed movement of the selected member is effected according to the selected direction in the same manner as in automatic operation but at the speed which is determined by the pressure exerted on the trigger 55. When the manual control trigger 55 is pressed and the contact 218 thereof is opened and the automatic feed circuits for both boxes are completely disconnected, the "automatic" operation contacts of push buttons 101, 102 and 103 of the stationary box being connected in parallel with the "automatic" operation contacts of the push buttons 31, 32, 33 of the portable box to the respective "engagement," "working" and "fast" speed relays 71, 72 and 73. When the trigger 55 is released the switch 215 will open, thus deenergizing the relay 210 to open contact 212 and cut off the excitation of the generator field to bring the motor to a standstill.

The portable control box is not provided with pilot lamps indicating the clamping of the respective members depicted on this box but like the stationary control box it is provided with pilot lamps 355, 356, 357, 358 for indicating the unclamped condition of the respective movable members of the machine. The circuits may be traced in Figs. 7 to 12 inclusive to show that the lamps 355, 356, 357, 358 are connected respectively in parallel with the pilot lamps 351, 352, 353, 354 of the stationary panel so that the indication of the unclamped condition is given simultaneously on both the portable and the stationary control boxes.

It will be understood that when any of the buttons 31 and 101 for "engagement" speed, 32 and 102 for "working" speed and 33 and 103 for "fast" speed is depressed, the holding circuits of the relays controlled by the two other buttons are interrupted so that only one speed may be effective at a time.

When the "quick return" stroke button 23 or 107 is depressed, the opening of the contact 187 upon energizing of relay 180 will deenergize the "engagement" speed relay 71, the "working" speed relay 72 and the "fast" speed relay 73 so that these speeds when set for forward operation cannot be effective for the "quick return" movement although the settings of the rheostats are not changed. By depressing the "quick return" stroke button 23 or 107, moreover, starting in the return direction will take place exactly as if the starting button 21 or 101 were depressed and it is not necessary to depress the button 21 or 101 to initiate the "quick return" stroke.

When the push buttons and selector have been actuated and movement of the selected member is about to be started the pilot lamps showing both the selected direction of movement of the selected member and the unclamped condition thereof are both lighted on the stationary and on the portable control box.

I will now describe a second embodiment of my invention such as illustrated in Figs. 13 to 31 including certain modifications. The device shown in these figures is constituted by an improved pendant control box which can be used in connection with a machine tool such as a boring and milling machine as depicted on the front face thereof as shown in Fig. 13. However, as with the preceding embodiment, the improved control box of this second embodiment may be used in connection with other types of machines.

The pendant control shown in elevation in Figs. 13 to 15 comprises a box 499, preferably a light metal alloy casting.

On the front of the box a panel or plate 500 is supported on which is engraved a pictorial representation of the boring and milling machine and carrying two member selector elements 505 and 510 respectively for "automatic" operation and for manual or "trigger" operation for selecting the member of the machine to be moved and four direction selector elements 506, 507, 508, 509. These direction selectors respectively are associated with the depicted movable members, that is, with the column 6 of the boring and milling machine, the carriage 7 vertically movable thereon, the headstock 8 horizontally movable on the carriage 7 and the table 9 horizontally movable transversely of the headstock and column movements. These direction selectors respectively carry unclamping buttons 511, 512, 513, 514 for controlling unclamping of the movable members of the machine depicted on the panel with which respectively the direction indicators are associated. These direction selectors, which because of their arrow-shape also are direction indicators, and the buttons carried thereby may be of similar construction to the selectors 15 and 95 and the buttons carried thereby. Four clamping buttons 91, 92, 93, 94 are provided for clamping the movable members, these buttons as in Fig. 6 being positioned at the same level as the respective direction selectors and being provided with translucent rings which are illuminated by lamps 341, 342, 343, 344 when the corresponding movable members with the depiction of which the direction selector is associated are clamped. Control lever 520 as shown in Figs. 13, 14 and 32 projects through an arcuate portion of the wall 521 of the box for selecting the speed of the movable member of the machine selected by means of the "automatic" operation selector element 505. This arcuate wall provides a grid having vertical notches intersecting a horizontal slot for starting and stopping the movement of said member and for determining the speeds thereof and for determining the "quick return" movement as hereafter described. Two speed indicators 208 and 209 for indicating the "engagement" and "working" speed respectively are carried on this portable control box as on the stationary box, Figs. 6 and 11.

In the wall of the box 499 on the right hand side thereof as viewed in Fig. 13 is arranged near the bottom the manually operable element 570 of a control device for progressively adjusting the speed of the movable member selected by means of the manual or "trigger" operation selector element 510 and for starting and stopping the movement of such member as is accomplished with the trigger 55 of Figs. 1 and 9.

At the level of the indicator 209 at this right hand side a knob 111 for controlling the "working" speed is carried on the shaft extension of the drum of indicator 209 and the transmitter 206. At the left hand side of the box 499 is arranged at the level of the indicator 208 a knob 110 carried on the shaft extension of the drum indicator 208 and transmitter 203 for controlling the "engagement" speed.

Adjacent the bottom on this left side face a lighting device 56 and its switch 57 are arranged which allows the operator to light up the area where the tool is working.

The box 499 is suspended through a suspension device which will be more completely described hereafter.

I will now describe in detail the different elements carried by the box 499 which are associated with or cooperate with panel 500, control lever 520 and control device 525.

The panel 500 shows as a pictorial representation of the principal members of a boring and milling machine. These members are respectively the bed 501 on which a table 9 may slide either forward or reversely in the directions corresponding to the arrows *f*1 and *f*2, the frame or support 502 along which the upright or column 6 may move as shown by the arrows *f*3 and *f*4, the saddle or carriage 7 adapted to slide up and down the upright 6 as shown by the arrows *f*5 and *f*6, the headstock 8 adapted to move horizontally along the saddle 7 as shown by the arrows *f*7 and *f*8 and lastly the tool-carrying spindle 5 mounted in the headstock 8. The work piece to be machined is secured to the table 9.

On the part of the pictorial representation illustrating the table 9 is located the direction selector or switch 509, the arrow-shaped handle of which may assume two positions, namely, the position illustrated in the drawing when it points to the direction of the arrow *f*2 and the diametrically opposed position pointing to the direction of the arrow *f*1. The handle of this switch may be "positioned" and maintained in either of these wto positions by an arrangement such as that illustrated by way of example in Fig. 17 which includes a cam 515 with two notches rigid with the handle of the selector 509, this cam cooperating with two rollers 516 carried by levers 517 pivotally mounted on stationary pivots 518 and urged towards each other by tension spring 519.

Similarly, on the part of the pictorial representation illustrating the headstock 8 is located the direction selector or switch 508 constructed as described for selector 509 so that the arrow-shaped handle thereof may also assume two positions, that illustrated in the drawing corresponding to the direction of the arrow *f*7 and the opposite direction corresponding to the arrow *f*8.

Two other similar direction selector switches 507 and 506 are similarly adapted to be "positioned" to indicate respectively the movements of the saddle or carriage 7 and of the upright 6 as shown by arrows *f*5, *f*6 and *f*3, *f*4.

These four direction switches 509, 508, 507 and 506 thus are supported on axes perpendicular to the face of panel 500 and respectively are operable for selecting the directions of the movement of the movable members of the machine, that is the table, the headstock on the saddle, the saddle on the upright and the upright on its support, upon which as they are depicted on the panel these direction selectors respectively are located. Moreover, the locations of these direction selectors on the panel are angularly spaced with respect to each other about the locations on the panel of both the member selector 505 and the member selector 510.

The selector element or switch 505 also is provided with an arrow-shaped handle and is pivotally supported on an axis perpendicular to the face of the panel 500 for rotation to four different positions for selecting one of the four members to be moved which have been mentioned hereinabove. A "positioning" device such as that shown diagrammatically, for example, in Fig. 16 allows the switch 505 to be "positioned" in any of the four positions illustrated in Fig. 13. The cam 527 of this device is provided with four notches into each of which the rollers 516 may enter under the bias of spring 519. To select a member to be moved the tip of the arrow-shaped handle of said switch 505 is pointed towards the direction switch 509, 506, 508, 507 located on the diagrammatical representation of the movable members, that is, the table, the upright, the head stock and the carriage. On the pictorial representation converging lines 528 are drawn showing more clearly the four positions that may be assumed by the switch handle 505.

The movable member selector or switch 510 also is supported for pivotal movement on an axis perpendicular to the face of panel 500 to four different positions with the arrow-shaped handle thereof pointing to the location of the particular direction selector 506, 507, 508, 509 associated with the depicted movable member to be moved. The part played by said switch and its structure is similar to that of the switch 505, so that this switch 510 may be selectively "positioned" in the four different positions pointing along the convergent lines 529 which serve the same purpose as lines 528 of the switch 505. For the manual operation above mentioned a device such as that described in my co-pending application Serial No. 587,778 filed on April 11, 1945 now U. S. Patent No. 2,516,043 for a "Portable Control Set for Machine-Tools and Hoisting or Lifting" may be utilized or the means for manually controlling the movements of a movable member of the machine as described in connection with the trigger 55 Figs. 1 and 9 may be used.

The position of each of the direction controlling switches 509, 508, 507, 506 is completely independent of the position of any of the three others and is also completely independent of the position given to the two movement selecting switches 505 and 510 which, in their turn, are completely independent of one another. Any of these selectors may be operated, therefore, or its position changed regardless of the position occupied by the other to accomplish the desired direction of movement of the desired member to be moved, whether by "automatic" or "manual" operation.

In connection with Fig. 13 I have described the switches 506, 507, 508 and 509 as respectively constructed with push buttons 511, 512, 513 or 514 thereon for control of the unclamping of the member selected to be moved. In connection with the wiring diagram of Figs. 23 to 27 inclusive a modified form of these direction selectors 506, 507, 508, 509 will be described in which the arrow handle thereof itself may be pushed in the direction along the pivotal axis for effecting unclamping.

With either form of direction selector in the above described selecting device it is possible to pass very easily from "automatic" operation to "manual" operation and from the movement of one member in a predetermined direction to the movement of another member in any desired direction.

The selection may be executed as a preliminary operation i. e. the choice of the member to be controlled and the choice of the direction in which it is to be moved may be carried out before starting the machine or else, on the other hand, such selection may be carried out while the machine is already running.

I will now describe with reference to Figs. 18 and 19 the control lever 520 hereinabove referred to.

As apparent from Figs. 18 and 19 a lever 520 is pivotally secured to a vertical shaft 530 and is adapted to be moved in a vertical plane with a slight angular upward or downward movement around an axis of the pivot 531. When the lever 520 is released at any point it always returns to a horizontal position due to the action of a spring 532 which is wound about the pivot 531 and the ends of which engage two studs 533 and 534, stud 533 being integral with the lever 520 and stud 534 being integral with the shaft 530.

The shaft 530 to which the lever 520 is secured is connected with a rotary combination switch 535 of any known type connected through conductors arranged in a sheath 536 to the apparatus controlling the speed of operation of the movable member being controlled (see below the description of the wiring diagram shown in Figs. 23 to 27). The lever 520 may move in a grid 537 comprising a horizontal slot 538 in the wall 521 as shown in Fig. 13 provided at its upper edge with notches 539 and at its lower edge with notches 540 located immediately below the upper notches 539. Referring in particular to Fig. 13 it will be observed that the upper notch at the extreme right is marked V*m* which stands for minimum feed. Reading from right to left the other notches are marked E which stands for "engagement" feed, notches W, Q and R representing respectively "working" or cutting feed, "fast" feed and "quick return." Any two notches aligned in the same vertical plane correspond to the same feed speed, the upper notch serving to start the movement and the lower notch to stop the movement.

Lastly, it can be seen by referring in particular to Fig. 18 that the inner end of the lever 520 is pivotally secured at 542 to a connecting rod 543 the upper forked end of which is pivotally secured at 544 to a cam 546 biconical in shape and adapted to slide along the shaft 530 and to actuate when moved upwardly by downward movement of lever 520 an electric impulse contact piece 547 or to actuate downwardly another electric impulse contact piece 549.

When the lever 520 is moved horizontally along slot 538 it rotates the shaft 530 on its vertical axis which actuates the combination switch 535 and when this lever is moved vertically downward and upward into any one of the notches of the grid 537 it actuates respectively the two contacts 547 and 549.

The switch 535 is preferably equipped with a contact piece 551, Fig. 26, for stopping the movement put into play when the lever 520 is rotated between the notches marked Q (fast feed) and R (quick return).

As several speeds must not be imparted simultaneously to the member of the machine selected to be moved the control circuit as shown in the wiring diagram of Figs. 23 to 27 is designed in such a manner in connection with the switch 535 operated by lever 520 that the control of one speed is cut off upon connecting the controlling apparatus to produce a new speed.

In cooperation with the mechanism described in connection with Fig. 18 a "positioning" device serving a purpose similar to that of Fig. 16 may be used which may be part of the combination switch 535, this device constraining the lever 520 to maintain at all times a position to which it has been moved opposite some one of the notches.

The operation of the system that has just been described is as follows:

It will be assumed that the machine to be controlled is a machine tool such as the boring and milling machine already referred to. If it is now desired to make the table 9 of this machine travel at the speed of "fast" feed over a certain length of travel, the lever 520 has merely to be brought in position in front of the notch Q, "fast" feed, raised and then released. By this single operation the "fast" feed speed has been selected through the switch 535, the impulse contact piece 549 has been actuated closing the control circuits of the apparatus providing this "fast" speed as described with reference to Figs. 23 to 27 and thus the desired speed of "fast" feed has been imparted to the movable member of the machine.

In order to return now to the "working" speed, a similar operation is all that is required, that is, the lever 520 is moved along slot 538 and is positioned in front of the notch W corresponding to "working" feed, thereby changing the contacts engaged within the switch 535. The lever then is raised momentarily into the corresponding notch 539 to actuate the contact piece 549, whereupon the movable member of the machine returns to "working" speed.

Once a given feed movement has been started it can be stopped at any moment by shifting the lever 520 into the lower notch 540 below the position of the lever corresponding to the selected feed. This operation raises the cam 546 which actuates the contact 547 whose function is to stop the movement. Thus, for example, if the machine is in operation and its table or other movable member is moving at a previously imparted "working" feed, the lever 520 need merely be shifted into the lower notch 540 corresponding to letter W and the member thereby will be stopped.

In order now to impart a "quick return" stroke to the movable member, the lever 520 is moved to the notch R. During this manipulation the stopping contact 551, Fig. 26, forming part of the switch 535 is actuated, to effect the "automatic" stopping of the movable member which has been moving in the working direction at a given speed. This permits the member to start up again in the opposite direction so as to execute the return stroke as soon as the lever 520 is raised into notch 539 marked R. This return movement may be interrupted at any given moment by lowering the lever 520 into the notch 540 marked R.

In Fig. 19 I have shown a modification of the grid of Fig. 18 permitting the obtaining of the same result without having to provide a special stopping contact piece 551 in the switch 535 of the shaft 530 of this switch that are comprised between the positions corresponding to the notches Q and R.

In this variation the horizontal slot 538 stops at the intersection with the upper and lower notches Q. Another horizontal slot 553 is provided for connecting the notches Q and R but this slot 553, parallel with slot 538, is shifted downwardly with respect to the slot 538 so as to come level with the bottoms of notches 540 marked Q and R. Therefore, when passing from Q to R the operator is first obliged to lower the lever 520 into the lower notch 540 marked Q and thereby cause the movable member to stop. Then, continuing along the slot 553 until the notch 540 is reached marked R the lever may be raised to the level of slot 538 and continued upward into the notch 539 marked R to initiate the "quick return" stroke.

In certain cases all the lower notches 540 may be interconnected so as to form one large indentation.

In the example described hereinabove, the case was assumed where control was to be exercised over various feed speeds for the same movable member of a machine but the same system is applicable in the case where it is desired to control in succession the movements of several different movable members of a machine or apparatus, each member being moreover capable of assuming various feed speeds as desired and also of moving in both directions.

In the wiring diagram shown in Figs. 23 to 27 which will be more completely described hereafter, I have shown a modification of the control device shown in Fig. 18, this modification being different from the embodiment of Fig. 18 in that the biconical cam 546 is replaced by a sector 555 rigid with the lever 520, this sector actuating either the contact 547 or the contact 549 according as the lever 520 is depressed or raised.

I will now describe in detail the control device having the manually operable element 525 carried by the control box 499 shown in Figs. 13 to 15. This device is illustrated in greater detail in Figs. 20 to 22 inclusive.

With reference first to Fig. 20, this figure is a diagrammatic view of the control device associated with the motor driving only one movable member of the machine tool.

In this Fig. 20, the rectangle 560 designates in a general manner a part of a face of the control box for controlling a movable member 561 of the machine tool through a suitable drive 562 by an electric motor 563 forming part of a Leonard group illustrated diagrammatically in the drawing in which motor 563 is fed by the generator 564 which is driven through shaft 565 by the motor 566 at constant speed. The field windings 567 of the motor 563 are fed under constant voltage from a direct current supply 568.

The control box 560 carries a rotatable disk 570 of circular shape secured to a spindle 571 adapted to rotate in a suitable bearing supported on box 560. To the disk 570 is secured a pin 572 adapted to come into contact with a stop 573 rigid with the control box 560 for preventing the disk 570 from rotating counterclockwise beyond a predetermined position. A spiral spring 575 one end of which is secured to the control box 560 and the other end to the disk 570 urges the disk to rotate until the pin 572 engages stop 573.

The disk 570 is provided with two notches 576 and 577 provided at its periphery and arranged in a manner such that when the finger of the operator's hand has engaged one of them it may be possible to rotate the disk clockwise until the finger abuts against the surface 579 of the stop 573 or of any other suitably located stop, thus determining the rotational movement of the disk 570 from the position with the pin 572 engaging stop 573 against the spiral spring 575.

A handle 580 is secured to the control box 560 itself in the vicinity of the disk 570 in a position such that when the operator grasps this handle 580 with his hand he may operate the disk 570 with the forefinger of the same hand after the manner of the trigger of a revolver.

A cam 582 rigid with the disk 570 cooperates with a roller 583 mounted at the lower end of a follower rod 584 the upper end of which engages the movable contact of an electric switch at 585 inserted in series in an electric circuit including the field windings 586 of the generator 564 and a rheostat shown generally at 587, this circuit being fed from the supply 568.

The rheostat includes a resistance 590 over which may slide a slider 591 also contacting with a bar 592 one end of which is connected to the resistance 590 so as to short circuit a greater or less proportion of the resistance 590 according to the position occupied by the slider 591.

The slider 591 is operatively connected to the disk 570 through a suitable transmission which may be, for example, a mechanical transmission of the type illustrated diagrammatically in Fig. 20 and constituted by gearing 593, 594 driving a worm 595 prevented from moving axially by a double thrust bearing 596. On this worm a nut 597 is threaded connected by rod 598 to drive the slider 591 along the rheostat as the nut 597 progresses longitudinally along the axis of the worm 595, the rod 598 being adapted to slide between guide members 599 for preventing any rotation of the nut 597. The gearing element 593 is connected mechanically with the rotary shaft 571 carrying the disk 570 while the gearing element 594 is connected mechanically with the worm 595.

The operation of the arrangement just described is as follows:

Supposing the motor 563 and consequently the machine member 561 are at a standstill, i. e. the switch 585 is open and the field winding 586 of the generator 564 is not energized. If it is desired to make the motor 563 rotate at a low speed, the operator grasps the handle 580 and engages his forefinger into the first notch 576 of the disk 570 for driving same clockwise with the result that the cam 582 rotates, causing the raising of the follower rod 584 which closes the switch 585. The field winding 586 of the generator thereby is connected with the supply 568 through the agency of the rheostat 587. If the motor 566 is rotated so as to drive the rotor of the generator 564, the latter feeds current to the motor 563 which starts rotating at a speed corresponding to the voltage of the generator, that is, at minimum speed as the slider 591 is still on the extreme left hand side of the rheostat and consequently short circuits no part of the resistance 590.

If the disk 570 is turned further, the simultaneous rotation of the worm 595 moves the slider towards the right over the resistance 590. This results in short circuiting a part of this resistance and consequently increases the energizing current in the field winding 586 of the generator 564. The voltage of the latter increases and, therefore, the speed of the motor 563 and of the machine member 561 driven thereby also increases.

The forefinger of the operator which rotates the disk 570 soon reaches the stop surface 579 of the stop 573. At this point it is no longer possible to rotate the disk 570 any further and the speed cannot be further increased by using notch 576. Thus by this arrangement, the machine member 561 may be moved at a reduced speed even if, for any cause whatever, such as too great a haste or lack of sensitivity, there is exerted on the disk a relatively considerable pressure which otherwise would rotate the disk so far as to exceed the desired low speed.

On the other hand, if it is desired to impart a higher speed to machine member 561, the notch 577 can be used instead of the notch 576. It is apparent that it is possible then to impart to the disk 570 a rotation of a much greater amplitude before the forefinger of the operator abuts against the stop 579. During this rotation the worm 595 will also rotate and move the slider 591 towards the right so as to short circuit a greater fraction of the resistance 590 than with notch 576. This will lead to an increase in the generator field and an increase in the speed of the motor 563 to an attained speed greater than was attained with notch 576.

The maximum possible speed is obtained when the forefinger of the operator abuts against the stop 579.

It will be apparent that according to the position of the notches 576 and 577 on the disk it is possible to adjust the extent of these two ranges of speeds. It may be desirable for instance in certain cases to provide for the use of the notch 576 to allow the starting of the motor and maintaining it at reduced speed without increasing this speed as long as the device is operated with the finger on notch 576. In such cases it will be of advantage to engage the slider 591 on bar 601 before this slider engages the resistance 590 itself so that all of the resistance may still be in circuit when the forefinger of the operator engaging the notch 576 abuts against the stop 579.

In Figs. 21 and 22 I have illustrated an embodiment of the arrangement hereinabove generally described with reference to Fig. 20.

The same elements are found again such as the disk 570, the handle 580, the stop 579, the cam 582, the bias spring 575. The notches 576 and 577 are replaced by two openings 576, 577 in Fig. 21 so as to prevent the forefinger of the operator from being hindered by the bias spring 575. This spring is carried inside the disk 570 as shown in Fig. 22. One end of this spring is secured at 603, Fig. 22, to the inner wall 604 of the control box 560 and its other end engages at 605 a member 606 rigid with the disk 570. The disk is rigidly secured to its spindle 571 rotating inside a bearing 607 carried by the inner wall 604 of the control box 560. This spindle 571 is connected with the arrangement for varying the speed of the controlled member through any suitable transmission means an example of which has been given with reference to Fig. 20.

The cam 582 acts on a roller 583 carried by a lever 608 pivotally secured at 609 to the control box and cooperating with the rod 610 of an electric switch illustrated merely by its casing 611 fastened to the wall of the control box.

A spring 612 provides for maintaining contact between the roller 583 and the cam 582.

In the embodiment of Figs. 21, 22 the rigid stop 573 of Fig. 20 has been replaced by a resilient stop constituted by a block 613 secured to the control box wall and carrying a pin 614 slidable therein and urged upwardly in Fig. 21 by a spring 615 acting against the head of pin 614. The stroke of this pin 614 is limited by a nut 616 screwed on the lower end of the pin. The arm of member 606 to which is secured one end of the spring 575 and which is rigid with the disk 570 abuts against the pin 614 at the end of the return movement of the disk when it has been released by the finger.

It is obvious that the disk 570 instead of including only two notches or openings 576 and 577 may include more than two if it is desired to select more than two ranges of speed.

Having described the different elements of the pendant control box shown in Figs. 13 to 22 inclusive, I will now describe the operation of the control 499 with reference to the wiring diagram of Figs. 23 to 27 inclusive which shows the electrical circuits connecting the several elements together and with the feed motors 115, 116, 117, 118 and with the clamping motors 291, 292, 293, 294 of the movable members of a machine tool similar to the boring and milling machine which has been referred to in the description of the wiring diagram of Figs. 7 to 12 inclusive.

Figure 23:
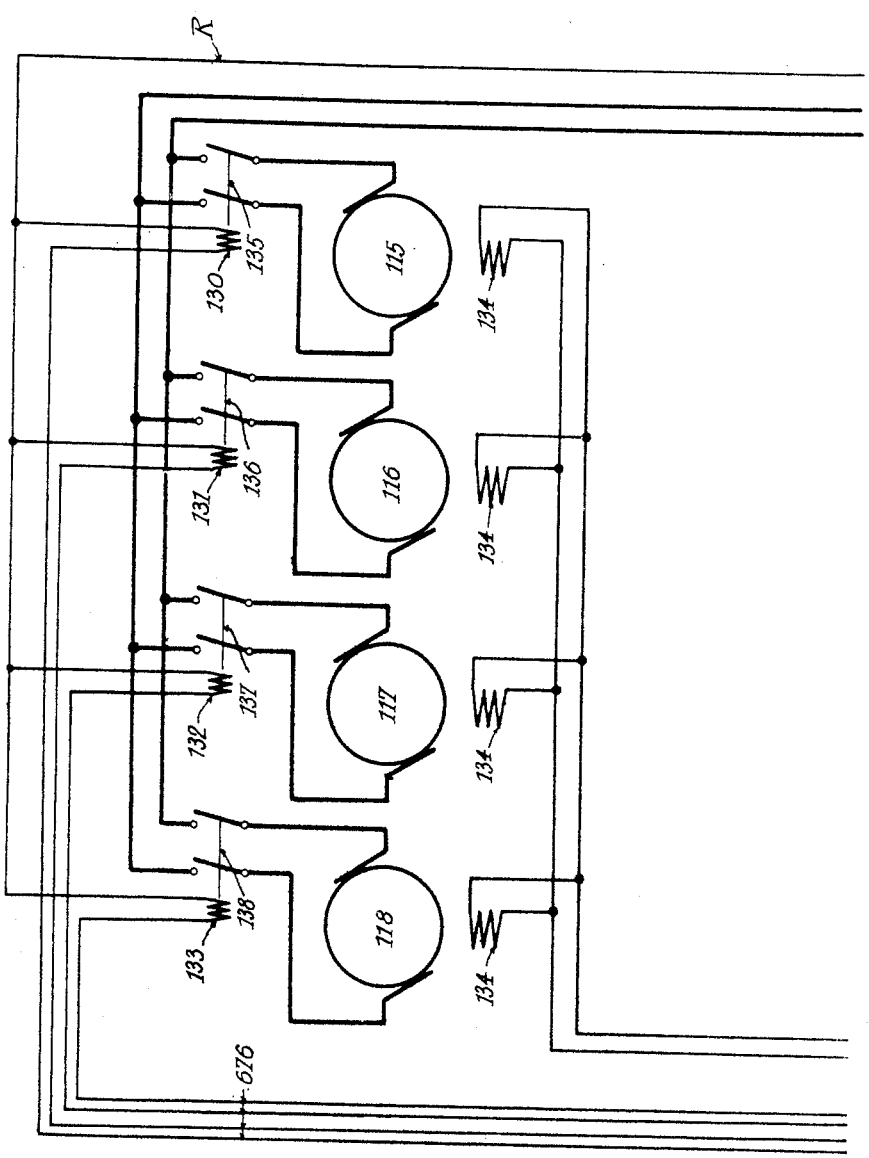

In Fig. 23 the four feed motors are energized in the same manner as in Fig. 7 through a Leonard group which is controlled also by the rheostat 190, Fig. 24, constructed and connected the same as in Fig. 8.

It should also be observed that the motor 563 of Fig. 20 is any one among these four feed motors 115, 116, 117, 118 and that the generator 564 and the driving motor 566 represent respectively the generator 120 and the driving motor 119 in Figs. 23 and 24.

The motors providing for shifting the upright 6, carriage 7, headstock 8 and table 9 of the machine which are indicated by the reference numbers 115, 116, 117 and 118 respectively have their armature windings connected in parallel to the armature of the generator 120 through the double pole contacts 135, 136, 137, 138 respectively of relays 130, 131, 132, 133.

The rotational direction of these motors 115, 116, 117, 118 is controlled by direction selecting switches 506, 507, 508, 509 respectively, as described in connection with Fig. 13, through circuits described hereafter. These switches are provided with shafts 423, 424, 425 and 426 carrying contact arms such as 730 and 735 (for switch 508). The selection of the feed motor 115, 116, 117, 118 to be energized is accomplished by means of member selecting switches 505 for the "automatic" feed movement and 510 for the "manually" controlled feed movement secured by means of the control disk 570, Figs. 20, 21, 22. The switch or selector 505 is provided with a shaft 421 carrying three contact arms 620, 625, 630 cooperating with three sets of studs 621, 622, 623, 624 for the arm 620, 626, 627, 628, 629 for the arm 625, 631, 632, 633, 634 for the arm 630. The four studs of each set are positioned so as to be engaged by the respective arms when the member selector 505 is respectively set to select the member to be moved. The switch or selector 510 is provided with a shaft 422 carrying two contact arms 635 and 640 cooperating with two sets of studs 636, 637, 638, 639 for the arm 635 and 641, 642, 643, 644 for the arm 640.

The speed of the motors 115, 116, 117, 118 is adjusted by means of the rheostat 190 having three sliders 191, 193 and 192. The slider 191 is adapted for controlling the feed speeds through the manual control disk 570, slider 193 for adjusting the so-called "working" feed speed and slider 192 for the so-called "engagement" speed feed.

The rheostat 190 is arranged in the energizing circuit of the field winding 123 of the generator 120 from the exciter armature 121 through a circuit comprising for the rotational direction called "forward direction" field winding 123, contact 163 of forward direction relay 160, armature winding of exciter 121, contact 162 of relay 160, wire 650, rheostat 190 and wire 651 again to field winding 123. For the reverse rotational direction the circuit comprises field winding 123, contact 167 of reverse relay 165, armature winding of exciter 121, contact 168 of relay 165, wire 650, rheostat 190, wire 651 again to the field winding 123.

In this second circuit the excitation current of the generator 120 is caused to flow in the reverse direction with respect to the first circuit. The generator armature current is thus reversed and the motors 115, 116, 117, 118 energized from this generator will then rotate in the opposite direction.

The forward and reverse relays 160 and 165 respectively have holding contacts 161 and 166. The energizing circuits of these two relays will be explained hereinafter.

When the entire resistance of rheostat 190 is inserted into the generator field winding circuit this generator which is caused to rotate at a constant speed thereby delivers its minimum voltage so that the motors 115, 116, 117, 118 will rotate at their lowest speed.

To set up the "engagement" speed, slider 192 is put into operation, that is, that portion of the rheostat 190 which is located above the slider 192 in Fig. 24 is short circuited when contact 74 of relay 71 is closed upon energizing relay 71.

The "working" speed is obtained by connecting the slider 193 in the circuit by energizing the relay 72 operating the contact 75 to short circuit that portion of the rheostat which is located above the slider 193 in Fig. 24.

Further, the "fast" speed is obtained by short circuiting the whole rheostat 190 by energizing relay 73 to close its contact 76.

The "manually controlled" feed speed is obtained when the control disk 570 is used through positioning according to the position of the disk 570 the slider 191 on rheostat 190, this slider being connected in circuit when contact 211 of relay 210 is closed upon energization of relay 210.

The adjustment of the respective positions of the sliders on the rheostat may be remote controlled through "telerotators" or receiver motors 200, 205, 202, e. g. of the Selsyn synchronously controlled type. Thus the manually controlled slider 191 is actuated by rotating the screw 194 driven by the receiver 200 connected by wires 653 to the transmitter 201 on the shaft 571 on which control disk 570 is fastened. Movement of slider 193 takes place through rotating the screw 196 driven by the receiver 205 connected through wires 655 to the transmitter 206 on the shaft of which is fastened the operating knob 111. On this shaft also is mounted the graduated drum 209 for directly indicating the selected "working" speed as described in connection with Figs. 13 to 15. Slider 192 is adjusted by means of the screw 195 rotationally driven by the receiver 202 connected through wires 657 to the transmitter 203 on the shaft of which is fastened the operating knob 110. The graduated drum 208 also is mounted on this shaft and shows directly the corresponding "engagement" speed as described in connection with Figs. 13 to 15.

The "automatic" operation at "minimum" speed, "engagement" speed, "working" speed, "fast" speed and "quick return" stroke speed is accomplished by actuating the lever 520 pivotally connected to the vertical shaft 530, Figs. 26 and 18. This lever may be moved in the grid 537 shown in dotted lines in Fig. 26 in two directions, horizontally in the slot 538, Figs. 26 and 19, about the vertical axis of shaft 530 and vertically about the pivotal axis 531 when the lever is so positioned as to register with one of the notches 539 and 540 designated in Figs. 26 and 13 by "Vm", "E", "W", "Q", and "R" which correspond to the above mentioned feed speeds respectively.

When the lever 520 is moved to a position to register with any of the notches E, W, Q, the speed cam 660, Fig. 26, engages respectively the corresponding switches 661, 662, 663.

When the lever 520 is raised within any of the notches the sector 555 carried by this lever at the opposite end from the end thereof which projects through the wall 521 of the box 499 is lowered so that the switch 549 is closed, Figs. 26 and 18. Conversely, when the lever 520 is lowered in a notch 540, the switch 547 is opened by the sector as it moves upwardly. The spring 532 is provided, as in Fig. 18, for ensuring the automatic return of the lever 520 to its horizontal position in which switch 549 is opened and switch 547 is closed.

The horizontal rotary movement of the lever 520 will also cause the cam member 665 to rotate, this cam being so formed with respect to two switches 667 and 668 that when one of these switches is closed by cam 665 the other is open. The cam 665 is arranged on shaft 530 in such relation to cam 660 and the locations of the contacts actuated by these cams is such that the switch 669 for "quick return" actuated by cam 660 is closed at the same time as switch 668 is closed by cam 665.

The switch 551 is arranged between the "fast" speed switch 663 and the "quick return" stroke switch 669 and is connected in series with the stop switch 547 in the holding circuit of relays 160 and 165 for preventing any sudden change from forward to return speed and vice-versa.

The control member for "manually controlling" the feed motion is the disk 570 which, as indicated hereinabove, is mounted on the shaft 571 of transmitter 201 for adjusting the position of slider 191 on rheostat 190. The shaft 571 also is connected with the cam 582, Figs. 26 and 20, adapted to operate switches 670, 671, 672, 673 and 674. This cam 582 is shown in the position corresponding to the neutral position of the disk 570 in which the front contacts 670, 671 and 672 are opened while the back contacts 673 and 674 are closed. The contacts 670, 671 are carried by cam follower 675 engaged on notch 676. Contacts 672, 673, 674 are carried by cam follower 427 engaged on notch 678. Immediately after the disk has been moved from its neutral position so that cam followers 675, 427 are forced outwardly by the cam 582 the front contacts 670, 671, 672 which were open will be closed and back contacts 673, 674 will be opened.

The contactors 130, 131, 132 and 133 for the four feed motors connected respectively to the contact studs 621, 622, 623, 624 for contact arm 620 of the member selector 505 (automatic operation) by means of wires 676 and 677 and respectively to the contact studs 641, 642, 643, 644 of the contact arm 640 of the member selector 510 (manually controlled operation) through the wires 676 and 678.

One terminal of each of these relays is directly connected to the phase R of the three-phase supply and the other terminal thereof is connected as stated in the preceding paragraph to the respective contact studs of the contact arms 620, 640 respectively of the two member selectors and thence through a circuit comprising the wire 679 and contact 673 for selector 505 and wire 680 and contact 672 for selector 510 both returning through the wire 681 to phase T of the supply.

The input terminals of the relays 160, 165 controlling the rotation of the motors 115, 116, 117, 118 respectively in the forward or reverse direction are directly connected to the phase R of the supply while their output terminals are connected respectively through wires 682 and 683 to the direction selectors 506, 507, 508 and 509 and through circuits which presently will be described in the description of the operational sequence.

I will now describe with reference to Figs. 23 to 27 inclusive the operation of the device for effecting the clamping of the movable members of the machine. Each member of the machine, when no feed motion is imparted thereto, must be firmly clamped on its supporting member. For each of the four members above referred to, the clamping actions are respectively controlled by the motors 291, 292, 293 and 294 (Fig. 27), which are fed from the three-phase supply R S T and controlled by means of "forward" and "reverse" relays permitting these motors to rotate in both directions. These relays are controlled by corresponding "clamping" buttons 91, 92, 93 and 94 and by "unclamping" contacts 41, 42, 43 and 44, these unclamping contacts being operated by the end thrust exerted on the corresponding direction selectors 506, 507, 508 and 509, Fig. 25. As all four control circuits of the motors 291, 292, 293, 294 are identical, it will be sufficient to describe only one of them.

The motor 294, for instance, is fed for rotation in one direction by the contacts 702, 703, 704 and in the other direction by the contacts 707, 708, 709. The contacts 702, 703, 704 are operated by the relay 700 having one terminal directly connected to the phase R of the supply and the other terminal to phase T through the circuit which includes switch 720, clamping contact 94 and then to phase T. The contact 701 is a holding contact whereby the relay 700 may be kept energized and its contacts closed after the clamping control contact 94 has opened upon release of its push button.

The switch 720 is a limit switch which will be opened when the clamping action takes place. To this end a nut 722 is shown threaded on a screw 723 rotating with the motor 294, the nut 722 being moved along the screw to engage and open the switch 720 when this motor has effected a sufficient number of revolutions to ensure the clamping required.

When this clamping action is effected, that is, when switch 720 is opened the other contact 721 will be closed, thus closing the circuit of a pilot or indicator lamp 344 to connect it across phases R and T of the supply.

The reverse rotational direction of the motor 294 is controlled by the contacts 707, 708 and 709 operated by means of a relay 705 which also is energized from the two phases R and T through a contact 44 actuated by pushing the selector 509 axially. A holding contact 706 and a limit switch 725 in series therewith across the supply corresponding to the holding contact 701 and limit switch 720 are provided for this reverse direction of rotation.

The circuits of the other three "clamping" motors 291, 292 and 293 are identical to that described hereabove for the motor 294, the numerals given in connection with motor 293, Fig. 27, being in corresponding order and the same for the corresponding parts as given in connection with Fig. 12 and the description of operation of the first embodiment.

The pilot lamps 341, 342, 343 and 344 are those which respectively illuminate the translucent rings correspondingly numbered on the front portion of the control box, Fig. 13, at the right side thereof, each pilot lamp being positioned level with the direction selector located to be associated with the member the clamping of which is indicated by the lamp.

The hereinabove described control box operates as follows:

When the machine is in its inoperative condition, the control disk 570 is in its inoperative position so that the contacts 670, 671 and 672 are open while the contacts 673 and 674 are closed.

The member selectors 505 and 510 as well as the direction selectors 506, 507, 508, 509 may have been left in any position. The "automatic" operation speed selecting lever 520 may have been left positioned so as to register with any of the notches Vm, E, W, Q or R. Ordinarily all the movable members will have remained clamped except the member involved in the last operation of the machine, for instance, the table 9.

It will be assumed that the operation to be carried out next is to move the headstock 8 toward the right on the carriage 7 through an "automatic" operation feed movement. The movement selector 505 is rotated to the position in which the arrow-shaped handle of this selector will be directed toward the direction selector 508 located on the pictorial representation of the headstock 8, Fig. 13. The direction selector 508 is rotated so as to direct the arrow head formed by its handle to the right which is the desired direction of movement of the headstock 8. This selector handle 508 then is pressed axially to close the headstock unclamping contact 43, thus causing relay 315 to be energized and hence the closing of its contacts 316, 317, 318 and 319. By closing the contact 316 the holding circuit of relay 315 is maintained after the selector 508 is released from axial pressure. The closing of contacts 317, 318, 319 will energize the motor 293 in the unclamping rotational direction; the nut 332 will be moved downward, Fig. 27, and when the member is unclamped it will open the switch 335 which is in the holding circuit with contact 316, thus cutting the holding circuit of contactor 315 and stopping the motor.

The control panel is now checked to ascertain whether all other movable members are suitably clamped. Thus, in the case contemplated, the operator will depress the button 94 to effect clamping of the table 9. Pressing of button 94, effects the clamping of the table which was previously unclamped and will cause relay 700 to be energized through the closed contact 720. The energization of relay 700 will then close the contacts 701, 702, 703, 704. The closing of contact 701 will maintain the holding circuit of relay 700 after the push button 94 has been released. Upon closing of the contacts 702, 703, 704 the motor 294 will be energized for the reverse rotary direction to produce upward movement in Fig. 27 of nut 722. In this movement this motor will therefore cause the table 9 to be clamped and on reaching the end of its movement, the nut 722 will open the limit switch 720, thus deenergizing the relay 700 and stopping the motor 294 while concomitantly closing the contact 721 which will switch on the pilot lamp 344 thereby indicating that the table 9 is suitably clamped.

The operation of selector 505 to point its arrow toward the direction selector 508 will connect the corresponding feed motor 117 for the headstock 8 to the terminals of the generator 120 upon closing contacts 137 when relay 132 controlling the connection of motor 117 is energized. Relay 132 is connected, on the one hand, to the R phase of the supply and, on the other hand, to the T phase thereof through the circuit comprising the respective wire 676, corresponding wire 677, contact stud 623, brush contact 620 of member selector 505, wire 679, closed contact 673 of the manual operation device, wire 681 and phase T.

Figure 25:
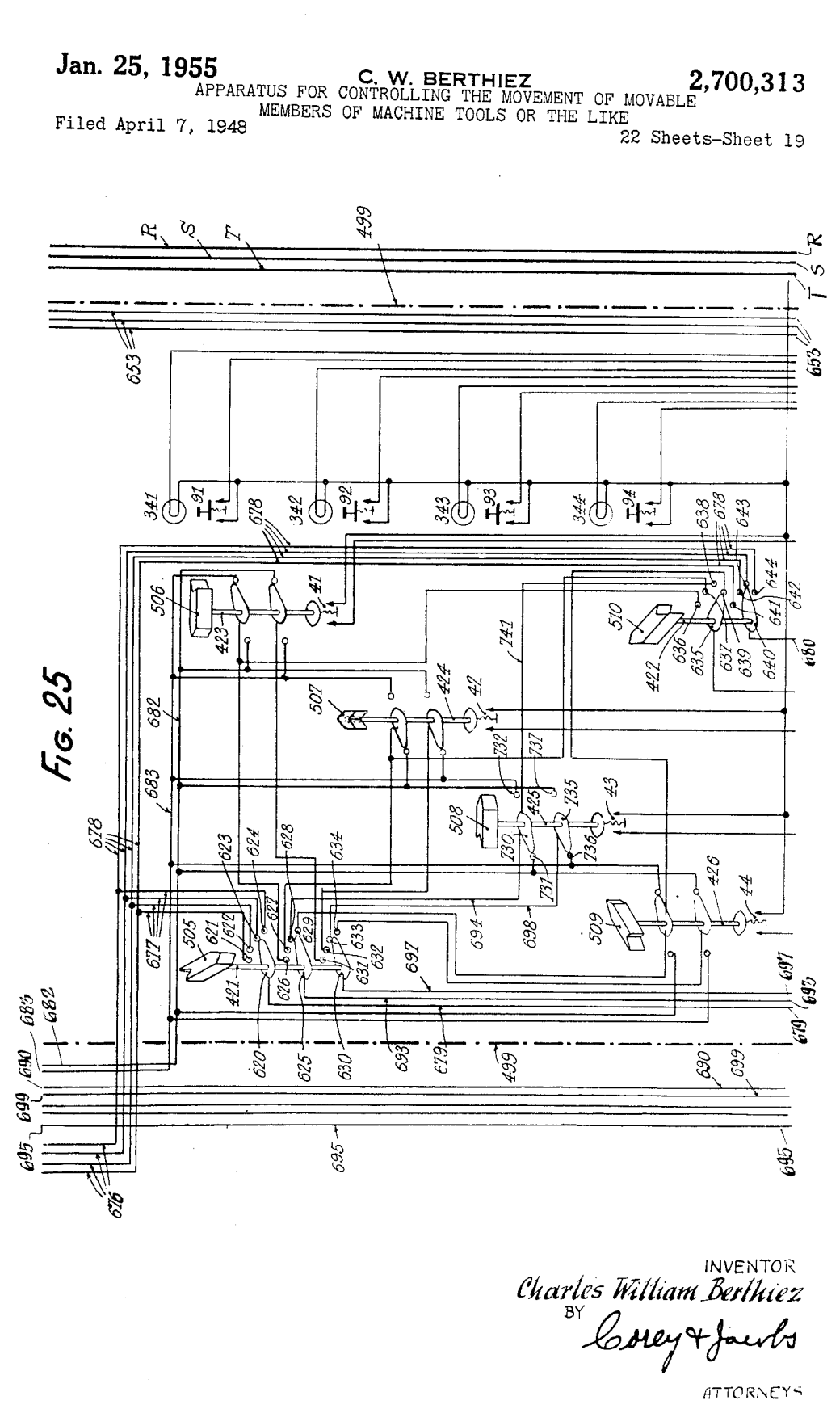

The setting of the direction selector 508 pointing toward the right Fig. 25 brings the brush contacts 730 and 735 respectively into engagement with the contact studs 731 and 736. These brush contacts 730 and 735 in cooperation with the contact studs 731, 732 and 736, 737 control the circuits respectively to the forward movement relay 160 and the reverse movement relay 165. As will be understood from the description of the circuits to follow, these brush contacts 730 and 735 are connected in circuit with the brush contacts 625 and 630 of the member selector 505 for conditioning the circuit for movement of the selected member in the selected direction.

However, the motor cannot start yet because the generator 120 driven by the three phase motor 119 will rotate without load since its field winding 123 is not yet connected to the exciter 121, both relays 160 and 165 being still deenergized.

If it is desired to impart to the headstock 8 which is now conditioned for movement toward the right a feed speed which is equal, for example, to the "engaging" speed of the tool on the work piece, the lever 520 is moved to register with the E notch and the engagement feed motion transmitter 203 is adjusted at the desired value by manually operating the knurled button 110, thereby rotating the receiver 202 until the slider 192 of the rheostat 190 is brought to the position corresponding to the desired engagement speed.

On the other hand, by closing the contact 661 through the action of the cam 660, when the lever 520 is in register with the notch E, the "engagement" speed relay 71 is energized through the circuit connected from phase T, wire 681, closed contact 661, wire 699, coil 71, which is directly connected with the R phase of the supply. The energization of coil 71 will close the contact 74, thus short circuiting that portion of the rheostat 190 which is located above the slider 192. The speed of movement of the headstock 8 is thereby determined. When the lever 520 is lifted into the upper notch E, thereby closing the contact 549 the circuit will be completed from phase T of the supply through wire 681 to the contact 674 now closed because the control disk 570 was left in its neutral position, thence to the closed contacts 551 and 547. During the period in which the lever 520 remains in its lifted position the circuit is continued from contact 547 through wires 691 and 692 to contact 549 closed as long as the lever is maintained lifted. Then it continues through the contact 667 which was closed by the cam 665 when the lever 520 was brought to register with the notch E, thence through wire 693, brush 625 of the member selector 505 and the contact stud 628, wire 694, brush 730, of the direction selector 508, contact stud 731, wire 682, relay 160, to phase R of the supply. Relay 160 is therefore energized, thus closing its contacts 161, 162, 163.

The closing of the holding contact 161 will ensure the self-energization of the relay 160 through wires 695, 691, closed contacts 547, 551, and 674 and wire 681 connected to the phase T of the supply.

The relay 160 will thus remain energized even after the operating lever 520 has been released downward to its intermediate neutral position. The closing of the contact 162 connects one terminal of the exciter 121 through wire 650 with the lower end of the rheostat 190 while the closing of the contact 163 connects the other terminal of the exciter with one end of the field winding 123 of the generator 120.

This field winding 123 of the generator is now energized with a current the value of which is determined according to the position of the "engagement" speed slider 192 through the following circuit: field winding 123, wires 651 and 696, contact 74 now closed, slider 192, rheostat 190, wire 650, contact 162, armature winding of the exciter 121, contact 163 and back to field winding 123.

From the preceding explanations it will be seen that the output of the exciter 121 is directed into the field winding 123 of the generator, but as motor 117 is already connected to the generator, as explained at the beginning of the description, it will start to rotate since its field winding 134 is steadily energized with a current derived from the exciter 121 as shown in Figs. 23 and 24. Therefore, the motor 117 will attain a speed which is in accordance with the position of the slider 192 controlling the "engagement" feed speed and will move the headstock 8 at this speed.

This drive will be continued until lever 520 is moved downward into the notch 540 below at E. This operation of lever 520 will open the contact 547 engaged by sector 555, thereby cutting off the holding circuit of relay 160. Contacts 162 and 163 thus will be opened and cause the field winding 123 of the generator to be disconnected from the exciter.

For moving the same machine member, i. e., the headstock 8, at another speed, for example the cutting or "working" speed, the lever 520 may be moved to the notch "W". This operation will open "engagement" contact 661 and close "working" contact 662, thus de-energizing relay 71 with subsequent opening of the contact 74 and energizing of "working" relay 72 with concomitant closing of contact 75 which will insert into the circuit the slider 193 controlling the "working" speed, this slider having been previously adjusted at the desired value by actuating the knurled button 111.

As with the preceding operation, to impart this "working" speed to the headstock 8, the lever 520 is raised into the upper notch "W".

As the member selector 505 and direction selector 508 have not been changed the same circuit as when operating at "engagement" speed will be set up, except that the field winding 123 of the generator 120 is energized with a somewhat stronger current, since the slider 193 is positioned to short circuit a greater portion of the rheostat 190 than the "engagement" speed slider 192.

Moreover, it is possible to change the headstock speed from "engagement" speed to "working" speed while the headstock 8 is moving at "engagement" speed. To this end, when the headstock 8 is driven at the "engagement" speed, the lever 520 is merely shifted along the horizontal slot 155 from the position at the notch E to that at the notch W without moving said lever downward as previously effected for stopping the movement and also without lifting it.

In a similar way, the "minimum" speed would be obtained by positioning the lever 520 at the "Vm" notch, whereby none of the contacts 661, 662, 663, 669 are closed because the cam 660 becomes moved to the right beyond the engagement contact 661, Fig. 26, thus causing the entire resistance of rheostat 190 to be inserted in the generator energizing circuit. The generator would therefore deliver the minimum voltage and consequently the motor 117 would rotate at its minimum speed.

To secure the "quick return" stroke of the headstock 8, the lever 520 is brought to register with the notch R and is then lifted. The contacts 668 and 669 will be closed respectively by cams 665 and 660 as shown in Fig. 26. Due to the closing of the contact 669, the relay 73 is energized, this relay and its contact 76 being the same as that used also for "fast" speed in either direction of movement selected for the selected member. The contact 76 is closed upon energization of relay 73 and the whole rheostat 190 is short circuited and the generator excitation is at its highest value. The motor 117 will now rotate, however, in the reverse direction because the closing of contact 668 has caused reverse movement relay 165 to be energized through the circuit connected from phase T, wire 681, circuit interrupting contacts now closed 674, 551, 547, wires 691 and 692, contacts 549 and 668, wire 697, brush 630 of the member selector 505, contact stud 633, wire 698, brush 735 of direction selector 508 for the headstock 8, contact stud 736, wire 683, to relay 165 the other terminal of which is directly connected to the phase R of the supply. The energizing of relay 165 closes both contacts 167 and 168, thus connecting the generator field winding 123 to the terminals of the exciter 121 but in the reverse polarity with respect to that produced for forward movement with the direction selector 508 still pointing to the right as shown in Fig. 25. This connection is maintained by the holding contact 166 after the lever 520 has been released.

It will be observed that when the lever 520 is moved from any position of register with any speed notch to the "quick return" position, and vice-versa, the cam 660 will open the contact 551 which will cut the holding circuit of both relays 160 and 165, and thereby open the connection between generator field winding 123 and the exciter 121 before effecting the reverse polarity connection thereof.

For moving any other movable member of the machine the member selector 505 is rotated so as to point toward the depicted member desired to be moved, that is, toward the direction selector associated with such member and this direction selector is set according to the desired direction of movement of the selected member. Before starting movement, however, the headstock 8 which was unclamped for movement is clamped by pressing push button 93 and the member which it is now desired to move is unclamped by pressing the direction selector associated with the depicted selected member.

The adjustment of the "engagement" and "working" speeds as well as the starting take place exactly in the same way as described for movement of the headstock 8.

In the "manual" control, the selection of the member to be moved and the selection of the direction of this movement are carried out in exactly the same way as above described.

The speed control for manual operation, however, is different since instead of having for selecting the speed of the feed motion a 5-position lever 520 adapted to be moved upwards and downwards at the selected position respectively to start and stop the member concerned, the control disk 570 is utilized whereby the selected member is set in motion at the minimum speed as soon as the disk is rotated away from its initial position and thereafter the more said disk is rotated by continued pressure of the finger the greater the speed attained until the whole of the rheostat 190 is short circuited which produces maximum speed of the driving motor 115, 116, 117, 118 for the selected member.

To revert to the same selected member and the same movement direction as in the preceding detailed example, the manual operation may be explained in the following manner:

As soon as the disk 570 is moved from its initial position, the cam 582 closes the contacts 670, 671, 672 while opening the contacts 673, 674. The opening of the contact 674 will immediately lock the "automatic" operation speed control by opening the circuit through the starting contact 549 actuated by the lever 520 while the opening of the contact 673 will similarly lock the "automatic" operation member selection by opening the circuit through the brush 620 of selector 505. This member selection will now take place for "manual" operation with the selectors 510 and 508 in the positions shown in Fig. 25 through the contact 672 closed upon moving the disk 570, wire 680, brush 640 of "manual" operation member selector 510, stud 643 of this selector, corresponding wires 678 and 676 to relay 132 and thence to the phase R of the supply.

The closing of the contact 670 connects for operation the "manual" control slider 191 through the closing of the contact 211 of the relay 210 energized through the circuit comprising phase T of the supply, wire 681, contact 670, wire 699, relay 210, phase R of the supply.

Closing the contact 671 will secure the direction selection, that is, the energization of the forward direction relay 160 as for "automatic" operation above described through a circuit from phase T of the supply, wire 681, closed contact 670, closed contact 671, brush 635 of the member selector 510, contact stud 638, wire 741, brush 730 of the direction selector 508, stud 731 of this selector, then, in the same manner as for "automatic" operation, wire 682, forward direction relay 160, phase R of the supply.

Thus, the motor 117 is set in motion exactly as for "automatic" operation but the speed variations of this motor are secured by movement of the slider 191 effected by the receiver 200 connected through wires 653 to transmitter 201 upon the shaft of which the control disk 570 is fastened.

In a similar manner as in "automatic" operation, any of the four movements may be controlled in both directions by means of the "manual" control disk by setting the member selector 510 to point to the direction selector 506, 507, 508, 509, associated with the depicted selected member and by setting this direction selector to point in the selected direction of movement.

It will be understood that the clamping and unclamping of the various members take place in the same manner as for "automatic" control.

I will now describe with reference to Figs. 28, 29 and 30 the construction of the portable control box 499 at its upper end and of the member from which it is suspended.

According to a first embodiment illustrated in Fig. 28 the portable control box 499 is suspended by means about to be disclosed from the lower end of the conductor sheath 750 through which electric cables, not shown, may pass and be connected to the different controlling and signalling members of the movable control box hereinabove disclosed, such as levers, push buttons, lamps, relays and auxiliaries and the like used for the control of the different motors driving the movable members of the machine.

The control box 499 itself is formed at its upper end to receive the outer race 751 of a self aligning ball bearing provided with two rows of balls, this race being positioned between a shoulder 752 machined in the control box 499 and a yielding ring 753 housed in a groove 754 also formed in the upper end of the portable control box 499.

The inner race 755 of the ball bearing is carried by a sleeve 756 the lower threaded part of which is adapted to receive a nut 757 locking the ring 755 against a shoulder on the sleeve 756. This sleeve is welded to the lower end of the sheath 750 and carries an inverted cup shaped member 758 secured to the sleeve 756 by means of screws 759 which fasten at the same time a flanged socket 760. This socket serves for holding fast over the sheath 750 an expansible sleeve 761 the two ends of which are tapering, the lower end of this sleeve 761 cooperating with the lower correspondingly bevelled inner surface of the flanged socket 760 while the upper end of the expansible sleeve 761 cooperates with an inwardly frusto-conical washer 762 held in place by means of a nut 763 threaded on the outer surface of the flanged socket 760. The object of this mounting is to reinforce the means for securing the sheath as already provided through a welding between the terminal sleeve 756 and the sheath 750.

The inverted cup shaped member 758 is provided with a projection or stud 764 serving as an abutment for limiting the rocking motion of the control box and adapted to cooperate with the shoulder of a recess 765 formed at the inside of an outer inverted cup shaped member 766 rigid with an annular part 767 to which it is secured through the screws 768. Centering pins 769 provide for the concentricity of the mounting with the outer cup shaped member 766. The annular member 767 is secured to the upper portion of the control box 499 through any suitable means, such as the screws 770.

An abutment 771 is secured inside the outer inverted cup shaped member 766 by means of screws 772 and serves for limiting the rotary movement of the control box with reference to the inner inverted cup shaped member 758 through engagement with the stud 764 fastened in the inverted cup shaped member.

The operation of the arrangement that has just been described will be clear. By reason of the control box 499 being mounted on a self aligning ball bearing mounted on the inverted cup shaped member 758 secured to the end of the sheath 750 it is possible to produce rotation of the control box around a substantially vertical axis through an angle of nearly 360° limited only by the contact between the stud 764 and the abutment 771. The object of such limitation is to prevent the rotation of the control box 499 through more than one revolution in order to avoid damage to the electric cables leading to it through sheath 750. It is apparent that the mounting disclosed, in addition to a rotary movement around a substantially vertical axis, allows also for some inclination of the control box for greater convenience of operation by the operator of the machine. This inclination is limited by the engagement of the stud 764 with the shoulder of recess 765 of the inverted cup shaped member 766.

Fig. 29 shows a mounting which is somewhat different from that of Fig. 28 in being constructed for unlimited rotation of the control box 499 about the vertical axis. In this embodiment the control box 499 is suspended from the machine frame by means of a chain 773 instead of by means of sheath 750 enclosing the electric cables.

According to this embodiment, the control box 499 proper is supported by an outer race 774 of a ball bearing which is held in place as in the preceding embodiment by means of an elastic ring 753. The inner race 775 of the ball bearing is mounted on a hub 776 against a shoulder formed therein and is held fast on this hub by means of nut 777. The hub 776 is held by means of screws 778, as shown in Fig. 30, securing it to the supporting head 779 which carries the yoke 780, Fig. 29, through which pin 781 passes for engaging the suspension chain 773. The head 779 is provided with two openings 782 therethrough housing the terminal sleeves 783 for corresponding sheaths 784, 785 welded thereto and serving for leading the electric cables to the inside of the control box 499. The terminal sleeves 783 respectively are held in place by means of flanges 786 secured to the supporting head 779 by means of screws 787 as illustrated in Fig. 30. Thus the weight of the control box 499 is supported not by the sheaths 784, 785 protecting the electric cables but through the chain 773.

The means which provides for unlimited rotation of the control box in the embodiment of Figs. 29, 30 is constituted by a system of rings and brushes cooperating therewith which are coaxial with the axis of rotation of the box 499. The conductive rings 788, Fig. 29, are mounted on insulating rings 789 stacked upon one another and secured to the base of the hub 776 by means of screws 790. The electrically conductive rings 788 are provided each with a counter-sunk opening 791 into which may be soldered the end of the electric wires 792.

The conductive rings 788 are in contacting relationship with the current collecting brushes 793 secured to an insulating arm 794 fastened to the control box 499 and to which the brushes 793 are secured by means of bolts 795 acting also as terminals.

It is apparent that with this arrangement it is possible to make the control box 499 rotate through any desired angle and if required through several complete revolutions in the same direction without producing any torsional stress in the electric cables 792 because relative movement is provided between the brushes 793 and the conductive rings 788.

An inspection door 796 secured by screws 797 serves in both embodiments disclosed for the mounting of the control box on the suspension means and for checking the state of the connections during operation.

Having described the suspension device of the control box 499, I will now describe more completely the arrangement of the different elements contained in said control box and already described per se hereinabove. To this end, I refer now more particularly to Figs. 31 and 32. The control device for selecting the speeds shown in section in Fig. 31 is similar to the device shown diagrammatically on Fig. 26 and the same references have been adopted for similar members.

As concerns the contact pieces 547 and 549, each of them is provided with an actuating rod 428 adapted to reciprocate in a sleeve 429 that houses a ball 430 engaging the end of this rod. The sector 555 is secured to the inner end of lever 520 (see also Fig. 32) and adapted to engage one or the other of said balls while the lever is raised or lowered, thus actuating either of contacts 547 or 549.

As concerns the positioning device, in the embodiment shown on Fig. 18, this device is incorporated within the combination switch 535, whereas in the embodiment shown on Figs. 31 and 42, it is located in the upper part of the assembly and constituted exactly in the same manner as the positioning device shown on Fig. 16 for the movement selectors, that is to say it comprises a star like part 431 rigid with shaft 530 and adapted to cooperate with rollers 432 carried by arms 433 pivotably mounted upon the combinator frame and urged towards each other by a spring 434.

Beside this control device, on the left hand side is mounted the lighting device 56 with its switch 57 (Fig. 31). The manual control device 570, located at the right hand bottom part in Fig. 31, is similar to that described with reference to Figs. 20 to 22, the similar members being designated by the same reference members in Figs. 31-32 and 20-22. However a flat spiral spring 435 (Fig. 31) is substituted for the wire helical spring 575 of Figs. 21 and 22 and the resilient stop 614 of Fig. 21 is replaced by a rigid one 436 (Fig. 31) which in the resting position of disc 570 is in engagement with a part 437 which carrying a stud 439 operatively connected to one end of spring 435 the other end of which is attached to a stud 438 secured to the casing 499 of the control box. As may be readily seen in Fig. 31, the shaft 571 of disc 570 is directly coupled to the transmitter 201.

In the middle of Fig. 31, the reference numbers 421 and 422 apply to the shafts of movement selectors 505 and 510 respectively, whereas numerals 423, 424, 425 and 426 designate the shafts of direction selectors 506, 507, 508, 509 respectively as stated with reference to Fig. 13. Beside these selectors, on the right hand side may be seen the signal lamps 341, 342, 343, 344 also already mentioned with reference to Fig. 13. These lamps are arranged in a special casing 441, with screens 442 between the lamps. The exterior plate of said casing is provided with holes 443 for cooling purposes. This exterior plate is removable and is secured to the casing 499, by means of screws 444.

The top of the right hand side wall of the portable station casing shows the knob 111 rigid with drum 209 and whose shaft 440 is directly coupled to transmitter 206 for adjusting the "working" feed previously mentioned.

This application is a continuation-in-part of the applications Serial No. 691,362, filed August 17, 1946, now abandoned and Serial No. 780,670, filed October 18, 1947, now abandoned.

I claim:

1. In a device for controlling the movement of the movable members of a machine tool or the like, in combination, a panel, said panel carrying on the exterior face thereof a pictorial representation of said machine tool and of the movable members thereof, a selector element supported adjacent the exterior face of the panel for movement over said face to different positions thereon in which respectively said selector element is oriented toward locations on said panel respectively identified with the depictions on said panel of the movable members of said machine tool for selecting any of said movable members, and direction indicators carried by said panel respectively in said locations for indicating the directions of movement of the respective movable members.

2. In a device for controlling the movement of the movable members of a machine tool or the like, in combination, a panel, said panel carrying on the exterior face thereof a pictorial representation of said machine tool and of the movable members thereof, a selector element supported adjacent the exterior face of the panel for movement over said face to different positions thereon in which respectively said selector element is oriented toward locations on said panel respectively identified with the depictions on said panel of the movable members of said machine tool for selecting any of said movable members, direction indicators carried by said panel respectively in said locations for indicating the directions of movement of the respective movable members, and manually operable means carried by said panel and operatively connectible to the respective machine tool members and connected to said indicators selectively to control and to indicate the direction of movement of the movable member selected by said selector element oriented toward the depicted selected movable member.

3. In a device for controlling the movements of the movable members of a machine tool or the like, the combination as defined in claim 2 in which said manually operable means is carried by said selector element and is operable in each of said positions of said selector element to determine the direction of movement of the selected movable member of the machine tool.

4. In a device for controlling the movement of the movable members of a machine tool or the like, in combination, a panel, said panel carrying on the exterior face thereof a pictorial representation of said machine tool and of the movable members thereof, a selector element supported adjacent the exterior face of the panel for movement over said face to different positions thereon in which respectively said selector element is oriented toward locations on said panel respectively identified with the depictions on said panel of the movable members of said machine tool for selecting any of said movable members, indicators carried by said panel respectively associated with the depicted movable members in locations corresponding to different positions on said panel to which said selector element is movable for indicating the conditions of mobility and immobility of the respective movable members.

5. In a device for controlling the movement of the movable members of a machine tool or the like, in combination, a panel, said panel carrying on the exterior face thereof a pictorial representation of said machine tool and of the movable members thereof, a selector element supported adjacent the exterior face of the panel for movement over said face to different positions thereon in which respectively said selector element is oriented toward locations on said panel respectively identified with the depictions on said panel of the movable members of said machine tool for selecting any of said movable members, indicators carried by said panel respectively associated with the depicted movable members in locations corresponding to different positions on said panel to which said selector element is movable for indicating the conditions of mobility and immobility of the respective movable members, and manually operable means carried by said panel adjacent the respective indicators and operatively connectible to the respective machine tool members and connected to the respective indicators for determining and indicating said conditions of mobility or immobility of the respective movable members.

6. In a device for controlling the movement of the movable members of a machine tool or the like, in combination, a panel, said panel carrying on the exterior face thereof a pictorial representation of said machine tool and of the movable members thereof, a selector element supported adjacent the exterior face of the panel for movement over said face to different positions thereon in which respectively said selector element is oriented toward locations on said panel respectively identified with the depictions on said panel of the movable members of said machine tool for selecting any of said movable members, manually operable means carried by said panel respectively associated with the depicted movable members in locations corresponding to said different positions on said panel to which said selector element is movable and operatively connectible to the respective machine tool members for determining the conditions of mobility and immobility of the respective movable members, and indicators carried by said manually operable means for indicating said conditions.

7. In a device for controlling the movements of the movable members of a machine tool or the like, the combination as defined in claim 5 in which said manually operable means carried by said panel adjacent the respective indicators are adapted to determine the clamping and unclamping of the selected members of the machine tool.

8. In a device for controlling the movements of the movable members of a machine tool or the like, the combination as defined in claim 2 which comprises luminous signal means associated with the respective indicators and connected to said manually operable means selectively to be illuminated upon operation of said manually operable means.

9. In a device for controlling the movements of the movable members of a machine tool or the like, the combination as defined in claim 5 in which said indicators are associated with luminous signal means adapted to be illuminated upon operation of said manually operable means to indicate the selected condition.

10. In a device for controlling the movements of the movable members of a machine tool or the like, in combination, a panel, said panel carrying on the exterior face thereof a pictorial representation of said machine tool and of the movable members thereof, a selector element supported adjacent the exterior face of said panel for rotation on an axis extending transversely of said face of the panel to different positions angularly spaced with respect to one another about said axis identified respectively with the depictions on said panel of the movable members of said machine tool for selecting any of said movable members, direction indicators carried by said panel identified with the respective depicted movable members and disposed so as to indicate the directions of movement of the respective movable members, said indicators for the different depicted movable members being positioned in angularly spaced relation about the axis of rotation of said selector element in locations identified with said angularly spaced positions of said selector element.

11. In a device for controlling the movement of the movable members of a machine tool or the like, in combination, a panel, said panel carrying on the exterior face thereof a pictorial representation of said machine tool and of the movable members thereof, a selector element supported adjacent the face of the panel for movement thereof over said face to different positions on said panel respectively identified with the several depicted movable members of the machine tool for selecting any of said movable members, and direction selectors carried by the panel in locations respectively identified with said depicted movable members and operable for selectively controlling the direction of movement of the respective movable members.

12. In a device for controlling the movements of the movable members of a machine tool or the like, in combination, a panel, said panel carrying on the exterior face thereof a pictorial representation of said machine tool and of the movable members thereof, a plurality of selector elements each supported adjacent the face of the panel for movement thereof over said face to different positions thereon respectively identified with the several depicted movable members of the machine tool for selecting any of said movable members, and direction selectors carried by said panel in locations respectively identified with said positions and operable for selectively controlling the directions of movement of the respective movable members, the locations identified with the different positions to which one of said selector elements is movable respectively being identified with the different positions to which another of said selector elements is movable.

13. In a device for controlling the movements of the movable members of a machine tool or the like, the combination, as defined in claim 11 in which manually operable means are carried by said direction selectors for determining conditions of mobility and immobility of the respective movable members.

14. In a device for controlling the movements of the movable members of a machine tool or the like, in combination, a panel, said panel carrying on the exterior face thereof a pictorial representation of said machine tool and of the movable members thereof, two rotary selector elements each provided with index means and supported adjacent the face of the panel for rotation thereof over said face on an axis transverse to said face to different angularly spaced positions thereon identified respectively with the depictions on said panel of the movable members of said machine tool, locations on said panel respectively adjacent the several depicted members of the machine tool, direction selectors carried by said panel in said locations and operable for selectively controlling the directions of movement of the respective movable members, said index means of each of said rotary selector elements pointing towards said locations for the different positions of said selector element, and manually operable means carried by said direction selectors for determining conditions of mobility and immobility of the respective movable members.

15. In a device for controlling the movement of the movable members of a machine tool or the like, the combination as defined in claim 2, which comprises a plurality of direction selectors disposed on said panel respectively adjacent the depicted movable members, each direction selector being actuatable to different positions corresponding to the respective directions of movement of a movable member of the machine tool, said direction selectors being independently operable one with respect to the other and independently operable with respect to said selector element.

16. In a device for controlling the movement of the movable members of a machine tool or the like, the combination as defined in claim 11 in which each of said direction selectors is provided with indicator means for indicating the directions of movement of the respective movable members of the machine.

17. In a machine tool or the like comprising several movable members, at least one motor for driving said members, the speed of said motor being determined by adjusting means and said motor being associated with starting and stopping means, a device for controlling the movements of said movable members, said device comprising, in combination, a control box, a panel mounted on the front face of said control box, said panel carrying on the exterior face thereof a pictorial representation of said machine tool and of the movable members thereof, at least one selector element supported adjacent the exterior face of said panel for movement over said face to different positions thereon in which respectively said selector element is oriented toward locations on said panel respectively identified with the several depicted movable members of said machine tool for selecting any of said movable members, indicators carried by said panel in said locations for indicating the conditions of movement of the respective movable members, at least one manually operable system operatively connected to said movable members and to said indicators selectively to secure and to indicate said conditions, and manually operable means operatively connected to said adjusting means and to said starting and stopping means and connected to said selector element for actuating said adjusting means and said starting and stopping means to start and stop and adjust the speed of the selected member.

18. In a machine tool or the like comprising several movable members, at least one motor for driving said members, the speed of said motor being determined by adjusting means and said motor being associated with reversing, starting and stopping means, a device for controlling the movements of said movable members, said device comprising, in combination, a control box, a panel mounted on the front face of said control box, said panel carrying on the exterior face thereof a pictorial representation of said machine tool and of the movable members thereof, at least one selector element supported adjacent the exterior face of said panel for movement over said face to different positions thereon in which respectively said selector element is oriented toward locations on said panel respectively identified with the several depicted movable members of said machine tool for selecting any of said movable members, direction indicators carried by said panel in said locations for indicating the direction of movement of the selected member to be moved, manually operable direction selecting means operatively connected to said reversing means and operable to control the direction of movement of the movable member selected by positioning of said selector element, said direction indicators being connected to said direction selecting means to indicate the selected direction of movement of the selected member, and manually operable means operatively connected to said adjusting means and to said starting and stopping means and connected to said selector element for actuating said adjusting, starting and stopping means to start and stop and adjust the speed of the selected member.

19. In a machine tool or the like comprising several movable members, at least one motor for driving said members, the speed of said motor being determined by adjusting means and said motor being associated with starting and stopping means, a device for controlling the movements of said movable members, said device comprising in combination, a control box, a panel mounted on the front face of said control box, said panel carrying on the exterior face thereof a pictorial representation of said machine tool and of the movable members thereof, at least one selector element supported adjacent the exterior face of said panel for movement over said face to different positions thereon in which respectively said selector element is oriented toward locations on said panel respectively identified with the several movable members of said machine tool for selecting any of said movable members, indicators carried by said panel at said locations for indicating the condition of mobility or immobility of the corresponding movable member, manually operable means operatively connected to said movable members and to said indicators for securing and indicating said conditions of mobility or immobility of the movable members, and manually operable means operatively connected to said adjusting, starting and stopping means and connected to said selector element for actuating said adjusting, starting and stopping means to start and stop and adjust the speed of the selected member.

20. In a machine tool or the like comprising several movable members adapted to be movable along slideways and provided with clamping means for clamping them at any point on their respective slideways, at least one motor for driving said members, the speed of said motor being determined by adjusting means and said motor being associated with reversing, starting and stopping means, a device for controlling the movements of said movable members, said device comprising in combination, a control-box, a panel mounted on the front face of said control box, said panel carrying on the exterior face thereof a pictorial representation of said machine tool and of the movable members thereof, at least one selector element supported adjacent the exterior face of said panel for movement over said face to different positions thereon in which respectively said selector element is oriented toward locations on said panel respectively identified with the several depicted movable members of said machine tool for selecting any of said movable members, indicators carried by said panel respectively identified with the depicted movable members for indicating the clamped and unclamped conditions of the respective movable members, manually operable means operatively connected to said indicators and to said clamping means for indicating and for effecting the clamping and the unclamping of the respective members on their slideways, direction indicators carried by said panel in said locations for indicating the direction of movement of the selected member to be moved, manually operable direction selecting means operatively connected to said direction indicators and to said reversing means selectively to indicate and to control the direction of movement of the movable member selected by positioning of said selector element, and manually operable means operatively connected to said adjusting, starting and stopping means and connected to said selector element for actuating said adjusting, starting and stopping means to start and stop and to adjust the speed of the selected member.

21. In a machine tool or the like comprising several movable members adapted to be moved along slideways and each provided with clamping means for clamping said members at any point on their slideways, at least one motor for driving said members, the speed of said motor being determined by adjusting means and said motor being associated with starting and stopping means, a device for controlling the movements of said movable members, said device comprising, in combination, a control box, a panel mounted on the front face of said control box, said panel carrying on the exterior face thereof a pictorial representation of said machine tool and of the movable members thereof, at least one selector element supported adjacent the exterior face of said panel for movement over said face to different positions thereon in which respectively said selector element is oriented toward locations on said panel respectively identified with the several movable members of said machine tool for selecting any of said movable members, indicators carried by said panel in positions identified with said locations for indicating the clamped and unclamped conditions of the respective movable members, manually operable means carried by said control box and operatively connected to said indicators and to said clamping means for actuating the same to indicate and effect clamping and unclamping of the respective members, and manually operable means carried by said control box and operatively connected to said adjusting, starting and stopping means and connected to said selector element for actuating said adjusting, starting and stopping means to start and stop and to adjust the speed of the selected member.

22. In a machine tool or the like comprising several movable members adapted to be moved along slideways and each provided with clamping means for clamping said members at any point on their slideways, at least one motor for driving said members, the speed of said motor being determined by adjusting means and said motor being associated with starting and stopping means, a device for controlling the movements of said movable members, said device comprising, in combination, a control box, a panel mounted on the front face of said control box, said panel carrying on the exterior face thereof a pictorial representation of said machine tool and of the movable members thereof, at least one selector element supported adjacent the exterior face of said panel for movement over said face to different positions thereon in which respectively said selector element is oriented toward locations on said panel respectively identified with the several movable members of said machine tool for selecting any of said movable members, indicators carried by said control box respectively identified with the several depicted movable members for indicating the clamped and unclamped conditions of the respective movable members, manually operable means carried by said panel in the respective locations and operatively connected to the respective indicators and to the respective clamping means for releasing said clamping means and indicating the released condition thereof, manually operable means carried by said control box and operatively connected to the respective clamping means for actuating said clamping means, and manually operable means carried by said control box and operatively connected to said adjusting, starting and stopping means and connected to said selector element for actuating said adjusting, starting and stopping means to start and stop and adjust the speed of the selected member.

23. In a machine tool or the like comprising several movable members, at least one motor for driving said members and associated with starting and stopping means and adjusting means adapted to vary the speed of said motor in a progressive manner, and a device for controlling the movements of said movable members, said device comprising in combination, a control box, a panel mounted on the front face of said control box, said panel carrying on the exterior face thereof a pictorial representation of said machine tool and of the movable members thereof, at least one selector element supported adjacent the exterior face of said panel for movement over said face to different positions thereon in which respectively said selector element is oriented toward locations on said panel respectively identified with the several movable members of said machine tool for selecting any of said movable members, and manually operable means carried by said control box and operatively connected to said selector member and to said starting and stopping means and to said speed adjusting means to start and stop said motor and to actuate said adjusting means concomitantly with the movement of said manually operable means to effect control of a progressive variation in the speed of the machine tool member selected by said selector element.

24. In a machine tool or the like comprising several movable members, at least one motor for driving said members and associated with starting and stopping means, a device for controlling the movements of said movable members, said device comprising in combination, a control box, a panel mounted on the front face of said control box, said panel carrying on the exterior face thereof a pictorial representation of said machine tool and of the movable members thereof, at least one selector element supported adjacent the exterior face of said panel for movement over said face to different positions thereon in which respectively said selector element is oriented toward locations on said panel respectively identified with the several movable members of said machine tool for selecting any of said movable members, at least one speed adjusting means operable to make said motor run at a speed selectively chosen among a number of predetermined operating speeds, a lever supported on said control box to be movable to and fro in a predetermined path of movement successively to a plurality of speed selecting positions corresponding to said predetermined operating speeds, said lever being movable in said positions transversely of said path, means confining said lever when in a selected position and moved transversely of said path to prevent movement in a direction parallel to said path to another selected position, means operatively connecting said lever and said speed adjusting means for actuating said speed adjusting means when said lever is moved to and fro in said predetermined path of movement, and means operatively connecting said lever and said starting and stopping means and said selector element for actuating said starting and stopping means when said lever is moved at a selected position transversely of said path to effect movement of the selected movable member.

25. In a machine tool or the like comprising several movable members adapted to be movable along slideways and respectively provided with clamping means for clamping them at any point on their respective slideways, at least one motor for driving said members and associated with reversing and starting and stopping means and with adjusting means adapted to vary the speed of said motor in a progressive manner, conditioning means for conditioning the operation of a selected movable member of said machine-tool, and a device for controlling the movements of said movable members, said device comprising, in combination, a control box, a panel mounted on the front face of said control box and carrying a pictorial representation of said machine tool and of the movable members thereof, a first and a second selector element each supported adjacent the exterior face of said panel for movement over said face to different positions thereon in which said selector elements respectively are oriented toward the respective depictions on said panel of the movable members of said machine tool, said selector elements in the respective positions each being adapted to actuate said conditioning means to condition the corresponding member for operation thereof, direction selectors supported adjacent the respective depicted movable members on the exterior face of said panel for movement over said panel to different positions corresponding to different directions of movement of the respective members and adapted to actuate said reversing means, indicator means carried by said direction selectors for indicating the direction of movement of said selected movable member of said machine-tool, clamping manually operable means carried by said control box and connected to said member clamping means for effecting the clamping of the respective members on their slideways, unclamping manually operable means carried by said direction selectors and connected to said member clamping means for unclamping said respective members, indicators carried by said control box and associated with said clamping manually operable means to indicate the clamped condition of the respective members, manually operable speed control means carried by said control box operatively connected to said starting and stopping means and to said first selector element and to said adjusting means to actuate said adjusting means concomitantly with movement of said manually operable means to effect control of a progressive variation in the speed of the machine tool member selected by said first selector element, settable means adapted to control said speed adjusting means and operable to a plurality of positions corresponding to different predetermined operating speeds of the motor, a lever supported to be movable to and fro in a predetermined path of movement successively to a plurality of selecting positions corresponding to said predetermined operating speeds, said lever being movable in said positions transversely of said path, means confining said lever when in a selected position and moved transversely of said path to prevent movement in a direction parallel to said path to another selecting position, means connecting said second selector element to said lever when moved to and fro in said predetermined path of movement to determine the speed of the movable member selected by said second selector, means connecting said settable means to said lever for actuating said settable means when said lever is moved along said path, and means operatively connecting said starting and stopping means to said lever when moved at a selected selecting position transversely of said path for actuating said starting and stopping means to effect operation of the machine-tool member selected by said second selector element at the speed selected by said selecting means.

26. In a machine tool or the like comprising several movable members adapted to be movable along slideways and respectively provided with clamping means for clamping them at any point on their respective slideways, at least one motor for driving said members and associated with reversing and starting and stopping means, a first and a plurality of other speed adjusting means adapted to vary the speed of said motor in a progressive manner, conditioning means for conditioning the operation of a selected movable member of said machine-tool, and a device for controlling the movements of said movable members, said device comprising, in combination, a control box, a panel mounted on the front face of said control box and carrying a pictorial representation of said machine tool and of the movable members thereof, a first and a second selector element each supported adjacent the exterior face of said panel for movement over said face to different positions thereon in which said selector elements are oriented toward the respective depictions on said panel of the movable members of said machine-tool, said selector elements in the respective positions each being adapted to actuate said conditioning means to condition the corresponding member for operation thereof, direction selectors supported adjacent the respective depicted movable members on the exterior face of said panel for movement over said panel to different positions corresponding to different directions of movement of the respective members and adapted to actuate said reversing means to determine the direction of movement of the selected member, indicator means carried by said direction selectors for indicating the direction of movement of said selected movable member of said machine-tool, clamping manually operable means carried by said control box and connected to said member clamping means for effecting the clamping of the respective members on their slideways, unclamping manually operable means respectively carried by said direction selectors and connected to the respective member clamping means for unclamping said respective members, indicators carried by said control box and associated with said clamping manually operable means for indicating clamping of the respective movable members, manually operable speed control means carried by said control box operatively connected to said starting and stopping means and to said first speed adjusting means and to said first selector element to actuate said first speed adjusting means concomitantly with movement of said manually operable speed control means to effect control of a progressive variation in the speed of the machine-tool member selected by said first selector element, settable means adapted to control a given one of said other speed adjusting means and operable to a plurality of positions corresponding to different predetermined operating speeds of the machine, a lever supported to be movable to and fro in a predetermined path of movement successively to a plurality of selecting positions corresponding to said different predetermined operating speeds of said machine, said lever being movable in said positions transversely of said path, means confining said lever when in a selected position and moved transversely of said path to prevent movement in a direction parallel to said path to another selecting position, means operatively connecting said second selector element to said lever to select a speed for a movable member selected by said second selector element when said lever is moved to a selected position in said predetermined path of movement, means connecting said given speed adjusting means to said lever in said selected position of said lever for determining the speed of said selected member as set by said settable means, means operatively connecting said starting and stopping means to said lever when moved at said selected position transversely of said path for actuating said starting and stopping means to effect operation of the machine-tool member set by said second selector element at the speed selected by said settable means, and manually operable speed control means operatively connected to another of said speed adjusting means and to said lever for determining in a different selected position of said lever a different operating speed.

27. In a machine tool or the like comprising several movable members, at least one motor for driving said members, the speed of said motor being determined by adjusting means and said motor being associated with reversing and starting and stopping means, a portable control device, and a stationary control device for controlling the movements of said movable members, each of said devices comprising, in combination, a support, a panel mounted on the front face of said support, at least one selector element supported adjacent the exterior face of said panel for movement over said face to different positions thereon in which respectively said selector element is oriented toward locations on said panel respectively identified with the several movable members of said machine-tool, indicators carried by said panel in said locations for indicating the conditions of movement or rest of the respective movable members, at least one manually operable system operatively connected to said movable members and to said indicators selectively to secure and to indicate said conditions, manually operable motor control means operatively connected to said adjusting means and to said starting and stopping means and connected to said selector element for actuating said adjusting means and said starting and stopping means to start and stop and control the speed of a movable member selected by said selector element, said machine tool further comprising a selecting device connected to said systems and said manually operable motor control means and operable to control said machine either from said portable control device or from said stationary control device, and manually operable means carried at least by one of said supports for controlling said selecting device.

28. In a device for controlling the movement of the movable members of a machine tool or the like, in combination, a panel, said panel carrying on the exterior face thereof a pictorial representation of said machine tool and of the movable members thereof, a selector element supported adjacent the exterior face of said panel for movement thereof over said face to different positions on said panel respectively identified with the depicted movable members of the machine tool, said selector element being connectible to said members of the machine tool for selecting in the respective positions of said selector element the movable member to be moved, direction selectors carrier by said panel and respectively identified with the depicted movable members and connectible to said movable members and to said selector element for selecting the direction of movement of the movable member selected by said selector element.

29. In a device for controlling the movement of the movable members of a machine tool or the like, the combination as defined in claim 28 which comprises direction indicators carried by said panel respectively adjacent the depicted movable members and operatively connectible to said movable members of the machine and to the direction selectors for indicating the direction of movement of the movable member selected by said selector element as determined by said direction selectors.

30. In a device for controlling the movement of the movable members of a machine tool or the like, in combination, a panel, said panel carrying on the exterior face thereof a pictorial representation of said machine tool and of the movable members thereof, a selector element supported adjacent the exterior face of the panel for movement over said face to different positions thereon in which respectively said selector element is oriented toward locations on said panel respectively identified with the depictions on said panel of the movable members of said machine tool for selecting any of said movable members and for indicating the selected movable member by the oriented position of said selector element.

References Cited in the file of this patent

UNITED STATES PATENTS

| | | |
|---|---|---|
| 1,604,619 | Turner | Oct. 26, 1926 |
| 1,721,286 | Sweetman | July 16, 1928 |
| 1,787,620 | Favarger | Jan. 6, 1931 |
| 1,988,343 | Tacy | Jan. 15, 1935 |
| 2,203,296 | Granberg | June 4, 1940 |
| 2,213,959 | Garrison et al. | Sept. 10, 1940 |
| 2,329,949 | Shapiro | Sept. 21, 1943 |
| 2,350,174 | Lucas et al. | May 30, 1944 |
| 2,363,132 | Lightfoot et al. | Nov. 21, 1944 |
| 2,488,324 | Pegard | Nov. 15, 1949 |
| 2,516,043 | Berthiez | July 18, 1950 |

FOREIGN PATENTS

| | | |
|---|---|---|
| 882,364 | France | Mar. 1, 1943 |